United States Patent
Murakami et al.

[11] Patent Number: 5,596,381
[45] Date of Patent: Jan. 21, 1997

[54] CAMERA FOR USE WITH PHOTOGRAPHIC FILM IN A CARTRIDGE

[75] Inventors: Koichiro Murakami; Takemi Miyazaki; Kazuhiro Nakanishi; Noriyuki Kaedeoka, all of Hachioji, Japan

[73] Assignee: Konica Corporation, Tokyo, Japan

[21] Appl. No.: 373,448

[22] Filed: Jan. 17, 1995

[30] Foreign Application Priority Data

Jan. 19, 1994 [JP] Japan .................................. 6-004185
Mar. 29, 1994 [JP] Japan .................................. 6-059285

[51] Int. Cl.$^6$ .............................. G03B 7/24; G03B 1/02; G03B 17/26
[52] U.S. Cl. ...................... 396/207; 396/387; 396/512; 396/538
[58] Field of Search ...................... 354/21, 173.1, 354/275

[56] References Cited

U.S. PATENT DOCUMENTS 5,030,978  7/1991  Stoneham et al. .................... 354/21
5,032,854  7/1991  Smart et al. ........................... 354/21
5,049,912  9/1991  Pagano et al. ........................ 354/275
5,283,604  2/1994  Aoshima ................................ 354/21

*Primary Examiner*—A. A. Mathews
*Attorney, Agent, or Firm*—Finnegan, Henderson, Farabow, Garrett & Dunner, L.L.P.

[57] ABSTRACT

A camera in use with a photographic film in a cartridge. The camera includes: a cartridge chamber for accommodating the cartridge, in which the cartridge includes a spool and a bar code disk; a regulation member for regulating a location of the spool in the cartridge chamber; a regulation member release for releasing a regulation of the location of the spool by the regulation member; a driving shaft for being coupled with the spool to rotate it; a generator circuit for generating reference pulse signals which correspond to a rotation cycle of the spool; a bar code reader for reading a bar code on the bar code disk in rotation so as to obtain film information respectively from each unit block of the bar code; and a controller for controlling the bar code reader in synchronism with the reference pulse signals so as to obtain the film information when the driving shaft is coupled with the spool and the photographic film is being loaded to a photographic position where a first frame of the photographic film is subjected for picture taking with the camera.

9 Claims, 41 Drawing Sheets

FIG. 5
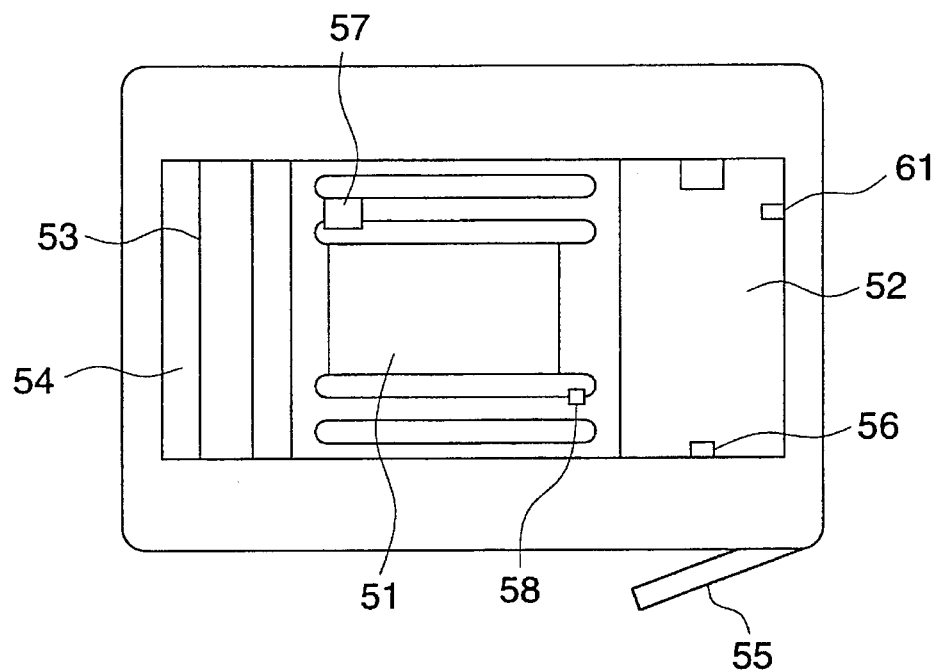
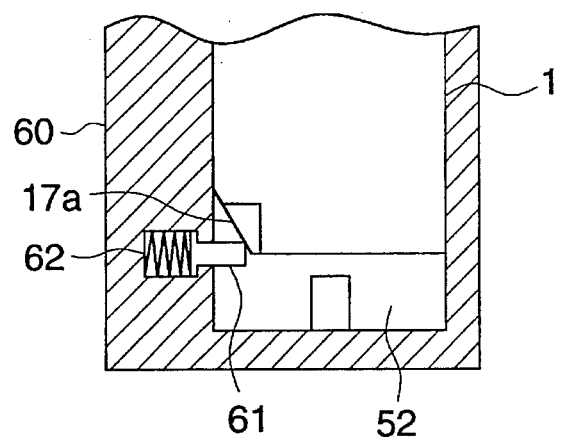
FIG. 6 (A)
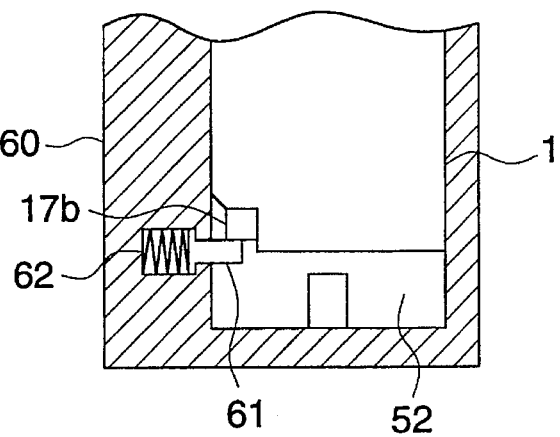
FIG. 6 (B)

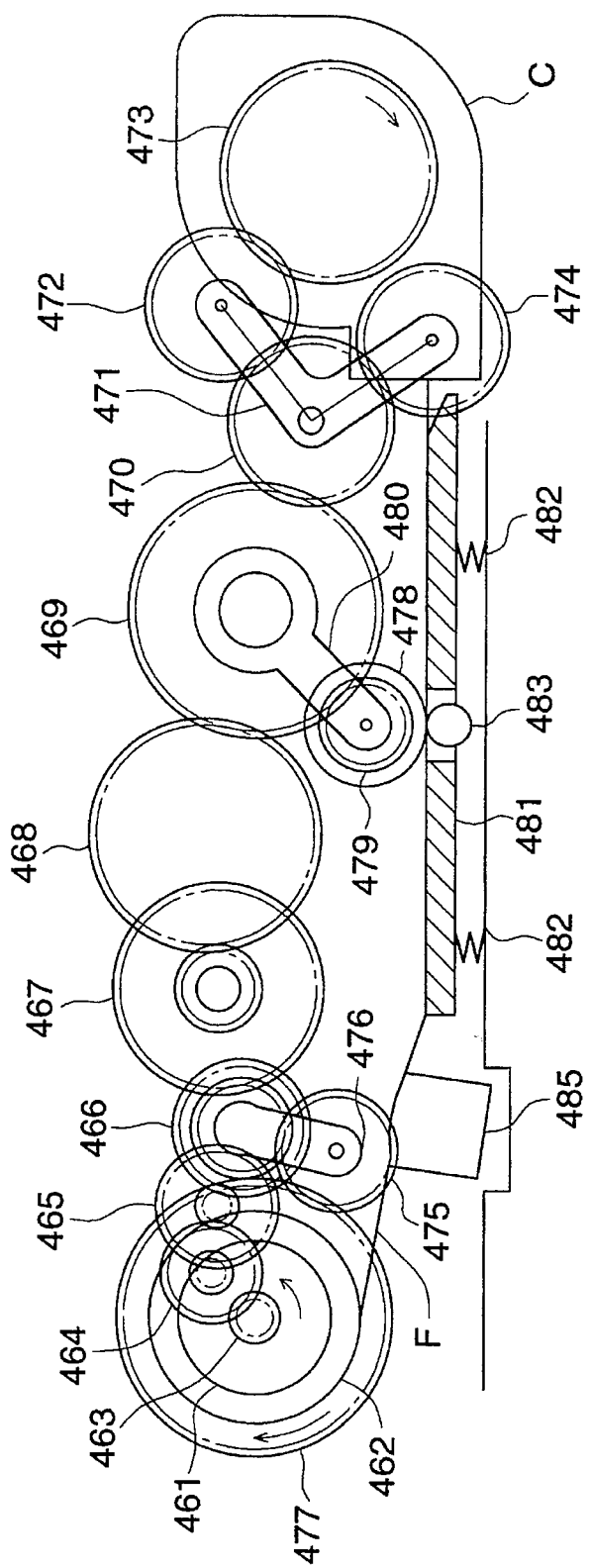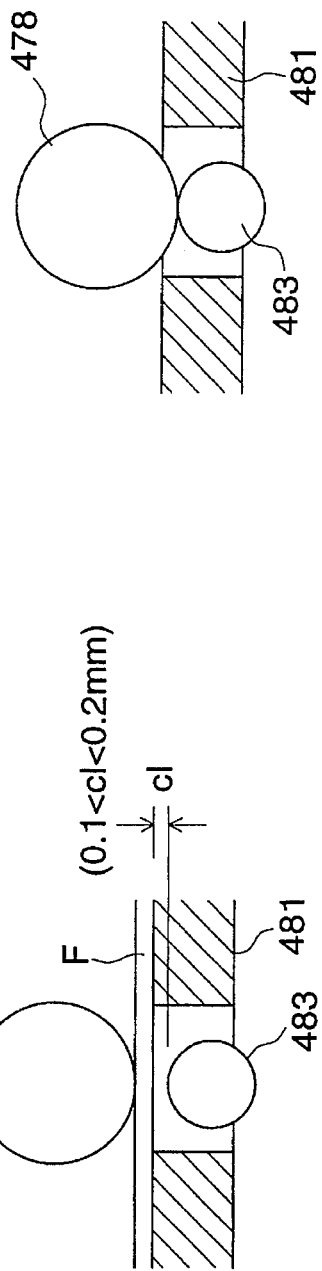

FIG. 30 (A)
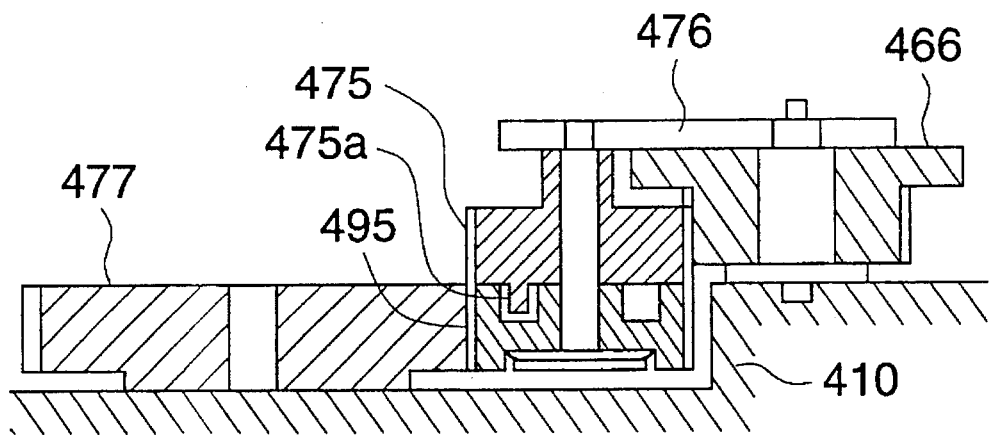
FIG. 30 (A)'
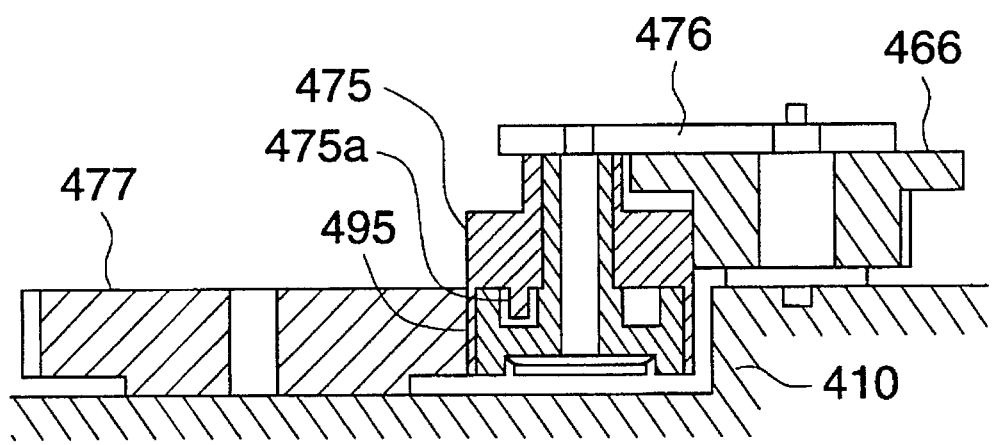

L1 L2 L3 L4

CAMERA FOR USE WITH PHOTOGRAPHIC FILM IN A CARTRIDGE

BACKGROUND OF THE INVENTION

The present invention relates to a camera in which a film cartridge with a bar code disk having a bar code which shows film information such as the film sensitivity, the number of exposable frames of the film, etc., is loaded. Further, the present invention relates to a camera with a film feeding mechanism in which the film is wound up by a reel when a camera motor is rotated normally, and the film is re-wound by a spool provided in a cartridge when the motor is rotated reversely.

Relating to reading out the bar code from the film cartridge with a bar code disk having thereon a bar code which shows film information such as the film sensitivity, the number of exposable frees of the film, etc., the following method has been disclosed in Japanese Patent Publication Open to Public Inspection No. 215630/1992: a method in which the bar code is read out during steady rotation of the spool after a predetermined time has passed after the rotation of the spool has started. Further, in a pre-winding type camera in which all the film is wound up before the start of picture-taking, a method, in which the bar code is repeatedly read out during the pre-winding operation, and after that, data having the same information, which most frequently appears among read-out data, is adopted as correct data, has been disclosed in Japanese Patent Publication Open to Public Inspection No. 53187/1993.

However, the rotational speed of the spool is not constant due to various factors caused by the driving system of a camera, loads of the loaded cartridge, etc. Accordingly, a serious problem occurs when the bar code is erroneously read, resulting in reading of erroneous information. Further, there is also a problem in which information can not be repeatedly read while three exposed frames are fed in a short period of time until the first available exposable frame is ready, in a camera in which the film is normally wound up so as to expose the film from the first exposable frame.

In order to solve the foregoing problems, the present inventors have proposed the following method in Japanese Patent Application No. 328191/1993: film information can be positively read out even when the degree of rotation of the spool driving shaft is greatly changed, when the film information is read out from the bar code on the bar code disk rotated in synchronization with reference signals outputted in a predetermined rotational period corresponding to the rotation of the spool driving shaft.

However, in the prior patent application of the present inventors, a detection means is necessary for detecting the engagement of the spool of the cartridge with the driving shaft of the spool of the camera. When this detection means is not provided, the following problems occur. The spool shaft is rotated by the motor when the rear cover of the camera is closed after a cartridge is loaded into the camera. Reference signals are outputted corresponding to the rotation of the driving shaft of the spool although the driving shaft of the spool is not yet engaged with the spool. That is, although the bar code is stopped, the stopped bar code is read out as if the bar code having the same pattern continues. As a result, a read-out reference position of the bar code is erroneously read out, and erroneous information is read out, which is a problem.

Specifically, when a film cartridge, in which a condition of use of the film is judged by the rotational angle of the spool, is used in a camera, an engaged position of the spool with the spool driving shaft is limited in the rotational direction, and an excessive period of time is necessary for the engagement of the spool with the spool driving shaft. Accordingly, the foregoing problem occurs more easily.

In order to realize a low cost camera even when the foregoing cartridge is used, the first object of the present invention is to propose a camera in which erroneous film information is never read out just after the rotation of the spool starts as described above without providing the above-described detecting means.

In this connection, the following gears have been disclosed in Japanese Patent Application No. 4835/1994 applied by the present inventors: a reversible motor; reel driving gears; spool driving gears; planetary gears which drive the reel driving gears at the time of film winding up, and which are disengaged from the reel driving gears at the time of film re-winding; planetary gears Which drive the spool driving gears during film winding up, and which are disengaged from the spool driving gears during film re-winding; and planetary gears which drive the spool gear during film re-winding, and which are disengaged from the spool gear during film winding up.

When the motor starts normal rotation and is switched to wind up the film in the case where the film is under the re-winding condition, using the film feeding mechanism disclosed in Japanese Patent Application 4835/1994, the following problems were found by the present inventors. That is, when the planetary gears for driving the reel driving gears at the time of film winding-up are engaged with the reel driving gears before the planetary gears which have been driving the spool gear during film re-winding are disengaged from the spool gear, then, the reel driving gears drive the reel, the reel winds up the film, and then the film rotates the spool, that is, the spool gear. As a result, the planetary gears which have been driving the spool gear during film winding-up can not be disengaged from the spool gear, the force is supplied to the planetary gears from two driving sources of the spool gear and the sun gear, and finally, the motor is forced to stop. The second object of the present invention is to propose a camera which can be solve the above-described problems.

SUMMARY OF THE INVENTION

The above-described first problem can be solved by a camera according to the first embodiment of the present invention. That is, in a camera into which a film cartridge provided with a spool for winding up a film, and a bar code disk having thereon a bar code showing film information and integrally rotated with the spool, is loaded, the camera is provided with: a spool driving shaft which is engaged with the spool; a signal output means for outputting a reference signal for a predetermined rotational period when the spool driving shaft is rotated; and an information reading-out means for reading out the film information from the bar code on the bar code disk rotated with the rotation of the spool driving shaft, wherein the film information is read out from the bar code in synchronization with the output signal from the signal output means, after the information reading-out means has detected changes in the bar code by a predetermined number of times when the rotation of the spool driving shaft has started.

The second embodiment of the present invention solves the above-described second problem. That is, a film feeding mechanism which can be positively switched even during film re-winding and the motor starts normal rotation so as to wind up the film, can be realized using an idle joint. Specifically, in a camera in which magnetic information recorded on the film is reproduced, the present invention is effective when the film, in which all the frames of the film are not exposed, is re-wound and re-loaded into the camera. That is, at this time, the film is wound up while the information of completion of exposure is being read for each frame of the film. In the case where a magnetic head is located on the side of the reel with respect to the picture plane, an excessive frame with respect to a desired frame is wound up when an unexposed frame is detected. Accordingly, it is necessary to wind up the film again after a predetermined amount of the film has been re-wound.

An idle joint by which no rotation is transmitted until an ON/OFF means is switched after the rotation of the motor has been reversed, has been disclosed in Japanese Patent Publication Open to Public Inspection No. 199322/1983. This idle joint is provided so that no looseness occurs in the film. The objective of this idle joint is different from that of the second embodiment of the present invention, and this idle joint is provided on the re-winding shaft gear. Accordingly, the composition disclosed in the above patent publication is also different from that of the second embodiment of the present invention.

In order to accomplish the above-described second objective, an idle joint is provided in a camera in the second embodiment of the present invention. To be more precise, the camera comprises: a motor for winding up the film by a reel when the motor is normally driven, and for re-winding the film by a spool in the cartridge when the motor is reversely driven; a reel gear being integrally rotated with the reel; a spool gear being integrally rotated with the spool; a first planetary gear for driving the reel gear during winding-up of the film, and for being disengaged from the reel gear during re-winding of the film; a second planetary gear for driving the spool gear during winding-up, and for being disengaged from the spool gear during re-winding; a third planetary gear for driving the spool gear during re-winding, and for being disengaged from the spool gear during winding-up; and a reduction gear group adjusted so that the film feeding speed given by the reel is set higher than that given by the spool. In this camera, an idle joint, by which the driving force from the motor is not directly transmitted to the reel even when the first planetary gear is engaged with the reel gear before the third planetary gear is disengaged from the spool gear when the motor is normally rotated under the condition that the film is re-wound, is provided in the first planetary gear.

BRIEF DESCRIPTION OF THE DRAWINGS

FIG. 5 is a view of a camera viewed from the back in the first embodiment of the present invention.

FIGS. 6(A) and 6(B) are operational views of a cartridge loading regulation pin when the cartridge is loaded in the camera in the first embodiment of the present invention.

FIGS. 28(A), 28(B), and 28(C) are plan views of a film feeding mechanism of the camera in the second embodiment of the present invention.

FIGS. 30(A), 30(A') and 30(B) are views showing an idle mechanism of the camera in the second embodiment of the present invention.

DETAILED DESCRIPTION OF THE INVENTION

Referring to FIGS. 1 through 13, the first embodiment of the present invention will be described in detail below.

Initially, a cartridge used in the first embodiment of the present invention will be described below.

Figure 1:
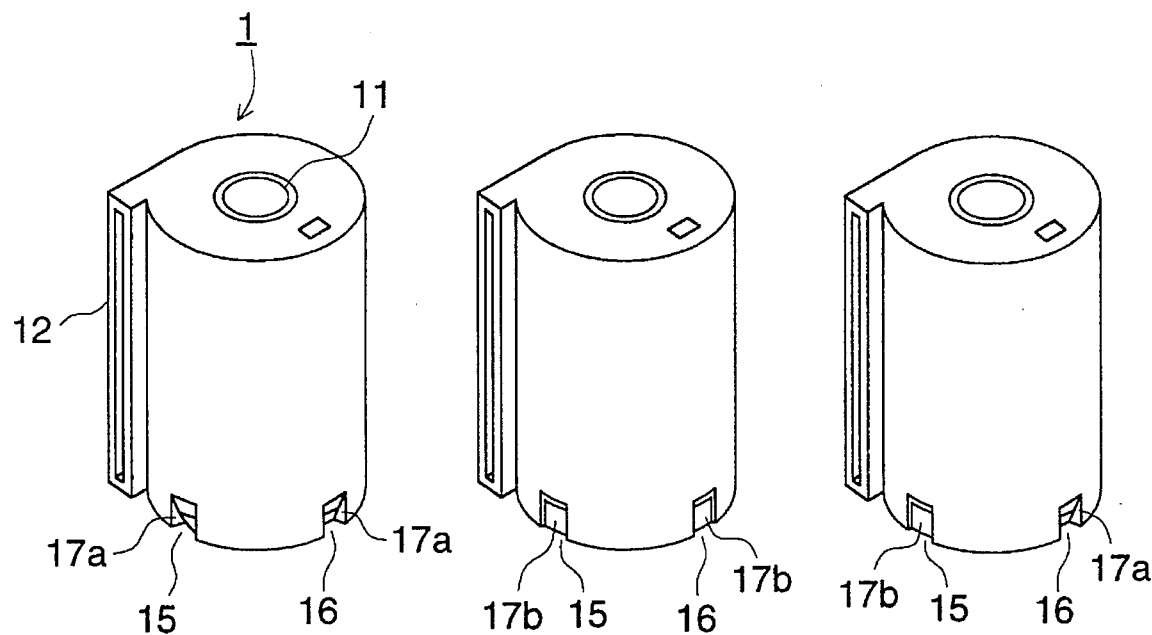
FIGS. 1(A), 1(B), and 1(C) are perspective views of a cartridge used in the first embodiment of the present invention.
Figure 2:
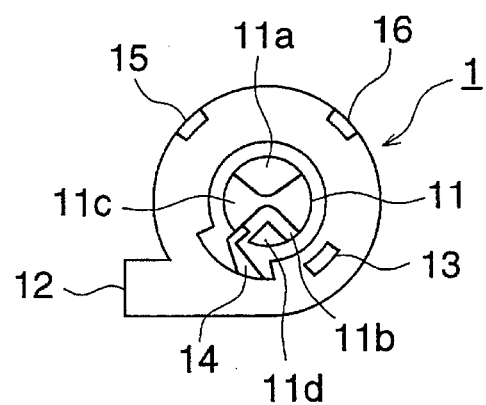
FIG. 2 is a view showing the lower portion of the cartridge shown by FIGS. 1(A), 1(B), and 1(C).

FIGS. 1(A), 1(B), and 1(C) are perspective views of the cartridge, and FIG. 2 is a bottom view of the cartridge. The cartridge 1 has a spool 11 around which the film is wound inside the cartridge and a lip portion 12 through which the film is introduced into the cartridge 1 or from which the film is pulled out. Normally, all the film is accommodated in the cartridge 1 including the leading edge of the film. When the spool 11 is rotated, the film is fed out of the cartridge 1 through the lip portion 12, and the film is re-wound into the cartridge 1 after film exposure.

Normally, all the film is wound into the cartridge 1 including the leading edge, and therefore it is difficult to judge whether the film has been exposed or not. Accordingly, in order to discriminate that the film is not yet exposed (non-exposure), partially exposed (partial-exposure), or completely exposed (complete-exposure), positions in the rotational direction of the spool 11 are determined corresponding to respective conditions of film use, and a display discriminated by pictures, characters, or colors is made on a display portion shown in FIG. 2. That is, in the case of a non-exposed film which is not yet loaded in a camera, the spool 11 stops at a position, corresponding to which a display of non-exposed film is made on the display portion provided on the cartridge, in the rotational direction of the spool. When the film is re-wound before all the film is exposed after the film has been loaded in the camera, the spool 11 stops at a position, corresponding to which a display of partially-exposed film is made on the display portion 13, in the rotational direction of the spool. In the same way, when the film is re-wound after all the film has been exposed, the spool 11 stops at a position, corresponding to which a display of exposed film is made on the display portion 13, in the rotational direction of the spool 11. A spool lock mechanism 14 is provided so that the spool 11 can not be inadvertently rotated and the display of condition of use can not be changed when the film is taken out of the camera. Normally, rotation of the spool 11 is locked by this lock mechanism 14.

Two exposure windows 15 and 16 are provided at one corner of the cartridge 1, for example, at an angular interval of 90°. A portion of a cylindrical member 17 integrally rotated with the spool 11 is visible through the exposure windows 15 and 16. Slope-shaped cutout portions 17a and perpendicular cutout portions 17b are provided in the cylindrical member 17 at an angular interval of 180°. In the case of unexposed film, slope-shaped cutout portions 17a are visible through exposure windows 15 and 16 as shown in FIG. 1(A). In the case of exposed film, perpendicular cutout portions 17b are visible through exposure windows 15 and 16 as shown in FIG. 1(B). In the case of partially exposed film, one of the perpendicular cutout portions 17b is visible through one exposure window 15, and one of slope-shaped cutout portions 17a is visible through the other exposure window 16 as shown in FIG. 1(C).

Figure 3:
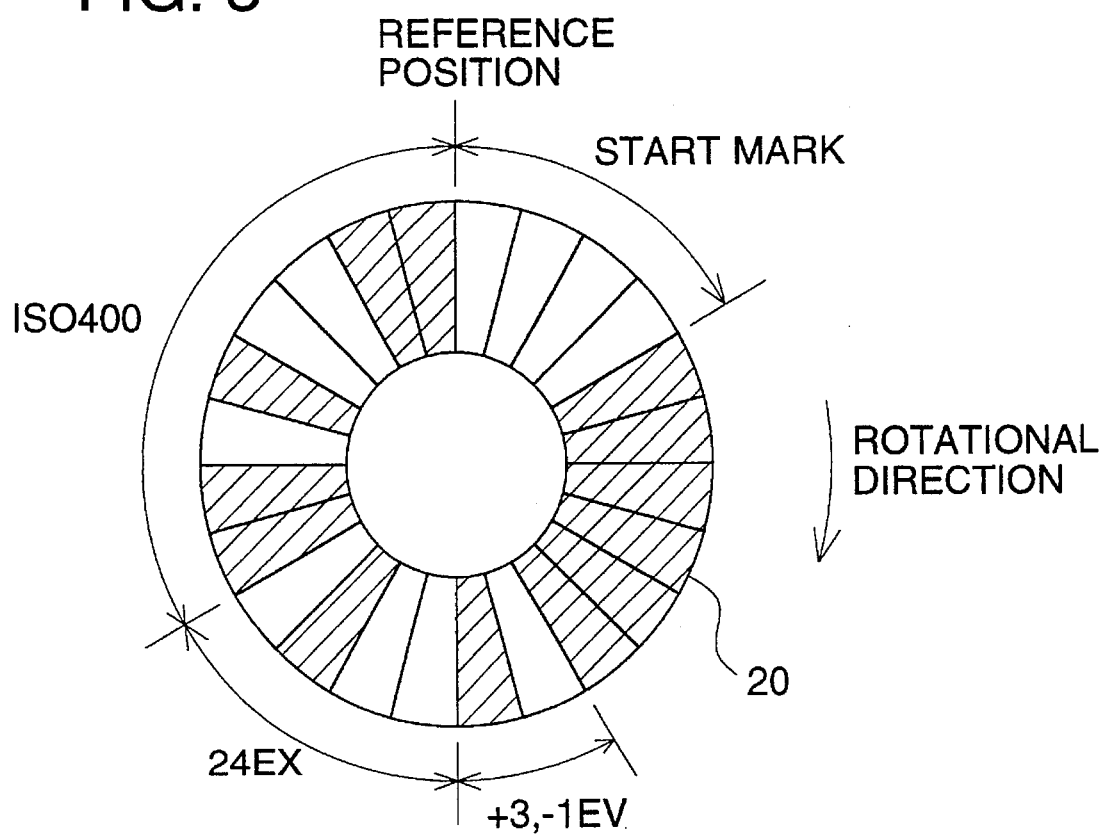
FIG. 3 is a view of the bar code showing film information.
Figure 7:
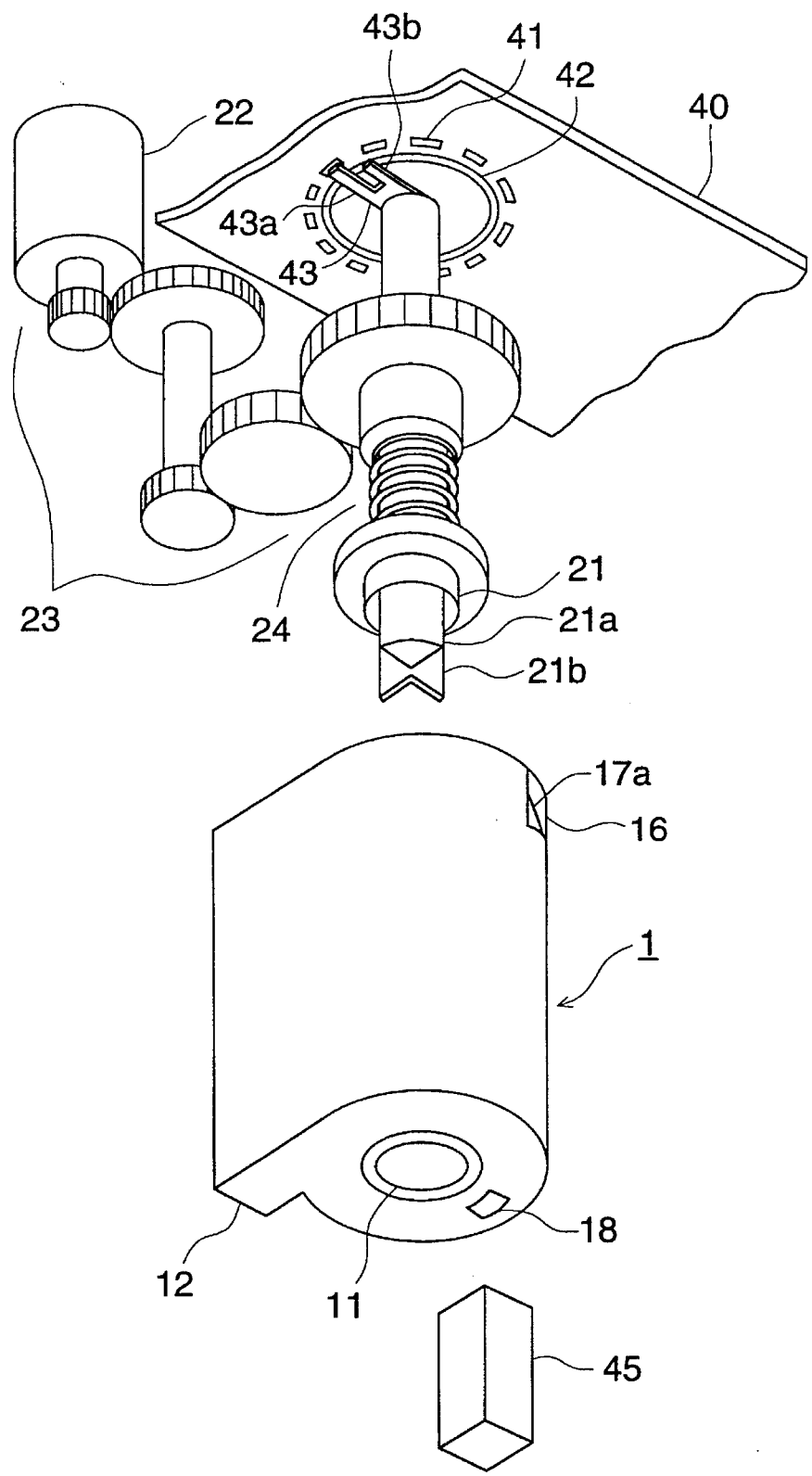
FIG. 7 is a perspective view of the driving mechanism of the camera in the first embodiment of the present invention.

FIG. 3 shows a bar code disk 20 having information corresponding to conventional DX code such as the film sensitivity, the number of exposable frames, etc. The bar code disk is divided into 24 areas at 15° intervals. Information is displayed by white and black patterns as follows. The information is expressed according to rules in which, for example, a reference position to show the start of information is expressed when four white blocks appear consecutively, [1] is expressed when two blocks of same colors continue, and [0] is expressed when 1 block of either color appears. In FIG. 3, the information is expressed by a total of 10 bits as follows. The film sensitivity is expressed by 5 bits, the number of exposable frames is expressed by 3 bits, and film latitude is expressed by 2 bits. The bar code disk 20 is provided on the lower portion of the cartridge shown in FIG. 1 in such a manner that the bar code disk 20 can be integrally rotated with the spool 11, and can be seen through the bar code window 18. When this cartridge is loaded in the camera, the information is read out photoelectrically by a photoelectric element 45 (including a power source and a light receiving element) comprising a photo-reflector, etc., provided on the main body side opposed to the bar code window 18 as shown in FIG. 7, while the spool 11 is being rotated. Of course, the angle of one block of the bar code may be other than 15°, the number of bar code blocks may be other than 24, and rules of information recording may be different from the above-described rules.

Control of the cartridge in the camera will be described from the time when the cartridge has been loaded, to the start of photography.

Figure 4:
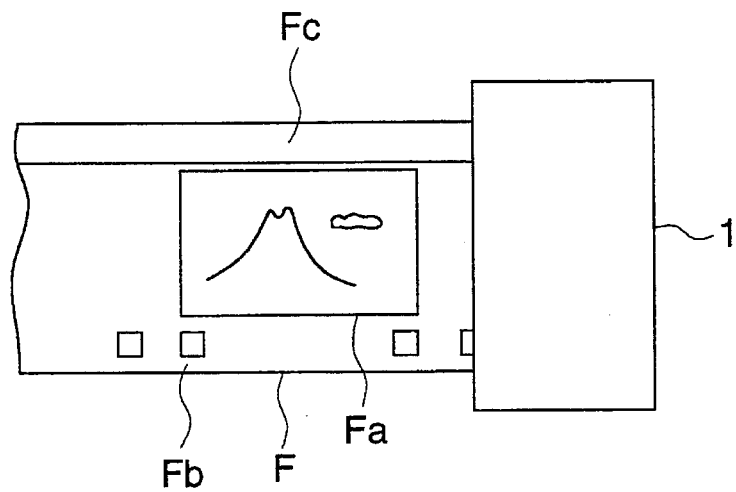
FIG. 4 is a view showing a film used in the first embodiment of the present invention.

FIG. 4 is a view in which a film F to be used in a camera is pulled out of the cartridge 1, and the film is shown reversed with respect to FIG. 1. Two perforations Fb are provided on one end of the film along the width of the film F, wherein one of two perforations Fb is provided at the front end of the photographic frame, and the other perforation is provided at the back end of the photographic frame on one end of the film along the width of the film. A magnetic recording area Fc coated with magnetic recording material is provided on the entire length of the film on the other edge along the width of the film. Various photographic information such as photographing date, exposure value, available amount of light at the time of photography, trimming requirement, etc., are recorded by a magnetic head in the camera (which will be described later) onto this area.

FIG. 5 is a rear view of the camera body, and a rear cover of the camera is neglected in the view. The cartridge chamber 52 in which the cartridge 1 is loaded is provided on one side and the reel chamber 54 in which the film is wound by a reel 53 is provided on the other side of the aperture portion 51, which is the central portion of this camera. Numeral 55 is the cover of the cartridge chamber. The cartridge 1 is loaded into the cartridge chamber 52 in such a manner that the cartridge is dropped into the cartridge chamber 52 when the cover 55 of the cartridge chamber is opened in the direction of the shaft. Numeral 56 is a switch for detecting cartridge loading. When the cartridge 1 is loaded into the cartridge chamber and the cover 55 of the cartridge chamber is closed, this switch is pushed, and detects whether the cartridge 1 is correctly loaded or not. A release mechanism (not shown) of the spool lock mechanism 14 is provided near the spool driving shaft 21. This release mechanism has the following features. The lock mechanism 14 can be automatically released when the cartridge 1 is loaded into the cartridge chamber 52, in the case where a pin or the like has been vertically provided previously before the cartridge 1 has been loaded. Numeral 57 is a magnetic head for recording the photographic information on the magnetic memory area Fc of the film. Numeral 58 is a photoelectric element such as a photo-reflector or the like for detecting perforations, and thereby the film length fed from the cartridge is detected. Numeral 61 is a loading regulation pin for regulating cartridge loading corresponding to the film exposure state.

FIGS. 6(A) and 6(B) are views showing the operation of the cartridge loading regulation pin 61. The cartridge loading regulation pin 61 provided in the camera main body 60 protrudes withdrawably in the perpendicular direction to the loading direction of the cartridge 1 into the cartridge chamber 52, and is forced in the direction of protrusion by a compression spring 62. When an unexposed cartridge 1 as shown in FIG. 1(A) is loaded into the cartridge chamber 52, although the slope-shaped cutout portion 17a comes into contact with the cartridge loading regulation pin 61, the pin 61 is withdrawn into the main body 60 by the action of the slope-shaped cutout portion at the time of loading, and accordingly, the cartridge 1 can be correctly loaded into the cartridge chamber. When an exposed cartridge 1 as shown in FIG. 1(B) is loaded, then, the perpendicular cutout portion 17b comes into contact with the cartridge loading regulation pin 61, the pin 61 can not be withdrawn into the main body 60, and the cartridge 1 can not be correctly loaded into the cartridge chamber. Here, it is determined depending on the specification of the camera, whether the cartridge loading regulation pin 61 is located at the position corresponding to the exposure windows 15 or the exposure window 16. For example, when the cartridge loading regulation pin 61 is arranged at the position corresponding to the exposure window 15, loading of the cartridge 1 as shown in FIGS. 1(B) and 1(C), in which the perpendicular cutout portion 17b is exposed in the exposure window 15, is regulated. That is, only an unexposed cartridge 1 can be loaded into the cartridge chamber. When the cartridge loading regulation pin 61 is arranged at the position corresponding to the exposure window 16, loading of the cartridge 1 as shown in FIG. 1(B), in which the perpendicular cutout portion 17b is exposed in the exposure window 16, is regulated. That is, only an unexposed cartridge 1 or a partially exposed cartridge 1 can be loaded into the cartridge chamber. Accordingly, in this case, it is necessary to control the camera so that exposed frames are skipped and unexposed frames are detected.

Next, referring to FIG. 7, a driving system for driving the spool 11 will be described below. An engaged portion of the spool 11 not shown in FIG. 7 is shown in FIG. 2. That is, 11a and 11b form recessed portions, and 11c and 11d form protruded portions. With respect to this, the spool shaft 21 has a protruded portion 21a which engages with a recessed portion 11a of the spool 11, and a protruded portion 21b which engages with a recessed portion 11b. When the engaged portion has the shape described above, the spool 11 can be engaged with the spool driving shaft 21 only at a specific position in the direction of rotation. After the spool 11 has been engaged with the spool driving shaft 21, the spool driving shaft 21 is driven so that the film is fed from the cartridge 1, or is re-wound to the spool when the driving force of a motor 22 is transmitted to the spool driving shaft through a reduction gear mechanism 23 composed of a plurality of gears. A compression spring 24 is provided on the spool driving shaft 21. When the cartridge 1 is loaded into the cartridge chamber of the camera, the spool driving shaft 21 is in many cases not directly engaged with the spool shaft 11. In this case, the spool shaft 21 is withdrawn upward while resisting against the compression spring 24. When the spool driving shaft 21 is rotated and arrives at the position to be engaged with the spool 11, the spool driving shaft 21 is pushed by the compression spring 24 and engaged with the spool 11.

Figure 8:
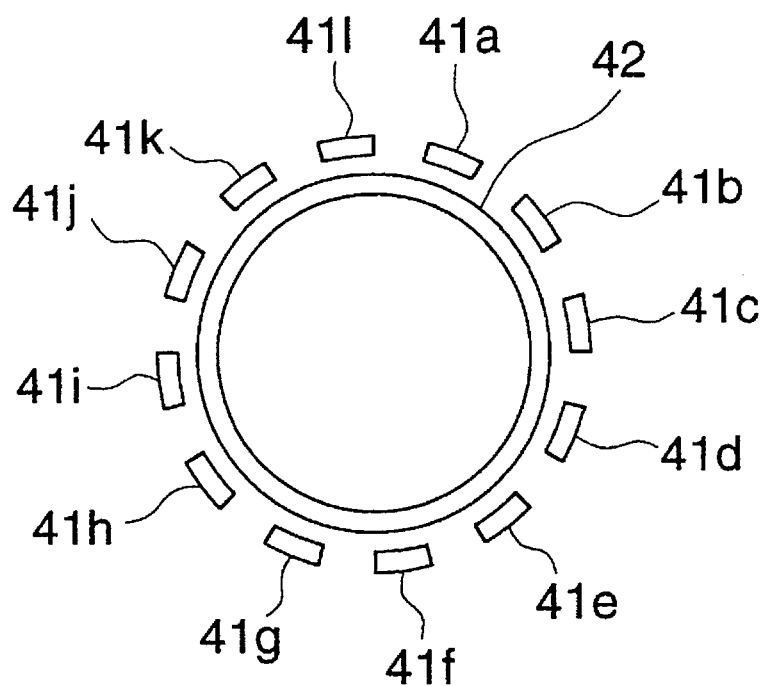
FIG. 8 is a view of a pattern for generating the spool rotation signals

Numeral 40 is a printed circuit board to detect the rotational position of the spool driving shaft 21. This board is fixed inside the camera, and conductive patterns 41 and 42 are provided on this board. A slidable contact piece 43 which is integrally rotated with the spool driving shaft 21, is provided on one end of the spool driving shaft 21 system. One end of this slidable contact piece 43 is divided into two contact points, one of these points, 43a, comes into contact with conductive pattern 41, and the other point 43b comes into contact with conductive pattern 42. A detailed drawing of conductive patterns 41 and 42 is shown in FIG. 8. Conductive pattern 41 consists of 12 individual blocks, each block with an angular length of 15° in the direction of circumference, and each angular interval between blocks of 15°. This example of patterns is used in the case where each bar code on the bar code disk 20 in the cartridge 1 has an angular length of 15°. Accordingly, when the bar code is different from that of this example, conductive patterns each having the angular length corresponding to that of the bar code may be provided at the same angular intervals. Further, the number of the conductive blocks can be any multiple integer of that of the bar code blocks.

Further, it is possible that the printed board 40 is integrally rotated with the spool driving shaft 21 and the slidable contact piece 43 is fixed to the main body side.

Figure 9:
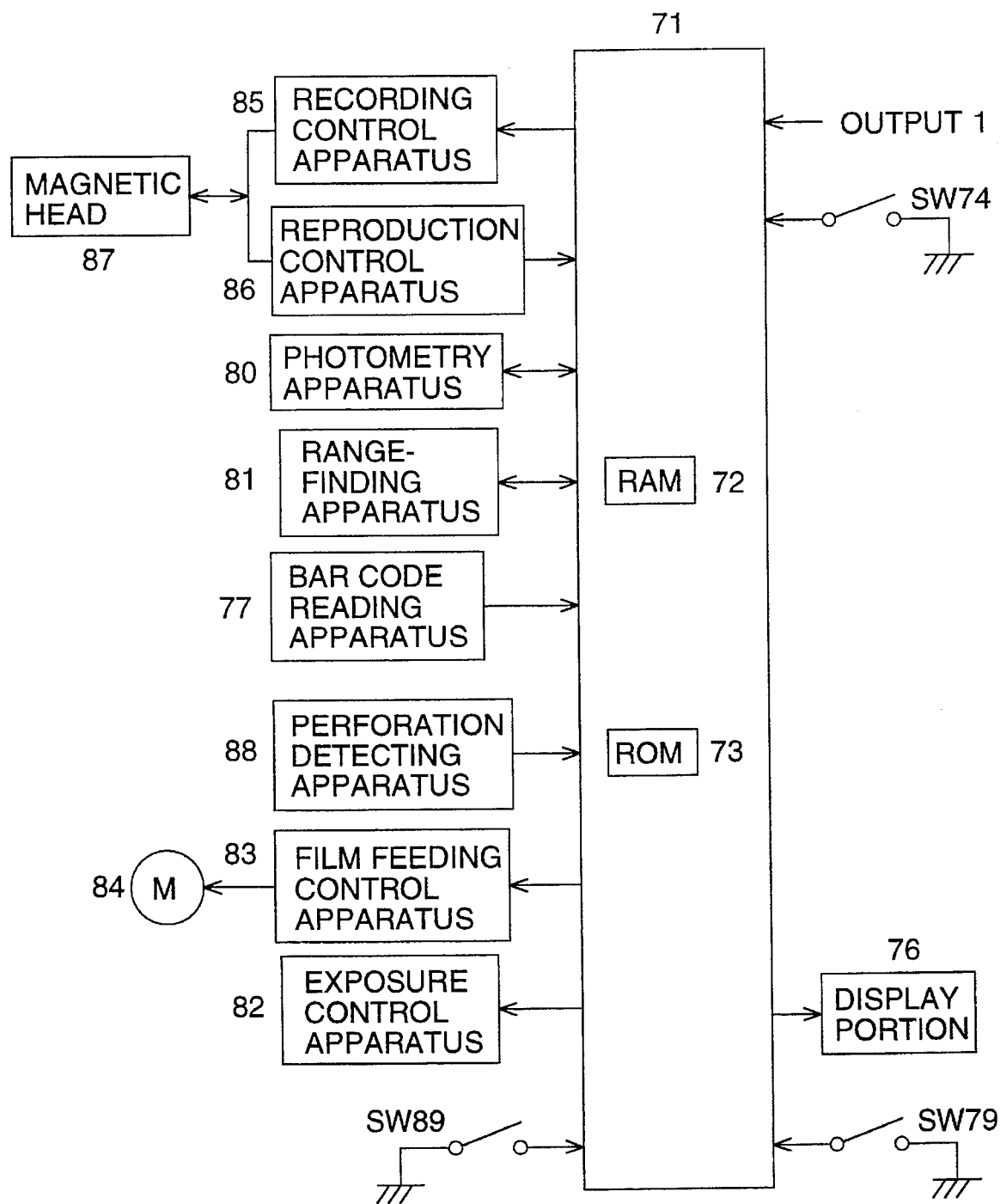
FIG. 9 is a block diagram showing a control system of the camera in the first embodiment of the present invention.

Next, the total control system of the camera will be explained using a block diagram shown in FIG. 9. Numeral 71 is a main microcomputer, and controls a peripheral circuit according to a flow chart which will be described later. The microcomputer 71 includes a RAM 72 and a ROM 73. A SW 74 is a cartridge loading detection switch which corresponds to numeral 56 in FIG. 5, and turns ON when the cartridge 1 is correctly loaded in the cartridge chamber 52. An output 1 shown in FIG. 9 is used when the bar code disk 20 reads the bar code information, and rotates the spool 11 with the film feed motor 22. The bar code information is read by a bar code reading means 77 in synchronization with the rise and fall of the signal of the output 1 generated by conductive patterns 41 and 42 shown in FIG. 7. A SW 79 is a release switch. When this switch is pressed, the following photographic operations are started and carried out. After photometry and range-finding have been carried out by a photometry apparatus 80 and range-finding apparatus 81, an exposure operation is carried out in an exposure control apparatus 82; and a magnet head 87 is driven in a recording control apparatus 85 or a reproduction control apparatus 86, for magnetic recording or magnetic reproduction while a film feeding motor 84 is being driven by a film feeding control apparatus 83. Then, the film feeding operation stops when a predetermined number of perforations Fb are detected by a perforation detecting apparatus 88. A SW 89 is a re-winding switch. When this switch is pressed, the film F is re-wound into the cartridge 1 even when a predetermined number of frames are not yet exposed.

Figure 10A:
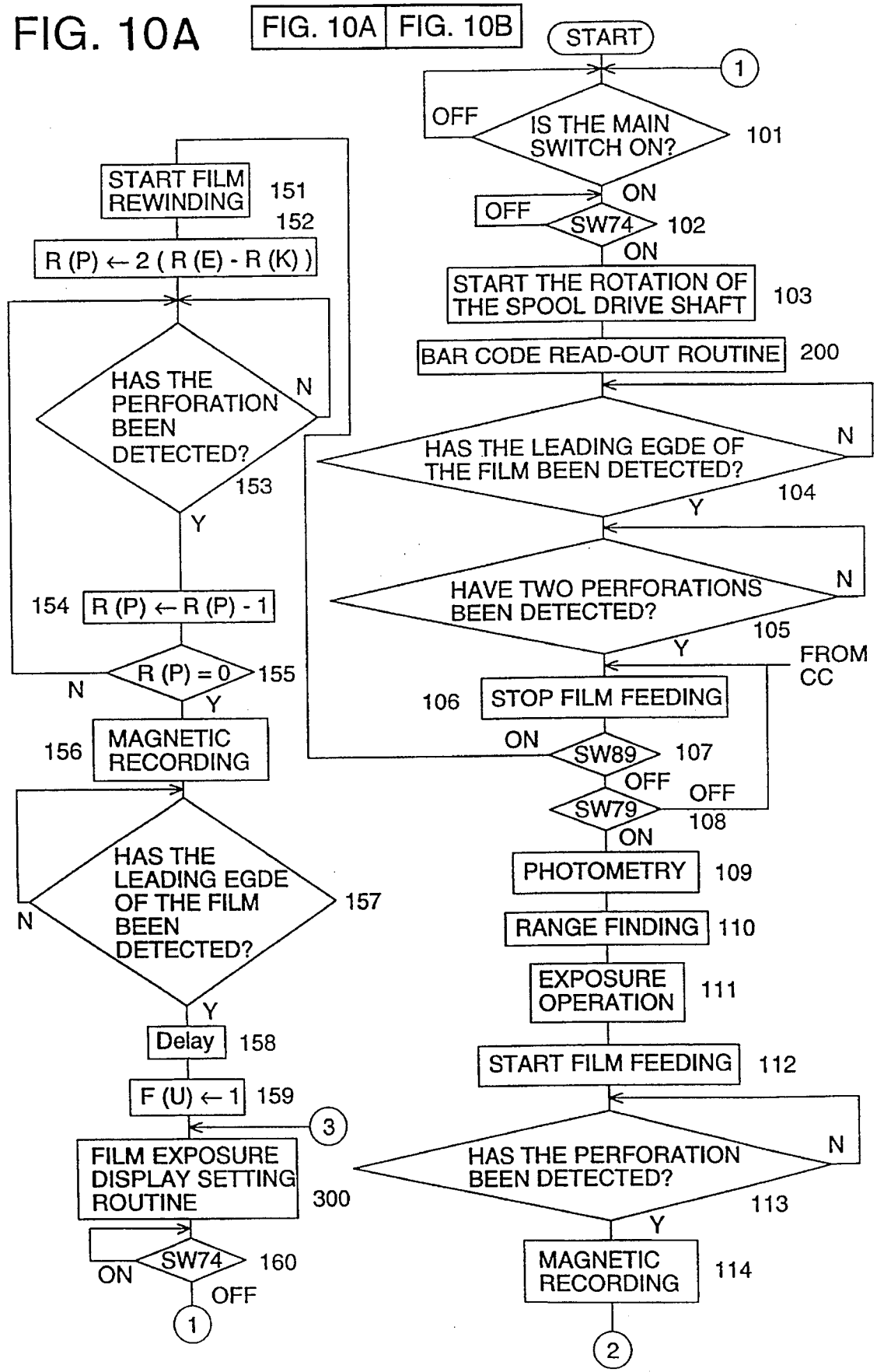
FIGS. 10A and 10B are a main flow chart of operations carried out in the control system shown in FIG. 9.
Figure 10B:
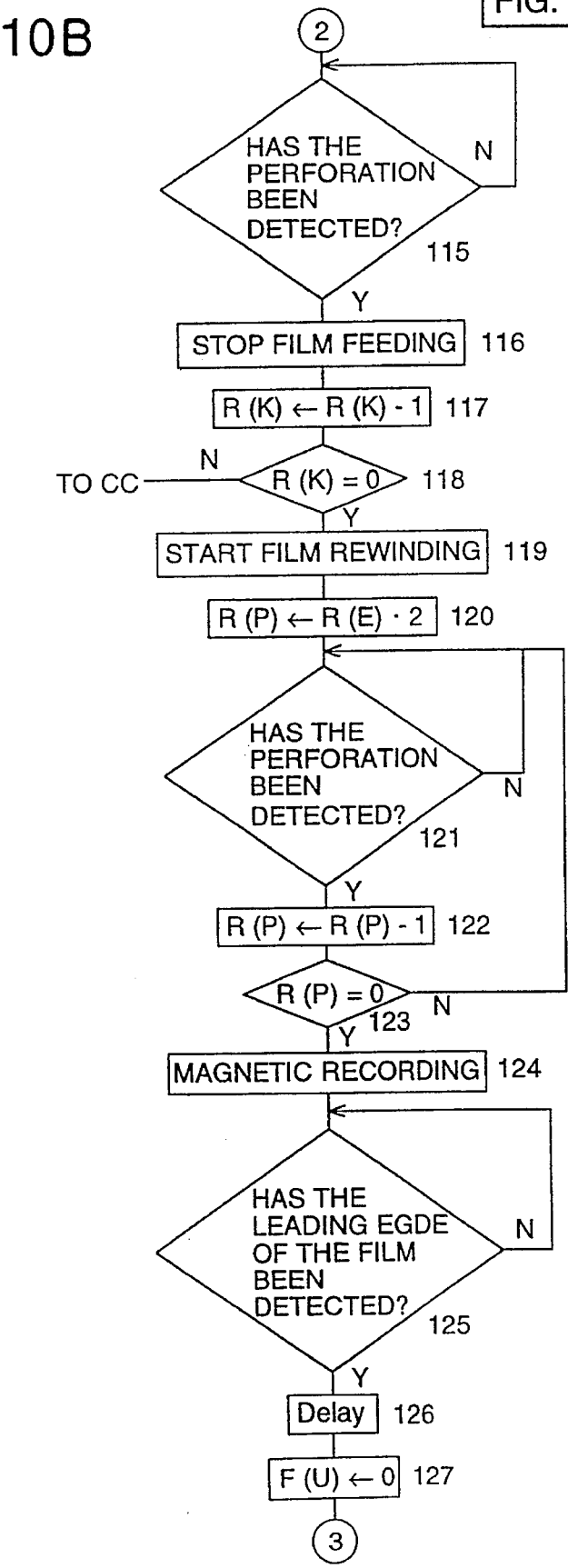
Figure 13:
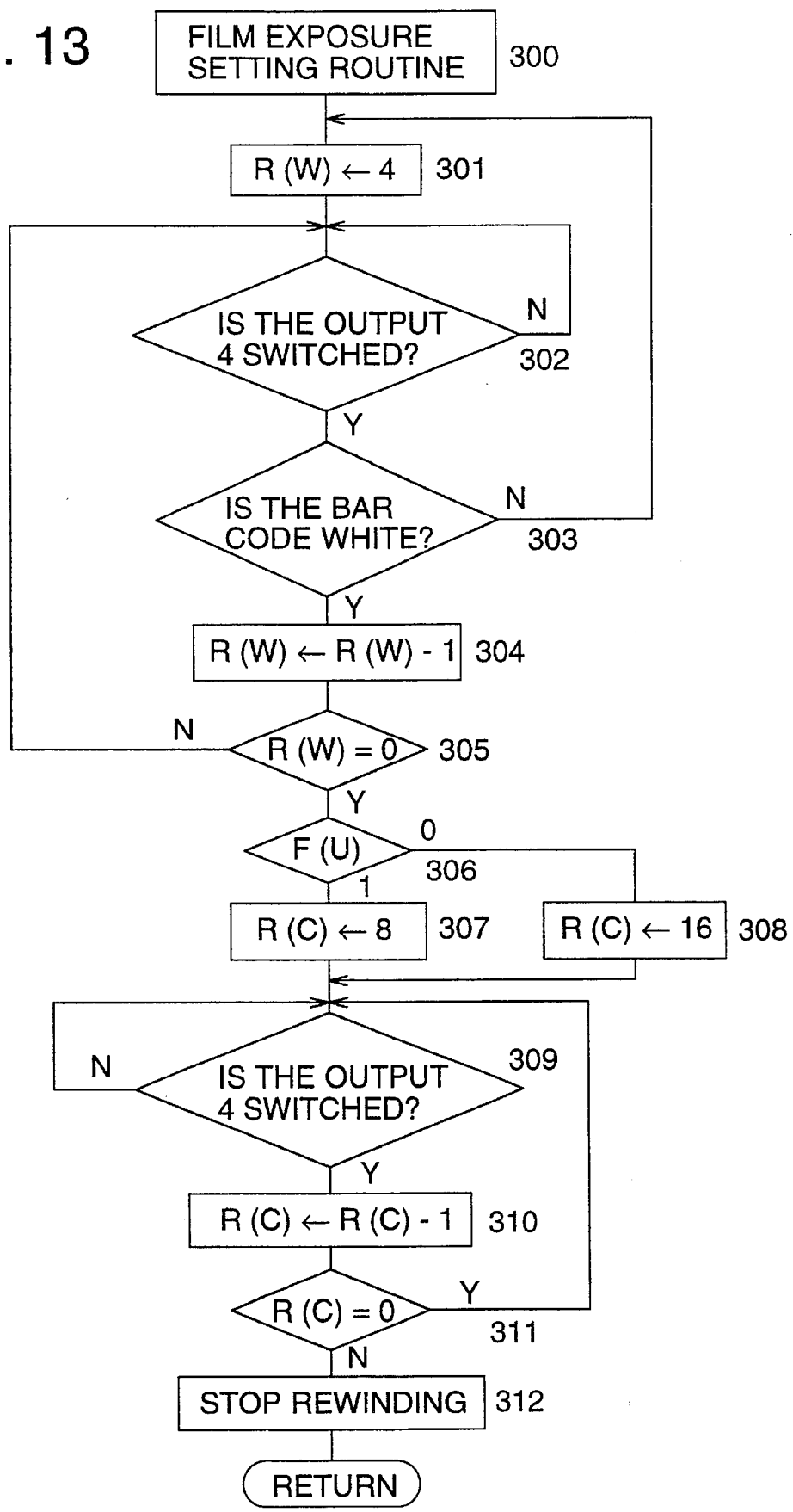
FIG. 13 is a flow chart showing a film exposure display setting subroutine in the first embodiment of the present invention.

Next, operations of the control circuit will be described according to flow charts. FIGS. 10A and 10B are the main flow chart in the first embodiment according to the present invention, and FIGS. 11 and 13 are sub routines thereof.

In FIGS. 10A and 10B, a program starts when a battery is set in the camera or the microcomputer is reset. When it is detected in step 101 that the main switch, not shown, is on, the status of a cartridge loading detection switch SW 74 is judged in step 102. When loading of the cartridge is detected, the spool driving shaft 21 is rotated by the motor 22 in step 103. After that, the sequence enters into a bar code read-out routine 200.

Figure 11:
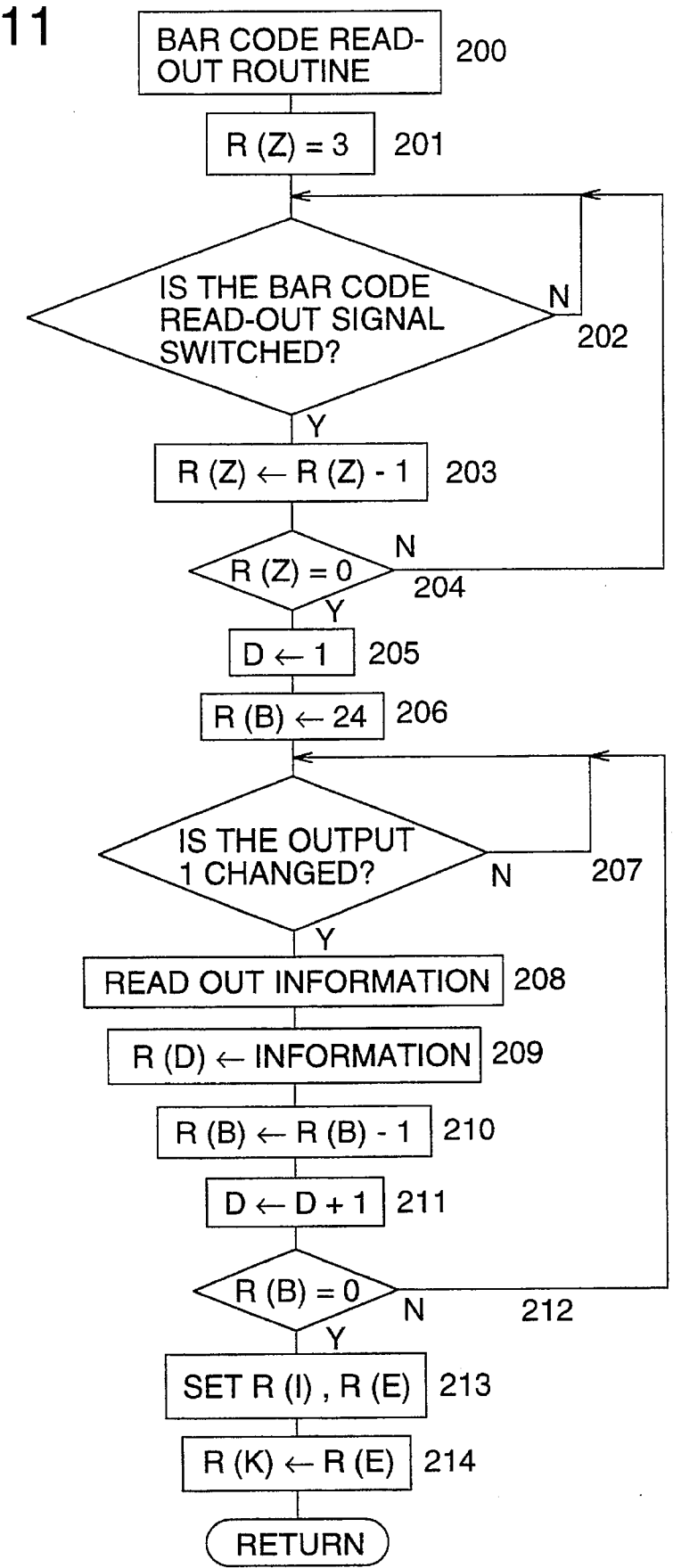
FIG. 11 is a flow chart showing the bar code read-out subroutine in the first embodiment of the present invention.

In the bar code read-out routine shown in FIG. 11, initially, switching of the output is detected 3 times in steps 201 through 204 in order to detect that the spool shaft 11 is securely engaged with the spool driving shaft 21. Next, in step 205, "1" is set in the address number D of a RAM in which a bar code read-out signal is stored. In step 206, "24" is set in R(B) of a RAM in which the number of times of read-out is stored. Bar codes are displayed by equally numbered white and black patterns in an area divided into 24 by angular intervals of 15°. Conductive patterns 41 for detecting the rotation are arranged respectively at an angular length of 15° at angular intervals of 15°. The status of the output 1 is changed from ON to OFF, or from OFF to ON every time when the spool driving shaft is rotated 15°. Accordingly, when the number of changes of the status is detected 24 times, the bar code disk is rotated by 1 revolution. The change of the status of the output 1 is detected in step 207. When the change of the status is detected, the sequence advances to step 208, and white and black blocks are discriminated by a bar code read-out apparatus 45 such as a photoreflector, etc. The information is stored in the RAM corresponding to the address number in step 209. In step 210, R(B) is decreased by 1, and the address number is increased by 1 in step 211. In step 212, it is discriminated whether R(B) is 0 or not. If R(B) is not 0, steps 207 through 212 are repeatedly carried out to 0. If R(B) is 0, the ISO sensitivity and the number of frames of the film are set in step 213, and the number of frames of the film which has been read out is set a the number of exposable frames in step 214. Then, the bar code read-out routine is completed.

Figure 12:
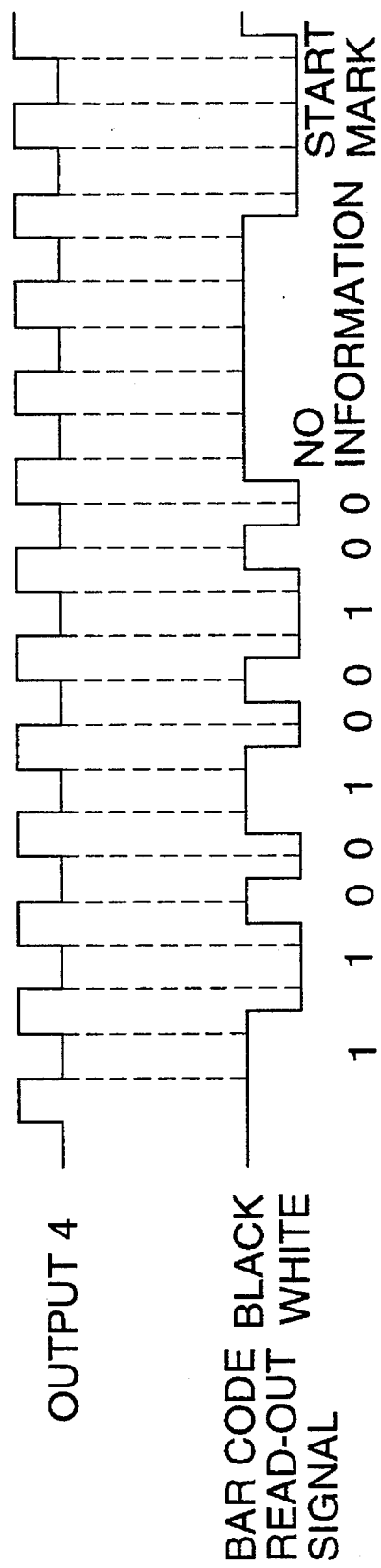
FIG. 12 is a timing chart for when the bar code is read out in the first embodiment of the present invention.

The output 1 at the time of bar-code read-out and a timing chart of the bar code read-out signal are shown in FIG. 12. When the spool driving shaft 21 is driven, the output 1 is generated. However, the spool driving shaft 21 is engaged with the spool 11 only at a predetermined angle as described above, so that, generally, the spool driving shaft 21 is not engaged with the spool shaft 11 just after the spool driving shaft 21 has been driven. Accordingly, the bar code disk 20 is not rotated, and the bar code is shown as if continuous black patterns or continuous white patterns are generated. Therefore, a false bar code read-out signal is detected. After that, when the spool driving shaft 21 is rotated at a predetermined position and is engaged with the spool 11, the bar code disk is rotated, and the true bar code read-out signal is generated. When, for example, changes in the bar code read-out signal are detected 3 times, it is considered that the spool driving shaft 21 is securely engaged with the spool shaft 11. Immediately following, the bar code is read out 24 times in timed relationship with the change in the signal of an output 4. Information such as film sensitivity, the number of exposable frames of the film, etc., is discriminated by black and white patterns which have been read out by this bar code read-out routine, and the film sensitivity R(I), and the number of exposable frames R(E) are set.

The other embodiment of the detection of engagement of the spool 11 with the spool driving shaft 21 will be described below.

Figure 14:
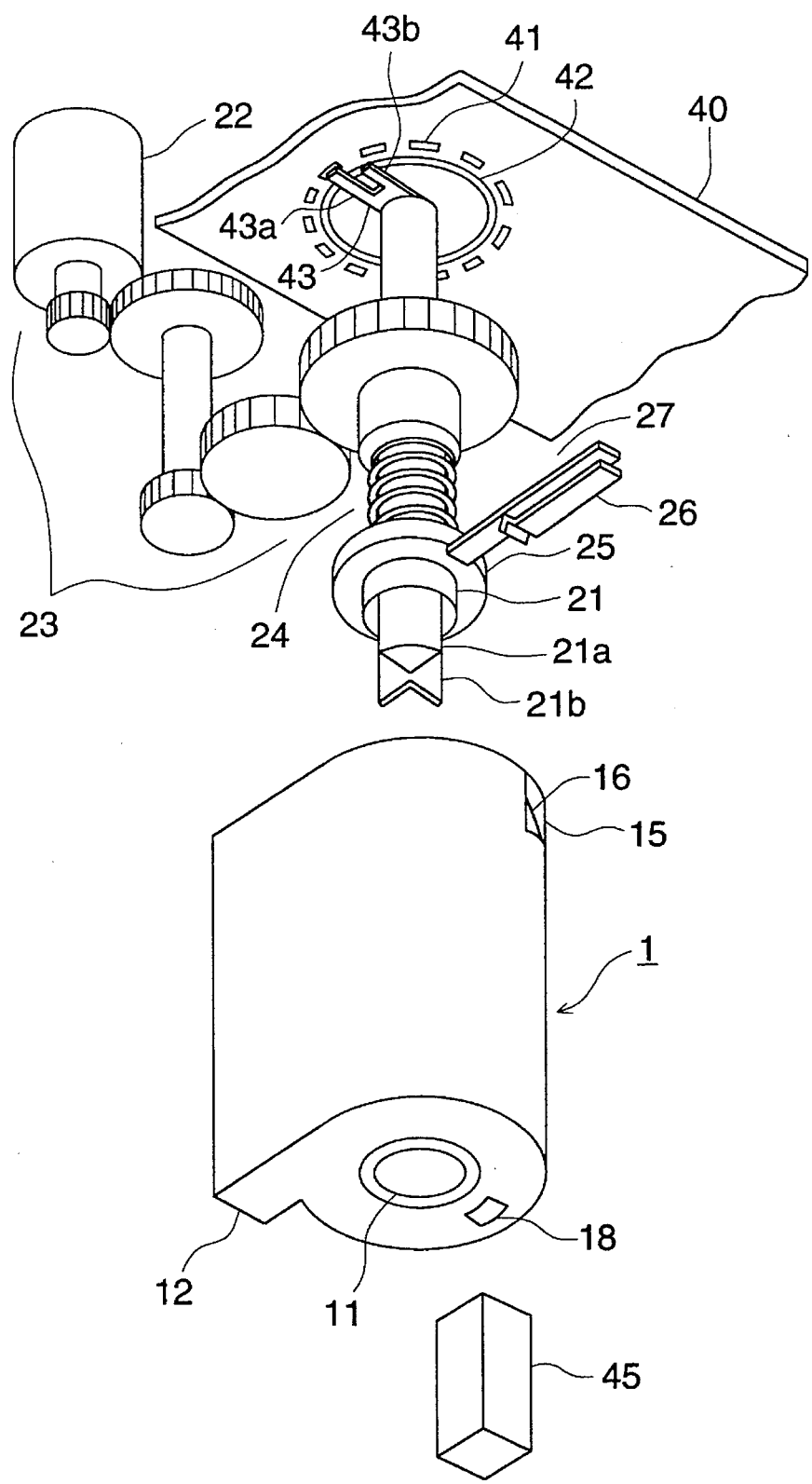
FIG. 14 is a perspective view of a camera driving mechanism in a variation of the first embodiment of the present invention.

In FIG. 14, the spool driving shaft 21 is provided with a spring mechanism 24. The spool driving shaft 21 can be withdrawn vertically against the spring force of the spring mechanism 24 so that the cartridge 1 can be loaded in the camera even when the spool 11 is not engaged with the spool driving shaft 21 when the cartridge 1 is loaded in the cartridge chamber of the camera. Even when the spool driving shaft 21 is withdrawn, the spool driving shaft 21 is rotated by the motor 22. The spool driving shaft 21 is provided with a flange 25, and with a fixed contact piece 26 and a movable contact piece 27 which follow the vertical movement of the flange 25. Normally, the fixed contact piece 26 is in contact with the movable contact piece 27, and are electrically conducted each other. When the spool driving shaft 21 is withdrawn upward, the movable contact piece 27 is separated from the fixed contact piece 26, and they are not electrically conducted each other. When this contact condition is detected, it can be determined whether the spool 11 is engaged with the spool driving shaft 21.

Further, as another embodiment, the following can be carried out. Before the engagement of the spool driving shaft 21 is detected, the spool 11 is locked so as to not be rotated in the cartridge. When the spool is engaged with the spool driving shaft, the spool driving shaft is not rotated. This is utilized for detecting engagement of the spool driving shaft. Engagement of the spool with the spool driving shaft can be detected when the status, in which a synchronizing signal is not changed for a predetermined period of time, is detected after the spool driving shaft has been rotated after the film has been loaded in the camera.

Further, the spool can be positively engaged with the spool driving shaft without using an engagement detection means when the cartridge 1 is loaded in the camera. In this case, the spool driving shaft is rotated at the same time when the spool driving shaft starts to withdraw during cartridge loading. Before the cartridge is set at a predetermined position, the engagement of the spool with the spool driving shaft is completed.

Next, the sequence returns to step 104 shown in FIGS. 10A and 10B, and it is discriminated by the photoelectric element 58 whether the leading edge of the film has passed over the photoelectric element 58. The leading edge of the film is fed into the reel chamber 54. When the leading edge of the film arrives at the reel 53, the film is wound by the reel 53 which is rotated by the film feeding motor 22 through a gear train, not shown, and thereby the film is fed. Here, perforations are detected in step 105 in order to cause the first exposable frame to face an aperture portion 51 as a photographic preparatory operation. In this embodiment, the photoelectric element 58 is located at a portion fairly close to the cartridge chamber 52 with respect to a contact portion with the aperture portion 51. Accordingly, two perforations are detected. Further, when the photoelectric element 58 is located at a portion closer to the cartridge chamber 52, three perforations will be detected. When the photoelectric element 58 is located on the reel chamber 54 side with respect to a portion in contact with the aperture portion 51, only one perforation is detected. After that, film feeding is stopped in step 106, and the photographic preparatory operation is completed.

Next, it is discriminated in step 107 whether a rewinding button SW 89 is pressed. When the SW 89 is not pressed, the sequence advances to step 108, and it is discriminated whether a release SW 79 is pressed. When the SW79 is pressed, the sequence advances to photographing operations in steps 109 through 111, and the control such as photometry, range-finding, etc., and the exposure operation such as shutter driving, etc. are carried out. When the exposure operation has been completed, film feeding is started in step 112. Then, after one perforation has been detected in step 113, a magnetic head 57 is driven by the magnetic recording apparatus, and photographic information such as the exposure value, the amount of light for photography, trimming information, object information, is magnetically recorded on the magnetic memory portion on the film in step 114. When recording has been completed, the second perforation is detected in step 115. When the second perforation is detected, film feeding is stopped in step 116. In step 117, the number of exposable frames R(K) is subtracted by 1, and it is discriminated in step 118 whether R(K) is 0 When R(K) is not 0, the sequence returns to step 106, and the next photographing operation is prepared. When R(K) is 0, it is discriminated that all frames of the film have been exposed, and the sequence advances to step 119 so that film re-winding is started. Film re-winding is carried out when the feeding motor 22 is reversely rotated and the spool driving shaft 21 is reversely rotated, and the film is re-wound into the cartridge 1. In step 120, the number of perforations to be detected during the re-winding operation is calculated. As described above, the film has two perforations for each frame, and therefore the value of two times the number of exposable frames R(E) is stored in R(P). Next, R(P) is subtracted by 1 in step 122 every time when the perforation is detected in step 121. In step 123, it is discriminated whether R(P) is 0, and steps 121 through 123 are repeatedly carried out until R(P) is 0. When R(P) is 0 and it is detected that film re-winding has been completed to the first frame, then, information showing that all the film have been exposed, is recorded in the magnetic memory portion positioned on the leading edge portion of the film by the magnetic recording apparatus in step 124. The leading edge of the film is detected by a perforation detection apparatus 88 in step 125. Here, when it is recognized that the leading edge of the film has passed, the sequence adequately waits for a predetermined period of time so that the leading edge of the film is positively wound into the cartridge in step 126. This time is determined by experiments depending on a film feeding speed, the distance from the perforation detection apparatus to the cartridge, etc. After that, 0 is set in an exposed flag F(U) in step 127. Next, the sequence enters into an exposure display setting routine 300.

The relationship of the bar code disk 20 with the spool is defined as follows. When the spool 11 is topped so that the reference position of the bar code is located at the position opposed to the photoelectric element 45 which is a bar code reading out means, it is displayed that the film is not exposed. When the spool 11 is stopped at the position having an angular interval of 120° (corresponding to 8 blocks of the bar code) from the reference position, it is displayed that all the frames of the film have been exposed. When the spool 11 is stopped at the position having an angular interval of 240° (corresponding to 16 blocks of the bar code) from the reference position, it is displayed that the film is only partially exposed.

In a film exposure display setting routine 300, the number "4" is set in R(W) in order to detect the reference position (after sequential 4 white blocks) in step 301. Next, the bar code is read every time when the output 1 is switched, in steps 302 through 305, and the 4 sequential white blocks are detected. In step 306, it is discriminated whether the film is partially exposed or completely exposed. In steps 307 and 308, the number of switching times of the output 1 is set in R(C). In this case, 8 is set in R(C) when the film is exposed, and 16 is set when the film is partially exposed. In steps 309 through 311, R(C) is subtracted by 1 each time when the output 1 is switched. Re-winding is stopped in step 312 when R(C) is 0, and the sequence is completed and returns to the initial position.

Next, operations conducted when a partially exposed film re-winding button SW89 is pressed in step 106, will be described below. Since the partially exposed film re-winding button SW 89 directs non-automated re-winding the partially exposed film, film re-winding starts when the spool driving shaft 21 is reversely rotated in step 151. Next, the number of perforations to be detected during film re-winding is detected in step 152. This number is twice the difference between the number of predetermined exposable frames R(E) and the number of exposable frames R(K), that is, the difference is the number of exposed frames. The detected number of perforations are stored in R(P). Next, R(P) is subtracted by 1 in step 154 every time when a perforation has been detected in step 153. It is discriminated in step 155 whether R(P) is 0, and operations in step 153 through 155 are repeated until R(P) is 0. When it is detected in step 155 that R(P) is 0 and film re-winding has been completed to the first exposed frame, then, information showing the number of exposed frames and information showing the number of partially exposed frames is magnetically recorded in the magnetic memory portion on the leading edge of the film by a magnetic recording apparatus in step 156. The leading edge of the film is detected by a perforation detecting apparatus in step 157. When it is detected that the leading edge of the film has passed, the program sequence stops for an appropriate period of time so that the leading edge of the film is securely wound into the cartridge in step 158. This time is experimentally determined depending on the distance from the perforation detecting apparatus to the cartridge, etc. After that, "1" is set in flag F(U) in step 159, and the sequence advances to the foregoing film exposure display setting routine 300. After film re-winding has been completed, it is discriminated by a cartridge loading detection SW 74 in step 160 whether the cartridge is taken out. When the cartridge is taken out, the sequence is completed.

The partially exposed cartridge can also be loaded into the cartridge chamber other than in the first embodiment described above. In this other case, information showing 'exposed' is read out by a magnetic head during film feeding, and only unexposed frames are available for further photography.

Further, the present invention can also be applied in a camera having no magnetic head. However, in such a case, since information showing 'exposed' can not be recorded, the film is inevitably regarded as 'exposed' when the partially exposed film is re-wound.

Further, a sequence by which the spool is unconditionally stopped at a position showing 'exposed', can be adopted when the partially exposed film is wound.

There are conventional problems as follows: the reference signal corresponding to the rotation of the spool driving shaft is outputted even when the spool shaft of the cartridge is not yet engaged with the spool driving shaft immediately after the spool driving shaft has been rotated; the camera reads the stopped bar code as if the same patterned bar codes are continued even when the bar code disk is stopped; and an erroneous reading-out reference position is read, so that erroneous information is read. According to the first embodiment of the present invention, even when a detection means, by which the engagement of the spool driving shaft and the spool shaft is detected, is not provided in the camera, the above-described problems are not caused, and a lower cost camera by which film information can be read, can be realized.

Referring to FIGS. 15 through 47, the second embodiment of the present invention will be described in detail below.

Initially, referring to FIGS. 15 through 18, a film and a cartridge which are used for the present invention will be described below.

Figure 15:
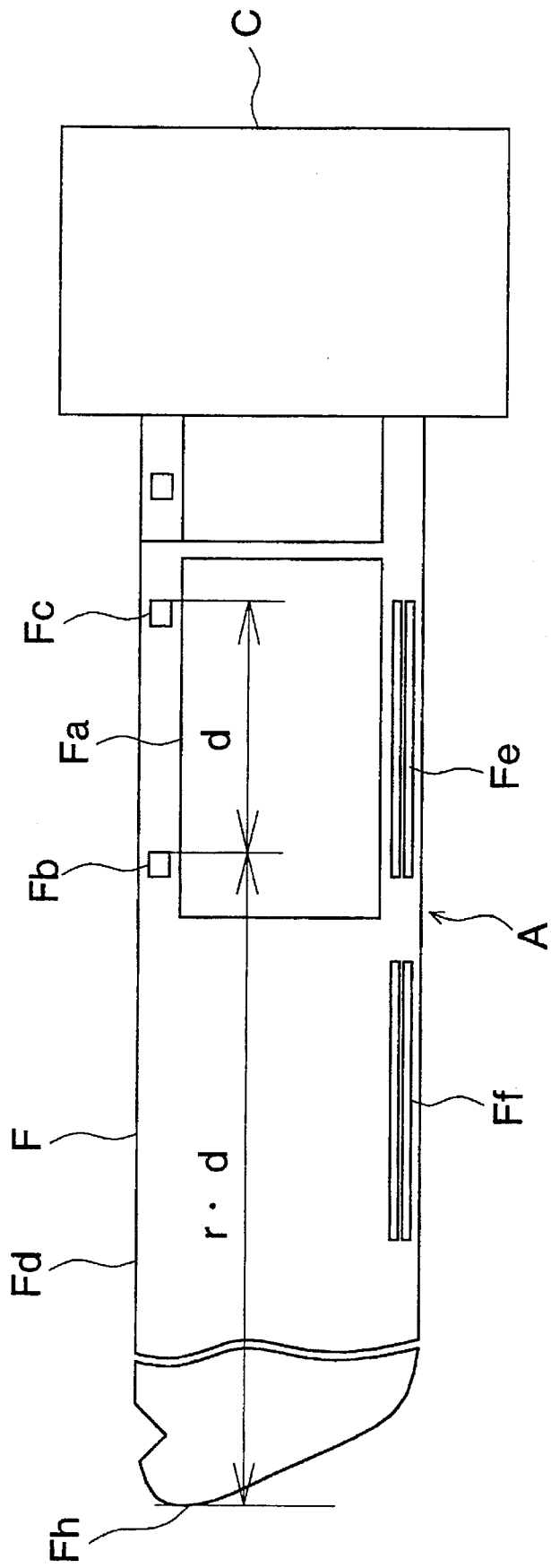
FIG. 15 is a front view of the film pulled out from the cartridge.

FIG. 15 is a front view showing the condition in which a film is pulled out of the cartridge. In FIG. 15, two perforations Fb and Fc are provided at one side edge of each frame of the film with respect to the picture taking area Fa, and no perforations are provided on the tongue portion Fd of the film. Two magnetic tracks Fe on which a magnetic layer is coated are provided at the other side edge of each frame of the film F with respect to the picture taking area, and photographic information such as color temperature of the light source, the brightness of the photographic object, single shot or continuous photography, the type of camera, owner's ID, trimming information, the date of photography, the photographer's memorandum, exposed/unexposed information of the film, etc., are recorded on the magnetic tracks by the magnetic head provided in the camera. This information is used at the time of print processing after the film has been developed. The magnetic track Ff is also provided on the other edge of the tongue portion Fd of the film F. Film information such as the manufacturer's name, type of the film, the emulsion lot, the sensitivity, the number of exposable frames, the film latitude, the date of manufacture, etc., is recorded on the magnetic track Ff at the time of manufacture of the film. This information is reproduced by a reproducing head provided in the camera, and functions of the camera are automatically set corresponding to the film. However, the magnetic track Ff is used not only for reproducing the information, but is also sometimes used for recording photographic information. Accordingly, magnetic space for recording such information is provided on the magnetic track Ff.

A hi-vision sized image plane, the horizontal length of which is greater than that of the conventional image plane size in which the ratio of vertical height to the horizontal length is 2 to 3, is possible when the maximum photographic area on the film is used. When both ends of the image plane are trimmed according to the photographic information which is magnetically recorded at the time of printing, a normal-sized print is formed in which the ratio of the vertical length to the horizontal length is 2 to 3. When the upper and lower edges are trimmed, a panorama-sized print is formed, in which the ratio of vertical length to the horizontal length is smaller than that of the hi-vision sized print.

All the film F is accommodated in the cartridge including the tongue portion when the film is unexposed, or after the film has been completely exposed. Further, in order to securely feed the tongue portion Fd of the film from the cartridge C, PEN (polyethylene naphthalate), since the thickness of the film base formed of PEN can be thinner than that formed of TAC or PET. The tensile strength of PEN is also greater than that of TAC or PET, so that PEN is used for the film base material.

A film exposure state displaying window for displaying the exposure state of the film is provided on the cartridge C as described later.

Figure 16:
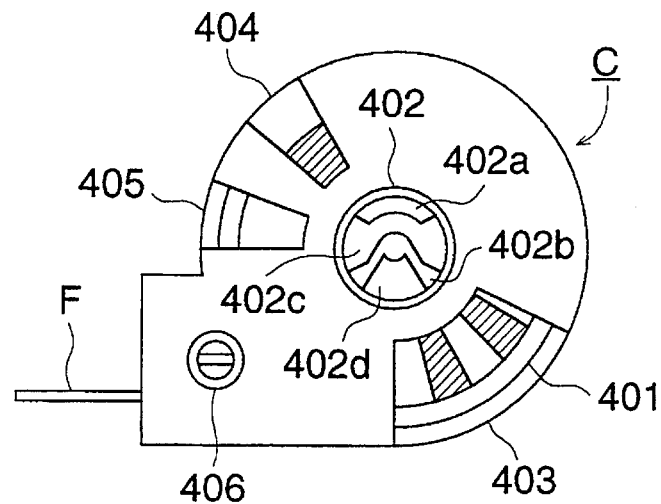
FIG. 16 is a plan view of the cartridge.
Figure 17:
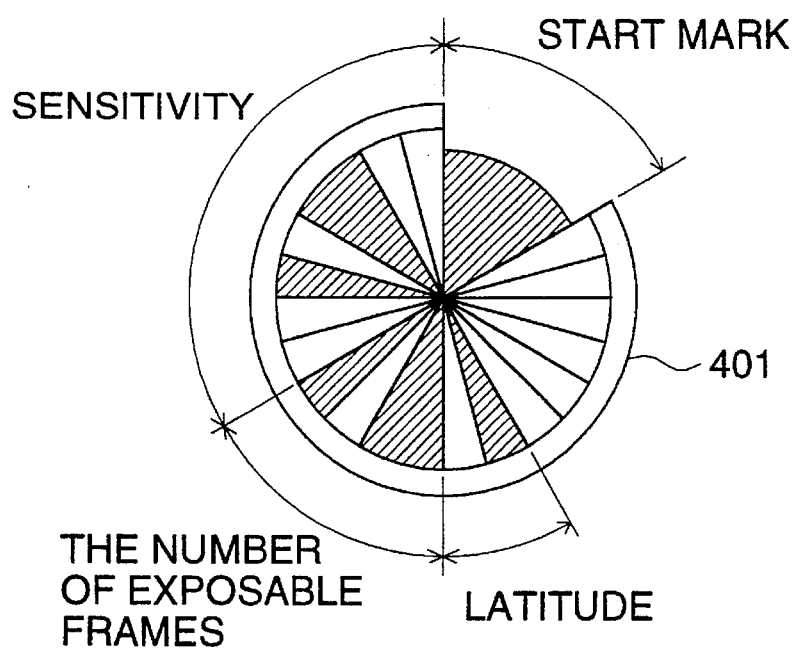
FIG. 17 is a plan view of a bar code disk.
Figure 18:
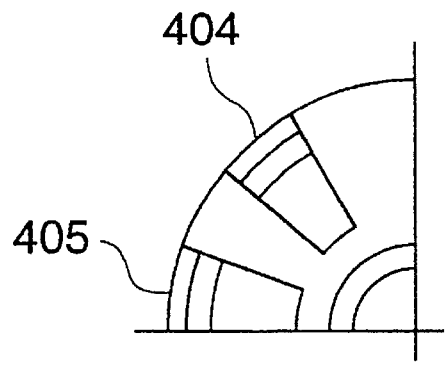
FIGS. 18(A) and 18(B) are views showing the conditions under which the film is used.
Figure 18:
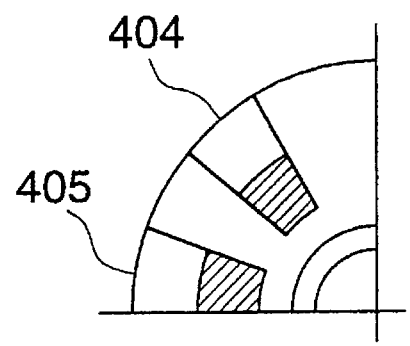

FIG. 16 is a plan view of the cartridge C. A bar code disk 401 is accommodated in the cartridge C at one end portion of the space in which the film F is housed. The bar code disk 401 is assembled in such a manner that the disk can be integrally rotated with the spool 402. FIG. 17 is a view showing the bar code disk. The bar code formed on the bar code disk 401 has film information corresponding to the conventional DX code indicating the film sensitivity, the number of exposable frames, etc. The bar code disk 401 is divided into 24 areas at angular intervals of 15°. The information of the film is recorded on the rotatable bar code disk according to a rule in which, for example, the reference position expressing the start of information is recorded by white and black patterns when black patterns of 4 successive blocks appear, [1] is expressed when the same colors of 2 blocks successively appear, and [0] is expressed when only one color block appears. Information having a total of 10 bits composed of 5 bits for film sensitivity, 3 bits for the number of exposable frames and 2 bits for latitude, is shown by the bar code disk. When the standard of films and cameras is unified, it may be acceptable that one block of the bar code is formed at angular intervals other than 15°, the bar code disk is divided into areas other than 24, and information recording rules are different from the above-described one.

The rotatable bar code disk 401 is structured in such a manner that it can be seen through a bar code window 403. Film information is read out by a photoelectric element composed of a photoreflector, which is provided at a portion of the camera main body opposed to the bar code window 403, when the cartridge is loaded into the camera. The information is photoelectrically read out while a spool 402 is being rotated. Further, the film exposure condition is displayed through the film exposure condition displaying windows 404 and 405. When a long radius cam and a short radius cam are visible through the windows as shown in FIG. 16, it is expressed that the film is only partially exposed, in the case where the film has been forcibly re-wound before all the film have been exposed, after the cartridge has been loaded into the camera. When two cams, each having a large radius, are visible through the windows as shown in FIG. 18(A), it is expressed that the film is unexposed. When two cams, each having small radius, are visible through the windows as shown in FIG. 18(B), it is expressed that the film has been exposed.

The spool 402 has protruded portions 402a, 402b, and recessed portions 402c and 402d, and the spool shaft on the camera side, which will be described later, is engaged with these portions.

There is a possibility that light may leak into the cartridge through a film feeding slit of the cartridge C onto the unexposed or exposed film F. Accordingly, a rotatable shutter (not shown in the drawings) is provided at the film feeding slit. When the cartridge C is loaded into the camera, a rotary shutter shaft 406 is rotated being interlocked with the close movement of the cartridge cover and the rotatable shutter is opened. When the cartridge C is taken out of the camera, the rotatable shutter shaft 406 is rotated before the cartridge cover opens being interlocked with the start of the open movement of the cartridge cover, and the rotatable shutter is closed.

Figure 19:
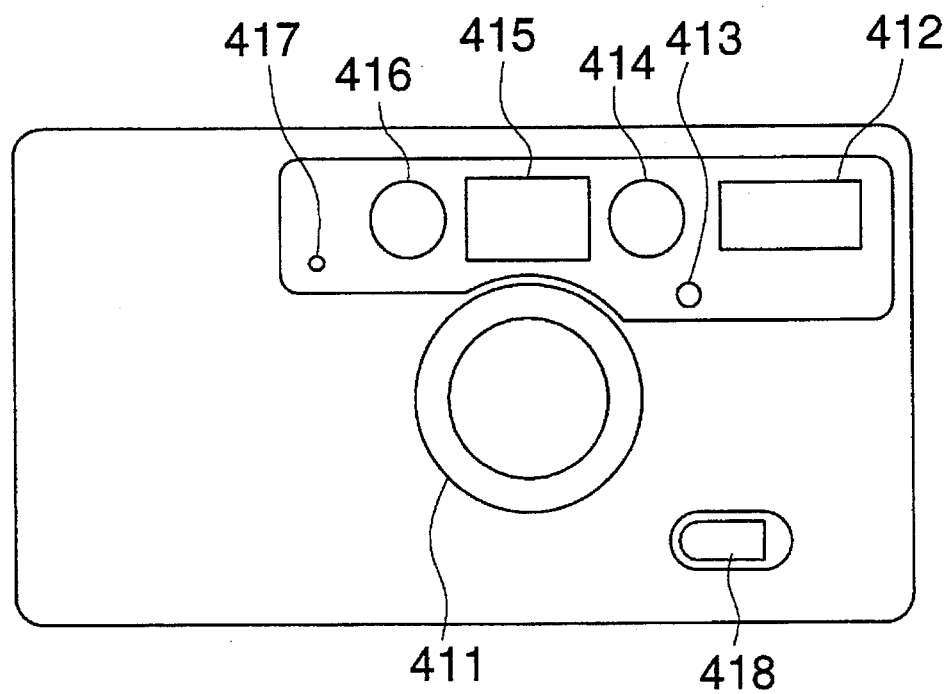
FIG. 19 is a front view of the camera in the second embodiment of the present invention.

Next, the camera in which the cartridge C having therein the above-described film F is loaded, will be described below. FIG. 19 is a front view of the camera, FIG. 20 is a plan view of the camera, FIG. 21 is a rear view of the camera, and FIG. 21 is a bottom view of the camera.

In FIG. 19, a lens barrel for a photographic lens 411 is provided at the center of the camera. A strobe light emitting portion 412 for automatically emitting strobe light at the time of low brightness, a photometry window 413 for metering the brightness of the photographic subject, an AF light projection window 414 for projecting infrared rays for automatic focusing, a viewfinder window 415 for confirming the photographic subject, an AF light receiving window 416 for receiving infrared rays reflected from the photographic subject, and a self-timer LED window 417 for displaying the operational condition of the self-timer with light are respectively provided on the front upper right side of the camera. Further, in the lower right portion of the camera, a format switching button 418 is provided for switching the print format information to magnetically or optically record the following signals onto the film: a signal for forming a panorama-sized print, in which the upper and lower ends of the image are trimmed with respect to the hi-vision size which is the standard size of the camera, or for forming a normal-sized print, in which the left and right ends of the image are trimmed with respect to the hi-vision size and the ratio, of the vertical length of the print to the horizontal length of the print, is 2:3.

Figure 20:
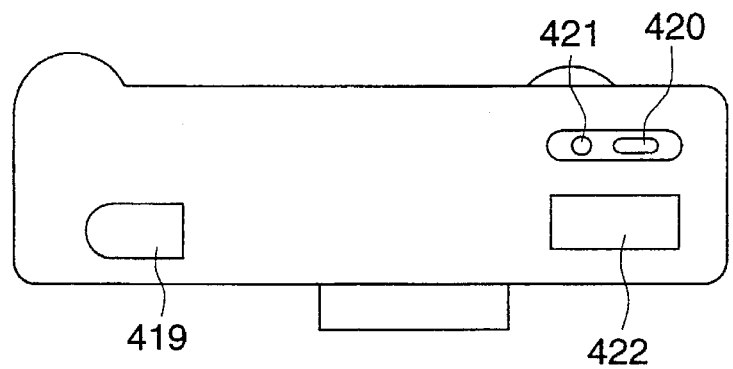
FIG. 20 is a plan view of the camera in the second embodiment of the present invention.

In FIG. 20, a release button 419 for releasing the shutter is provided at the lower left portion of the camera. A date operational portion for magnetically recording a date signal on each exposed frame of the film is provided at the upper right portion of the camera. In this date operational portion, a mode button 420 for switching the date mode such as year-month-day, day-time-minutes, or no data; and a date set button 421 for correcting characters of this data are provided. An LCD 422 for displaying the date, the number of exposed frames of the film, and types of modes is provided at the lower right portion of the camera.

Figure 21:
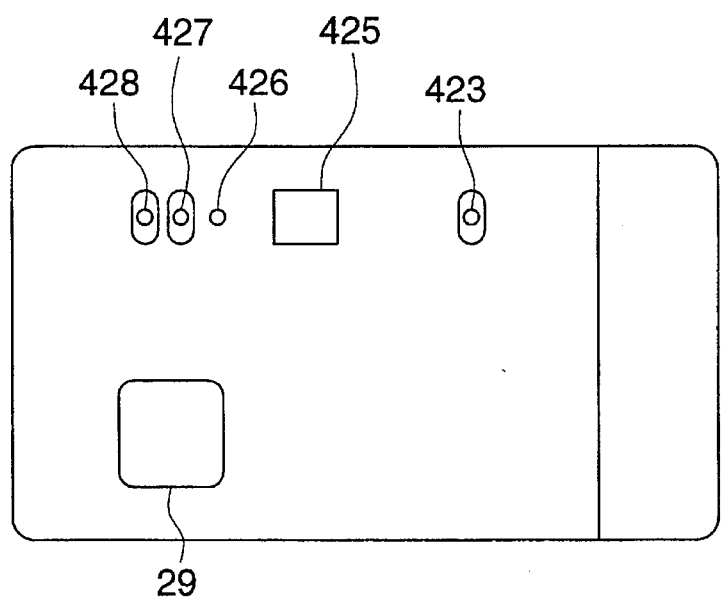
FIG. 21 is a rear view of the camera in the second embodiment of the present invention.

In FIG. 21, a main switch button 423 by which $S_0$ in the power supply circuit in the camera is turned on and the lens barrel 411 for photographic lens extends when the button is pressed, and the lens barrel retracts when the button is further pressed, is provided at the upper right portion of the back of camera. An eye piece window 425 for looking in at the viewfinder, a re-winding button 426 for forcibly re-winding any partially exposed film, a self-timer button 427 for setting the camera to the self-timer mode, a mode selection button 428 by which the flashing mode of the strobe unit is switched to an automatic flashing mode, a pre-light-emission mode for preventing "red eye", a forced-flashing mode, or a no-flash mode, are respectively provided at the upper portion of the back of the camera. In this connection, numeral 429 is a protruded portion which houses the magnetic head.

Figure 22:
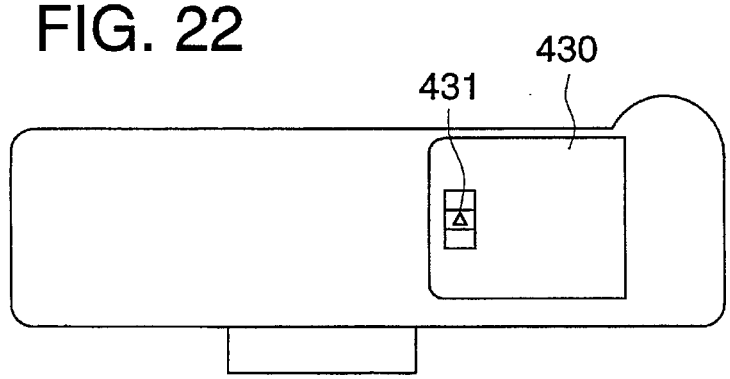
FIG. 22 is a bottom view of the camera in the second embodiment of the present invention.

In FIG. 22, a cartridge cover 430 for accommodating the cartridge C and a cartridge button 431 for opening the cartridge cover 430 are provided.

Figure 23:
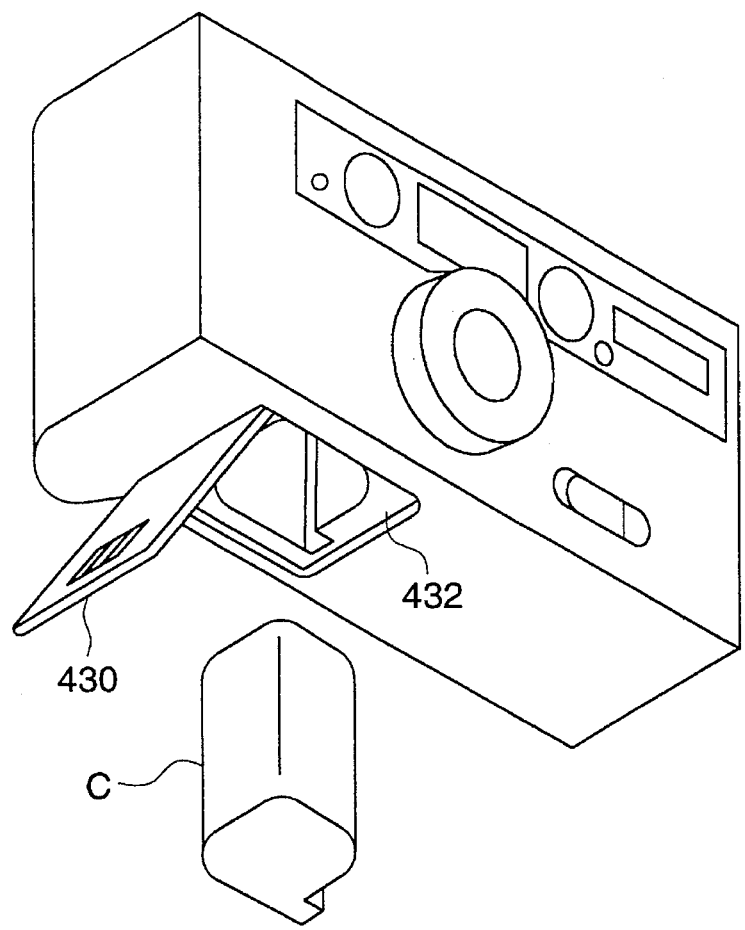
FIG. 23 is a view of cartridge loading into the cartridge chamber of the camera in the second embodiment of the present invention.

FIG. 23 is a view showing the condition in which the cartridge cover 430 of the above-described camera is opened and the cartridge C is dropped in the cartridge chamber 432. The shape of the cartridge C may be the same as that shown in the drawing.

Figure 24:
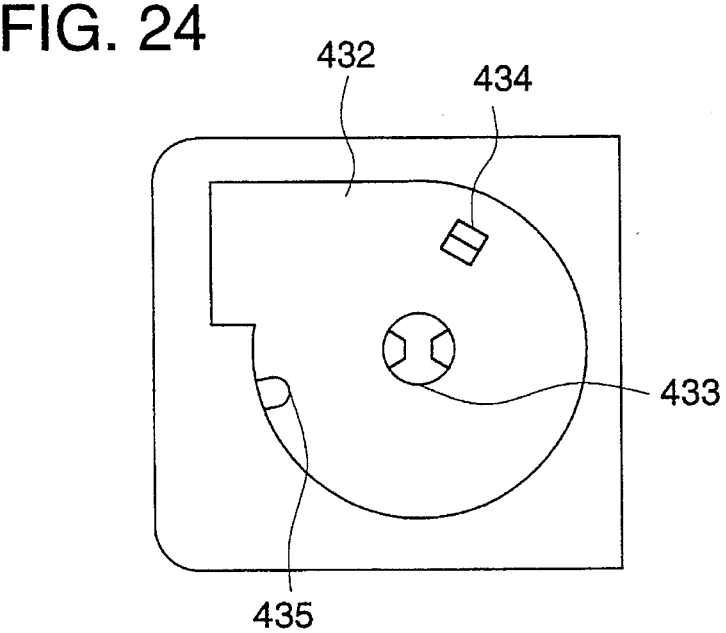
FIG. 24 is a view of the cartridge chamber viewed from the cartridge cover side of the camera in the second embodiment of the present invention.

FIG. 24 is a view of the cartridge chamber 432 viewed from the cartridge cover side 430. A spool shaft 433 which is engaged with the spool 402 of the cartridge C is vertically provided at the center of the cartridge chamber. A photoreflector 434 which is a bar code reading-out means for reading the bar code on the bar code disk 401 is provided at the upper right portion in the drawing. As described above, the bar code disk 401 is rotated, and the film sensitivity, the number of exposable frames of the film, and a latitude of the film are read and stored in an $E^2$PROM in the camera. A cartridge detection pin 435 which normally protrudes into the cartridge chamber 432 by the force of a spring, and withdrawn from the cartridge chamber when the leading edge of the pin is pressed, is provided at the lower left portion in the drawing.

Figure 25:
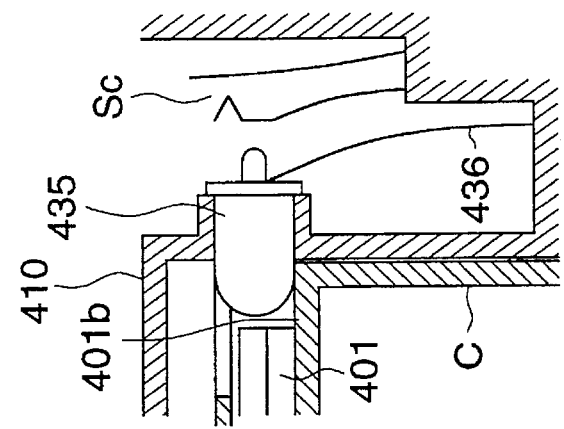
FIGS. 25(A), 25(B), and 25(C) are views showing operations of the cartridge and a cartridge detection pin in the camera of the second embodiment of the present invention.
Figure 25:
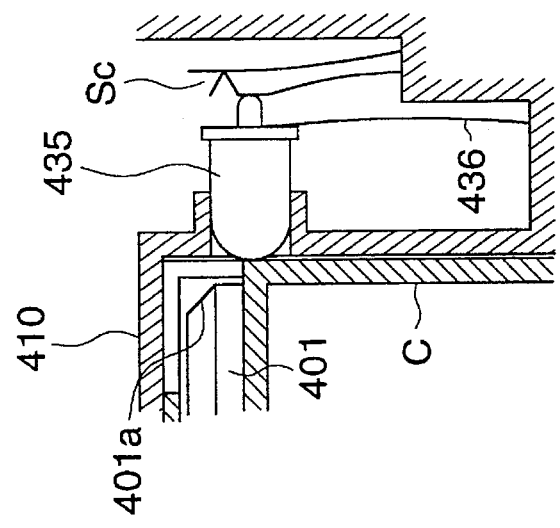
Figure 25:
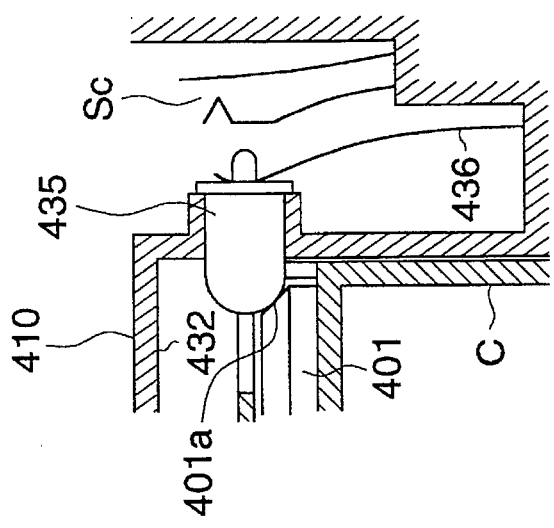

FIG. 25 is a view showing the cartridge C and operations of the cartridge detection pin 435. The cartridge detection pin 435 is provided at the position corresponding to the film exposure condition display window 405 shown in FIG. 16. Accordingly, the unexposed or partially exposed cartridge C can be loaded into the cartridge chamber, but only an exposed cartridge C can not be loaded in the cartridge chamber. The cartridge detection pin 435 is embedded in the main body 410, and the leading edge thereof protrudes into the cartridge chamber 432 by a spring 436. When the bar code expressing other than the start mark on the bar code disk 401 is positioned at the film exposure condition display window 404 or 405, the cartridge detection pin 435 is positioned at the edge 401a of the bar code disk 401 as shown in FIGS. 25(A) and 25(B), and the cartridge C can be slidably loaded into the cartridge chamber. When the start mark on the bar code disk 401 is positioned at the window 404 or 405, the cartridge detection pin 435 comes into contact with a step portion 401b of the cartridge C, and accordingly, the cartridge C can not be loaded into the cartridge chamber.

Figure 26:
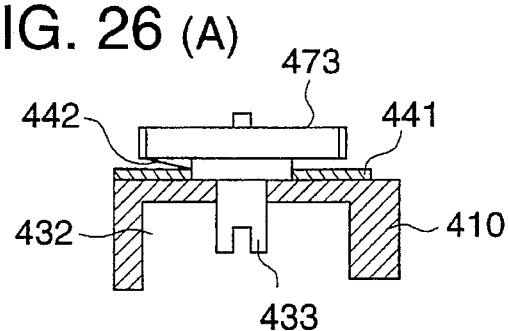
FIGS. 26(A) through 26(F) are views of a pulse generating mechanism in the camera of the second embodiment of the present invention.
Figure 26:
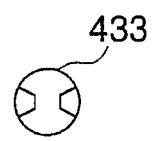
Figure 26:
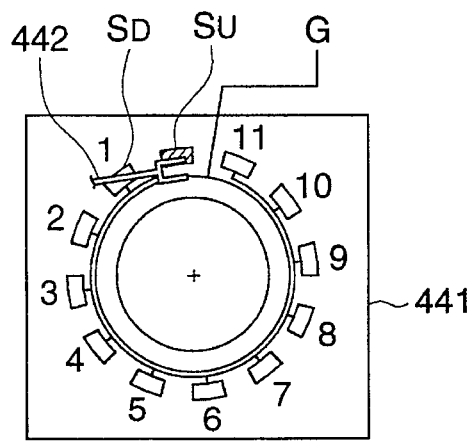
Figure 26:
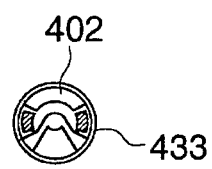
Figure 26:
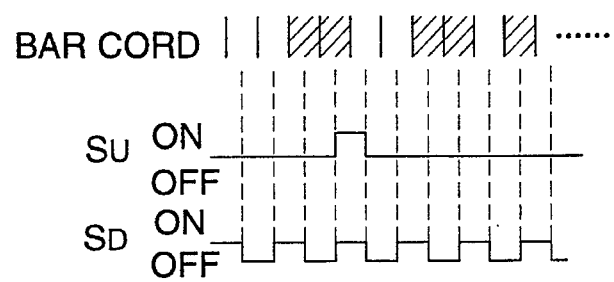
Figure 26:
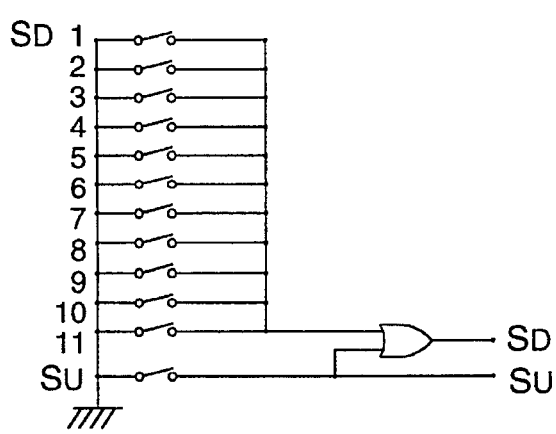

FIG. 26 is a view showing a pulse generating mechanism for generating timing pulses for reading out the bar code, and for detecting the phase of rotation of a spool shaft 433. FIG. 26(A) shows a sectional view of the upper portion of the cartridge chamber 432. FIG. 26(B) is a bottom view of the spool shaft 433. FIG. 26(C) is a view of a printed circuit board for pulse generation. FIG. 26(D) is a view showing the condition in which the spool 402 of the cartridge C is engaged with the spool shaft 433.

In FIG. 26(A), a spool gear 473, the drive of which will be described in detail later, is provided on the upper portion of the main body 410, and is integrally formed with the spool shaft 433 and can be rotated. A pulse generating printed circuit board 441 as shown in FIG. 26(C) is fixed on the upper portion of the main body 410. The leading edge of a contact strip 442 fixed to the lower portion of the spool gear 473 comes into contact with the pattern of the pulse generating printed circuit board 441 and is electrically conducted with the pattern of the printed circuit board. $S_U$ is a signal pattern of the switch which expresses a reference position, and outputs the same signal as that of $S_D$ through an OR circuit as shown in a partial circuit diagram in FIG. 26(F). In FIG. 26(F), $S_D$ 1 through 11 compose a pattern of the reference pattern switch which generates the reference pulse, and G is a ground.

This camera is structured in such a manner that the spool shaft 433 is automatically set at the angle at which an unexposed or partially exposed cartridge C can be loaded in the cartridge chamber after a fully exposed cartridge C has been taken out of the camera. That is, after film re-winding has been completed and the cartridge C has been taken out of the camera, a film feed motor, which will be described later, is automatically rotated again in the re-winding direction, and stops when the contact strip 442 has detected the pattern $S_U$ ON. At this time, the spool 402 is located at the position shown by FIG. 26(B). Further, the phase of the spool 402 of an unexposed cartridge C is 180° different from that of the spool 402 of a partially exposed cartridge C, and the spool 402 can be engaged with the spool shaft 433 in either case without any rotation.

When re-winding has been completed, the spool shaft 433 is controlled so that the spool 402 of the cartridge C stops at the position displaying each film exposure state. For this control, the number of pulses generated from the pulse generating printed circuit board 441 are used. That is, $S_D$ pulses are counted from the position of $S_U$ ON and film re-winding stops. For example, when the unexposed cartridge C is loaded, in the case where the film is unexposed and re-wound:
the spool stops at the position of $S_U$ ON, and an "unexposure" display is set,
in the case where the film is partially exposed and re-wound:
the spool stops at the sixth $S_D$ ON counted from the position of $S_U$ ON, and a "partially exposed" display is set,
in the case where the film is fully exposed and re-wound:
the spool stops at the seventh $S_D$ ON counted from the position of $S_U$ ON and a "exposed" display is set,
when the partially exposed cartridge C is loaded, in the case where the film is partially exposed and re-wound:
the spool stops at $S_U$ ON, and a "partially exposed" display is set,
in the case where the film is fully exposed and re-wound:
the spool stops at the first $S_D$ ON counted from the position of the $S_U$ ON and an "exposed" display is set.

FIG. 26(E) is a timing chart for reading the bar code by pulses generated from a pulse generating printed circuit board 441. The bar code is read at the timing of the total 24 ONs and OFFs of the $S_U$ and $S_D$. Accordingly, even when the rotational speed of the spool shaft 433, that is, the rotational speed of the bar code disk 401 is not uniform, the reading out timing is secured, and the bar code is correctly read out.

In FIG. 26 (F), the reference position switch $S_U$ can also be used as the reference pulse switch $S_D$. These switches are shown by the equivalent circuit shown in FIG. 26(F). Switches $S_{D1}$ through $S_{D11}$ are common to each other and inputted into an OR circuit. The $S_U$ is inputted into the $S_D$ also through the OR circuit, and is also inputted into the terminal $S_U$ separately. Here, when any of 12 switches is conducting, the $S_D$ is ON, and only when the $S_U$ is ON, the $S_D$ and $S_U$ are ON.

Figure 27:
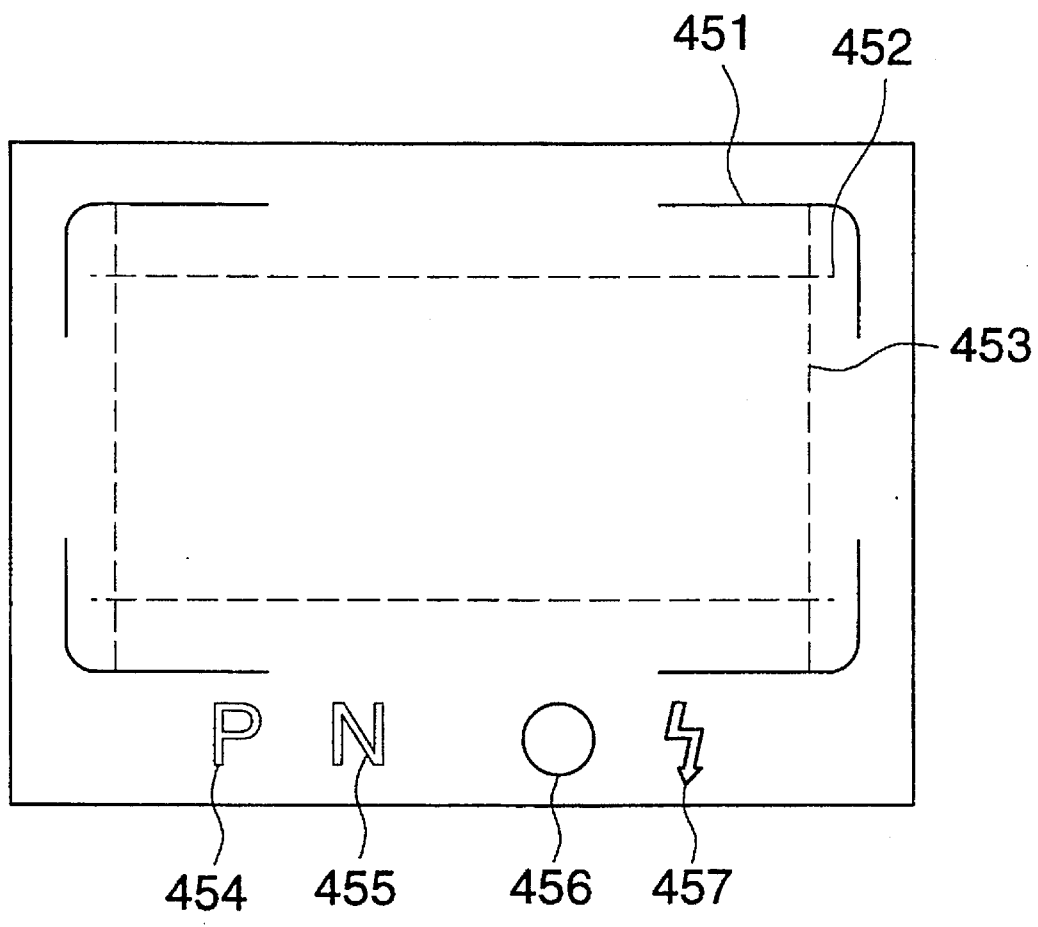
FIG. 27 is a view showing the field of view of a view finder of the camera in the second embodiment of the present invention.

FIG. 27 is a view showing the visual field of the viewfinder. A frame of the visual field of the hi-vision size 451, which is a standard size, a frame of the visual field of the panorama size 452, and a frame of the visual field of the normal size 453 are provided in the viewfinder. When a format switching button 418 shown in FIG. 19 is pressed and the panorama size is selected, the panorama size green display 454 is lit, and when the normal size is selected, the green normal size display 455 is lit. Further, when the release button 419 is pressed and view-finding is adequately conducted, a green AF mark 456 is lit. When the strobe unit is being charged, or the brightness of the photographic object is low, a red strobe mark 457 is lit.

Figure 29:
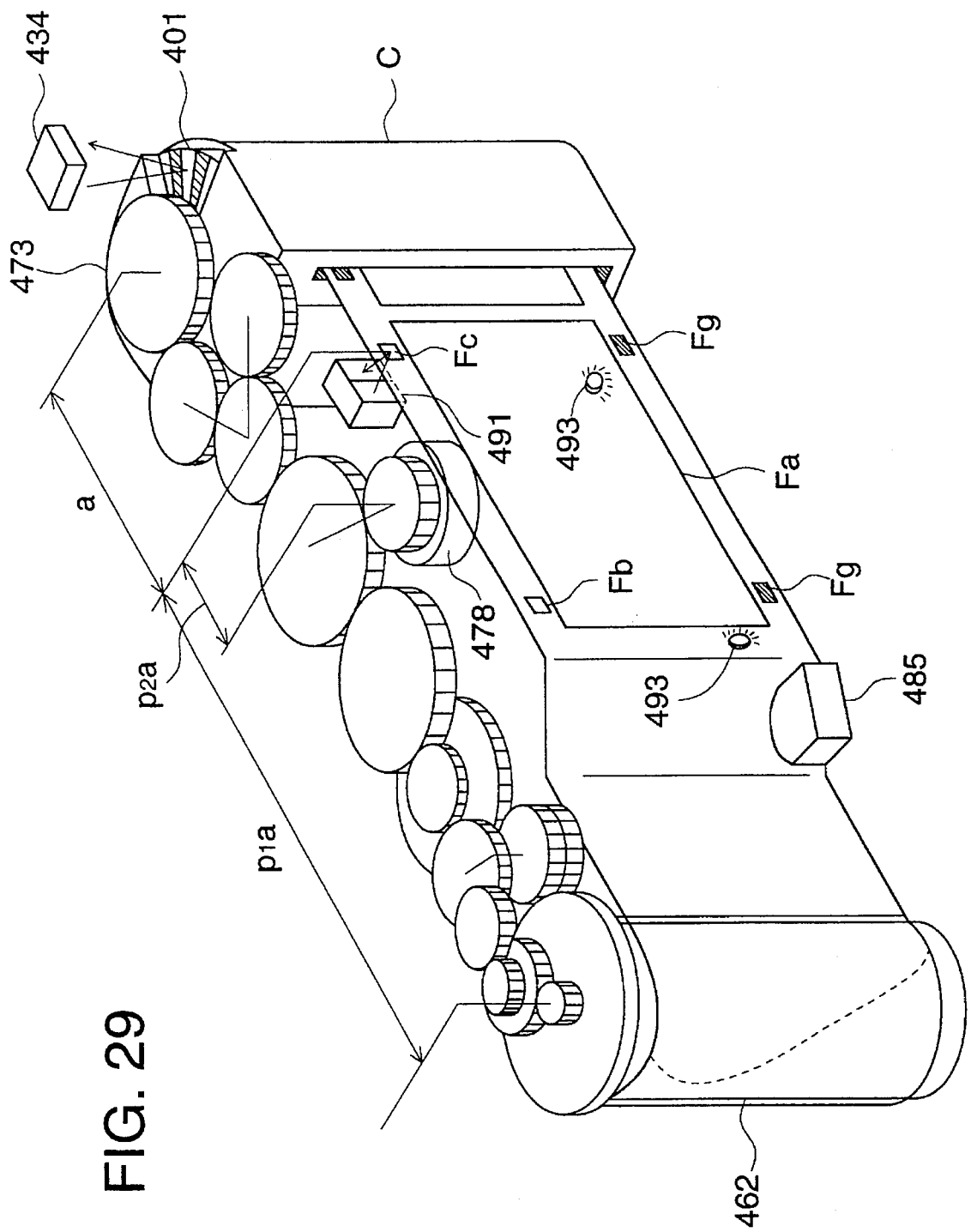
FIG. 29 is a perspective view of the film feeding mechanism of the camera in the second embodiment of the present invention.

Next, a film feeding mechanism, by which all the frames of the film are re-wound in the cartridge 401 after the film F has been taken out of the cartridge by individual frames, and all the frames have been re-wound into the cartridge 401, will be described below. FIG. 28 is a plan view of the film feeding mechanism, and FIG. 29 is a perspective view thereof.

In FIG. 28(A), a feeding motor 461, which is a driving power source for film feeding, is accommodated in a reel 462, around which the film F fed out of the cartridge C is wound. A motor pinion 463, which is directly coupled with the rotational shaft of the film feeding motor 461 is provided on the reel 462. The driving force supplied from the motor pinion 463 is transmitted to the second sun gear 470 through intermediate gears 464, 465, the first sun gear 466, intermediate gears 467, 468, and the fourth sun gear 469. When the film F is wound around the reel 462 from the cartridge C, the motor pinion 463 is rotated counterclockwise, and the second sun gear 470 is rotated clockwise. Accordingly, the second planetary lever 471 linked to the second planetary gear 472 which is engaged with the second sun gear 470, is rotated clockwise, and the second planetary gear 472 is engaged with the spool gear 473, and the spool gear 473 is rotated clockwise. When the film F is re-wound into the cartridge C from the reel 462, the motor pinion 463 is rotated clockwise and the second sun gear 470 is rotated counterclockwise. Then, the second planetary lever 471 linked to the third planetary gear 474 which is engaged with the second sun gear 470, is rotated counterclockwise, the third planetary gear 474 is engaged with the spool gear 473, and the spool 2 of the cartridge C is rotated counterclockwise together with the spool gear 473.

The first planetary lever 476 linked with the first planetary gear 475 which is engaged with the first sun gear 466, is rotated clockwise when the film is wound up. A reel gear 477 is driven by the first planetary gear 475, and the reel 462 is rotated clockwise together with the reel gear 477. When the film is re-wound, the first planetary lever 476 is rotated counterclockwise, and the driving force of the first planetary gear 475 is not transmitted to the reel gear 477, that is, the driving force of the film motor 461 is not transmitted to the reel 462.

In the film feeding mechanism as described above, when the film motor 461 is rotated counterclockwise, the spool 402 in the cartridge C is rotated clockwise, and the tongue portion $F_D$ of the film is fed between a rail surface of the main body, not shown in the drawings, and a pressure plate. Further, the film F is fed out when the spool 402 is rotated. However, when the tongue portion $F_D$ of the film F passes over a magnetic head 485 and the camera body, the film F is deformed near the connected portion of the spool 402 to the film F due to a mechanical feeding load, and there is a possibility that the film may not be stably fed. Therefore, a driving roller 478 is provided, and after the tongue portion Fd of the film F has been fed out, the film is fed to the reel 462 by the driving force of the driving roller 478. Accordingly, when the film F passes between a magnetic head 485 and the camera body, an excessive load is not applied to near the portion where the film F is contacted with the spool 402, so that the film is stably fed.

A pressure plate 481 is pressure-contacted with the rail surface of the main body by pressure plate springs 482. A pressure plate roller 483 which is coaxially and integrally structured with a shaft of the pressure plate 481, is directly opposite to the fourth planetary gear 479 and almost centered on the pressure plate 481. The fourth planetary gear 479 is linked with the fourth planetary lever 480 and engaged with the fourth sun gear 469. In this connection, the center of the fourth sun gear 469 is provided closer to the cartridge C with respect to the center of the fourth planetary gear 479.

When the film motor 461 is rotated counterclockwise, the fourth sun gear 469 is also rotated counterclockwise, and then the fourth planetary lever 480 is also rotated counterclockwise. Accordingly, the driving roller 478 conveys the film F to the reel 462 while the film is being sandwiched between the driving roller 478 and the pressure plate 481. The film feeding speed of the driving roller 478 is set higher than that of the spool 402, and the peripheral speed of the spool gear 473 is made larger due to the film F than that of the second planetary gear 472. Accordingly, the second planetary gear 472 is rotated counterclockwise, and disengaged from the spool gear 473. Therefore, the feeding force of the film F is transmitted only from the driving roller 478. Further, even when the film F is subjected to feeding resistance by the pressure plate 481 and the magnetic head 485, because the film is fed by the driving roller 478, the film F can be fed without being deformed in the cartridge C.

Of course, the driving roller 478 is provided at one end of the outside of the picture area. A pressure plate roller 483 is provided in the pressure plate 481, as shown in FIGS. 28(A), 28(B), and 28(C), and is opposite to the driving roller 478.

FIG. 28(B) is an enlarged view of the driving roller 478 and the pressure plate roller 483 which are feeding the film. A clearance (cl) of 0.1 through 0.2 mm is provided so that the pressure plate roller 483 does not protrude from the surface of the pressure plate 481 due to manufacturing errors, and the pressure plate roller 483 is withdrawn.

FIG. 28(C) is an enlarged view of the driving roller 478 and the pressure plate roller 483 at the time when no film is loaded in the camera, and the driving roller 478 is contacted with the pressure plate roller 483 so as to prevent wearing.

The tongue portion Fd of the film F passed over the pressure plate 481 passes the magnetic head 485, and then is wound around the reel 462 by a rear cover roller and a main body roller, not shown in the drawing. The magnetic head 485 reproduces, at least, film information or records photographic information of the camera.

When the tongue portion Fd of the film is wound around the reel 462, the film F feeding force is transmitted from the reel 462 to the film. The film feeding speed of the reel 462 is set higher than that of the driving roller 478, and the fourth planetary gear 479 is rotated faster than the fourth sun gear 469 by the film F. Accordingly, the fourth planetary gear 479 is rotated clockwise, and the driving roller 478 is separated from the film F.

As described above, a predetermined length of the tongue portion Fd is fed, and when the perforation Fc of the first frame is fed to a position of a perforation detecting photoreflector 491, film feeding stops and then the first frame of the film can be exposed.

In this way, photographing is conducted on each frame one by one. Since the number of exposable frames of the loaded film is previously read out by the camera from the bar code disk 1 and stored in the $E^2PROM$, the film feeding motor 461 reversely drives the film feeding mechanism when the predetermined final frame has been exposed. Then, the third planetary gear 474 is engaged with the spool gear 473, and the film F is re-wound into the cartridge C by the spool 402. Here, since the first sun gear 466 is reversely rotated, the first planetary gear 475 is disengaged from the reel gear 477. Since the reel 462 is not subjected to the driving force of the film feeding motor 461, re-winding can be carried out. Further, since the fourth sun gear 469 is reversely rotated, the fourth planetary gear 479 is rotated in the direction in which the fourth planetary gear is separated from the film. The film is released from the condition in which the film is sandwiched between the driving roller 478 and the pressure plate roller 483. The driving roller 478 can not be a load on film re-winding.

In this connection, in the film feeding mechanism described above, although it is of course necessary that stoppers are provided near the first planetary lever 476, the second planetary lever 471 and the fourth planetary lever 480 so that these levers can not be rotated by an angle more than a predetermined value, these stoppers are neglected in the drawing.

In FIG. 29, in the case where the bar code disk 401 is rotated when the spool gear 473 is rotated, bar code information is read out by a bar code reading photoreflector 434.

Further, 2 LEDs 493 are provided at lower portions of the central portion of the camera, and optical information Fg is optically recorded onto the film F. In this case, 2 bits information can be recorded onto the film.

In the camera in this embodiment, in the case where the loaded film has been partially exposed and re-wound because, for example, a film having a sensitivity different from that of the currently loaded film is necessary, when the partially exposed film is re-loaded into the camera later, the film can be automatically wound up to the unexposed first frame by this camera since exposure states were recorded onto the magnetic track Fe on the film. However, as shown in FIG. 29, since the magnetic head 495 is positioned near the reel side with respect to the photographic image plane Fa, the film is wound up too much when the unexposed frame is detected. Accordingly, it is necessary to wind up a predetermined amount of the film. In order to secure the accuracy of the position of the photographic image plane Fa, after an amount, more than the predetermined amount, of the film has been re-wound in this embodiment, film is wound up again so that the film stops at the position of the first unexposed frame.

However, when the film feeding mechanism is switched from the film re-winding condition to the film winding-up condition, on the condition that the film is stretched between the reel 462 and the spool 402, the following operations are carried out. When the first planetary gear 475 is engaged with the reel gear 477 before the third planetary gear 474 is disengaged from the spool gear 473, since the film feeding speed of the reel 462 is faster than that of the spool 402, the reel 462 is rotated when the reel gear 477 is driven, the film F is wound up, and the spool gear 473 is rotated by the film F through the spool 402, and the spool shaft 433. As a result, the third planetary gear 474 can not be disengaged from the spool gear 473, and this engagement is continued. However, since the number of rotation of the spool gear 473 by the film F is different from that of the spool gear 473 by the third planetary gear 474, the film feeding motor 461 is finally stopped.

Figure 30:
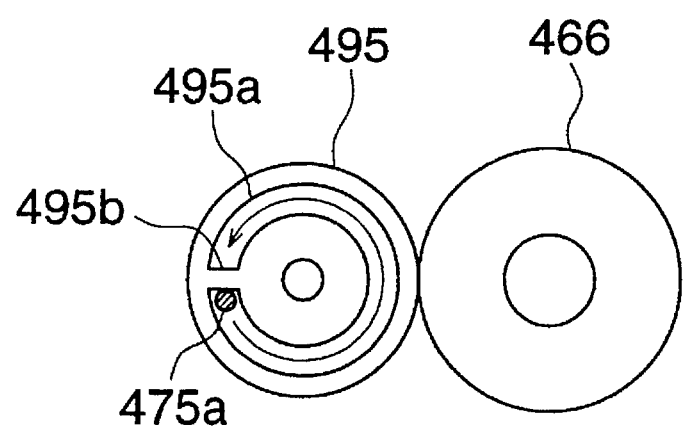

Accordingly, an idle joint, which is a means for transmitting the driving force with a delay as shown in FIG. 30, is used. FIG. 30(A) is a vertical sectional view of the idle joint. A rotatable idle gear 495 is coaxially provided with the first planetary gear 475, and is engaged with the reel gear 477. A drive pin 475a is vertically provided on the first planetary gear 475. A C-shaped slot 495a is provided on the idle gear 495, and the drive pin 475a is inserted into the slot 495a. As a result, as shown in FIG. 30(B), when the film is wound up, the first sun gear 466 is rotated. Even when the first planetary gear 475, that is, the drive pin 475a is rotated in the arrowed direction, the idle gear 495 is not rotated until the the drive pin 475a is rotated approximately one rotation. When the drive pin 475a comes into contact with a side wall 495b of the idle gear 495, then the idle gear 495 is rotated. Accordingly, after the film feeding mechanism has been switched from the film re-winding condition to the film winding condition, the driving force is not transmitted to the reel gear 477, that is, to the reel 462 in the initial stage in which the third planetary gear 474 is not disengaged from the spool gear 473. When the driving force is transmitted to the reel 462, the third planetary gear 474 is disengaged from the spool gear 473. Here, in contrast to FIG. 30, it may be acceptable that a slot is provided on the first planetary gear 475 and the drive pin is provided on the idle gear 495. Further, since the film feeding speed of the reel 462 is greater than that of the spool 402, the idle joint is not necessary when the film feeding mechanism is switched from the film winding condition to the film re-winding condition. When this system is structured in such a manner that the idle gear 495 is supported by the planetary lever 476 as shown in FIG. 30(A)', since the first planetary gear 475 is not subjected to the influence of the force of the spring for moving the idle gear 495, the possibility that the first planetary gear 475 is integrally rotated with the idle gear 495 due to frictional forces or the like, can be decreased. Further, examples disclosed in FIGS. 30(A), and 30(A)', are sectional views showing the embodiment in which the first sun gear 466, the first planetary gear 475, and the reel gear 477 are arranged as shown in FIG. 28(A). However, the following arrangement may also be acceptable: one planetary gear and gears such as idle gears, the number of which is at least more than one, are arranged between the first sun gear 466 and the reel gear 477; and an idle gear having a play-slot for a drive pin which has the same functions as those of the idle gear 495, and a gear having a drive pin which moves in the play-slot, are coaxially provided with any of the above-described gears.

Next, referring to FIG. 32 through FIG. 43, a flow chart of the camera in the second embodiment will be described below. Initially, the circuit structure is shown in the block diagram in FIG. 31.

Figure 31:
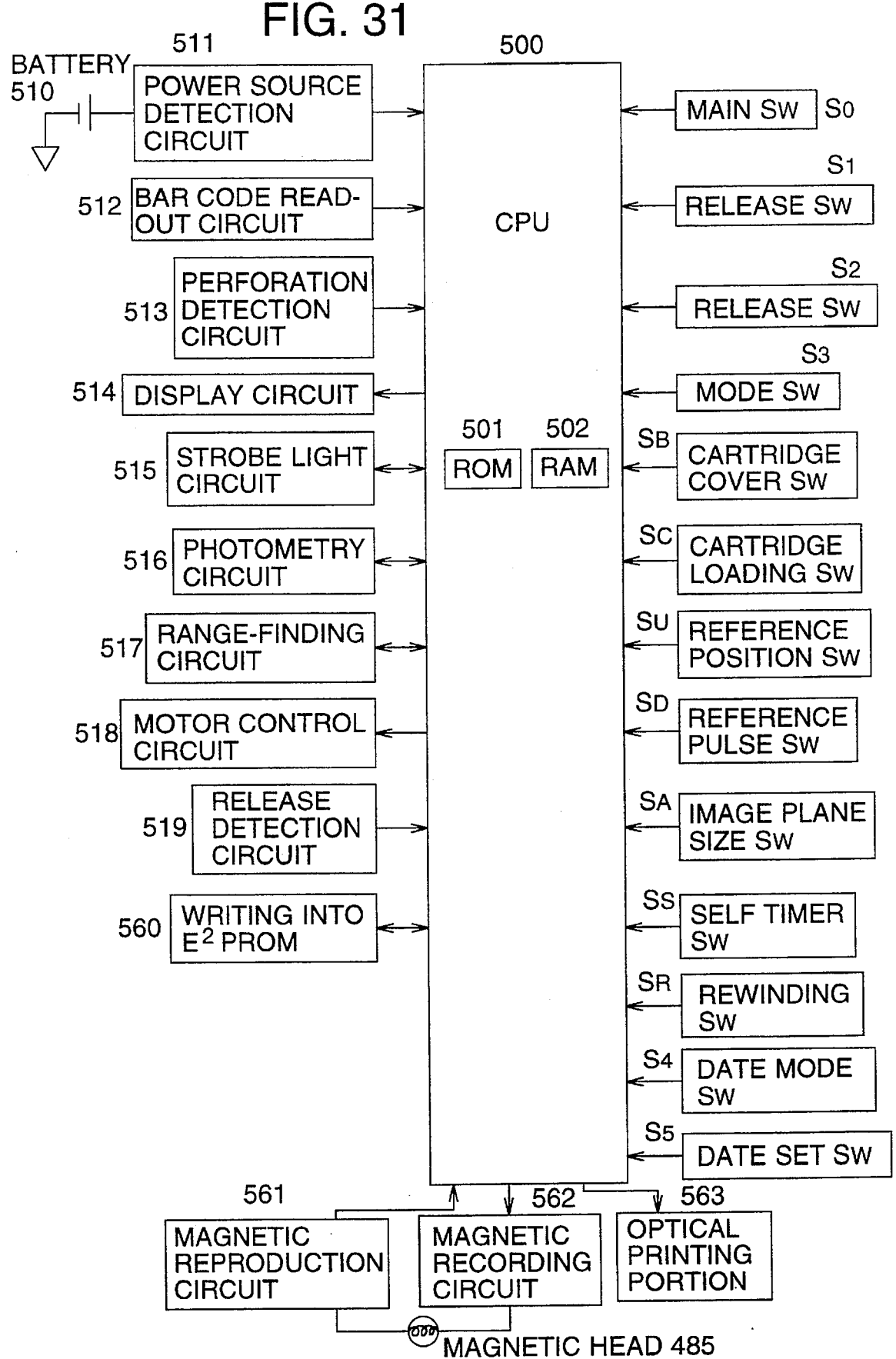
FIG. 31 is a block diagram of the camera in the second embodiment of the present invention.

In FIG. 31, a CPU 500 for controlling each circuit has a ROM 501 and a RAM 502. Numeral 511 is a power source detection circuit for detecting whether the voltage of the power source is more than a predetermined value. Numeral 512 is a bar code reading circuit for reading bar code information by a bar code reading photoreflector 434, and for outputting the information. Numeral 513 is a perforation detecting circuit for detecting film perforations by a perforation detecting photoreflector 491 and for outputting the information. Numeral 514 is a display circuit for displaying the information, to be displayed on the camera, in an LCD 422 and a viewfinder. Numeral 515 is a strobe circuit for flashing a strobe light by a strobe light flashing portion 12. Numeral 516 is a photometry circuit for metering the brightness of the photographic subject. Numeral 517 is a range-finding circuit for metering the distance to the photographic subject. Numeral 518 is a motor control circuit for controlling a lens driving motor, a shutter driving motor, a film feeding motor, etc. Numeral 519 is a shutter operation detecting circuit for detecting the shutter operation condition. Numeral 560 is an $E^2PROM$ for storing all operation information. Numeral 561 is a magnetic reproduction circuit for reproducing magnetic information supplied by a magnetic head 485. Numeral 562 is a magnetic recording circuit for recording magnetic information by the magnetic head 485. Numeral 563 is an optical recording portion for recording 2 bits of information onto the film by an LED 493.

$S_0$ is a main switch which is operated by a main switch button 423. $S_1$ is a release switch which is operated when a release button 419 is pressed to the first step of of its stroke. $S_2$ is a release switch which is operated when the release button 419 is pressed to the second step of its stroke. $S_3$ is a mode switch which is operated when a mode selection button 428 is activated. $S_B$ is a cartridge cover switch which is operated when a cartridge cover 430 is opened or closed. $S_C$ is a cartridge loading switch for detecting loading of the cartridge C by a cartridge detection pin 435. $S_U$ is a reference position switch which is provided on a pulse generating printed circuit board and regulates the position of a spool shaft 433. $S_D$ is a reference pulse switch which is provided on the pulse generating printed circuit board and generates the reference pulse. $S_A$ is an image plane size switch for switching the image plane size to a hi-vision size, a panorama size, or a normal size. $S_S$ is a self timer switch which is operated when a self timer button 427 is activated. $S_R$ is a film re-winding switch which is operated when a film re-winding button 426 is activated. $S_4$ is a date mode switch for switching the date mode to year-month-day, day-hour-minute, or no-data. $S_5$ is a date set switch for correcting each date character by the date set button.

Next, the conditions of operations of switches expressed by the flow chart, are shown in Table 1.

TABLE 1

| Name of switch | Symbol | 0 | 1 | |
|---|---|---|---|---|
| Main $S_w$ | $S_0$ | OFF | ON | |
| Release $S_w$ $S_1$ | $S_1$ | OFF | ON | |
| Release $S_w$ $S_2$ | $S_2$ | OFF | ON | |
| Mode $S_w$ | $S_3$ | OFF | ON | *1 |
| Cartridge chamber cover $S_w$ | $S_B$ | close | open | |
| Cartridge loading $S_w$ | $S_C$ | No | YES | |
| Reference position $S_w$ | $S_U$ | OFF | ON | |
| Reference pulse $S_w$ | $S_D$ | OFF | ON | |
| Perforation detection PR | $S_P$ | OFF | ON | |
| Image plane size $S_w$ | $S_{A1}$ | OFF | ON | *2 |
| Self-timer $S_w$ | $S_S$ | OFF | ON | |
| Re-winding $S_w$ | $S_R$ | OFF | ON | |
| Bar code reading PR | $S_{BC}$ | OFF | ON | |
| Date mode $S_w$ | $S_4$ | OFF | ON | |
| Date set $S_w$ | $S_5$ | OFF | ON | *3 |

*1 Every time when the mode Sw is ON, "strobe AUTO→red-eye prevention →strobe ON→strobe OFF" is repeatedly carried out.
*2 Every time when the image plane size Sw is ON, "H→P→N" is repeatedly carried out, where, H: Hi-vision size P: panorama size and N: normal size.
*3 Every time when the date set Sw is ON, "year-month-day→day-hour-minutes→no data→month-day-year→day-month-year⇆ is repeatedly carried out.

The names of flags, symbols and the condition of operation are shown in Table 2.

TABLE 2

| Name of flag | Symbol | 0 | 1 |
|---|---|---|---|
| Cartridge chamber cover | $F_B$ | close | open |
| Cartridge | $F_C$ | no-load | loaded |

TABLE 2-continued

| Name of flag | Symbol | 0 | 1 |
| --- | --- | --- | --- |
| Partially exposed | $F_{U1}$ | unexposed | partially exposed |
| Winding type | $F_{U2}$ | normal | pre-winding |
| Shutter error | $F_{SE}$ | NO | YES |
| Auto-loading error | $F_{AE}$ | NO | YES |
| Re-winding error | $F_{RE}$ | NO | YES |
| Film is caught in the middle | $F_{FE}$ | NO | YES |
| In the middle of film feeding | $F_K$ | normal | feeding |
| In the middle of film re-winding | $F_{R1}$ | normal | re-winding |
| Forced re-winding | $F_{R2}$ | normal | forced re-winding |
| Auto-load | $F_L$ | normal | auto-loading |
| Film information | $F_{DX}$ | not read-out yet | already read out |
| Possibility of magnetic recording | $F_{ME}$ | possible | impossible |

Names of RAMs and symbols are shown in Table 3.

TABLE 3

| Name of RAM | Symbol |
| --- | --- |
| The number of times of bar code reading | $R_{DX}$ |
| The number of perforations | $R_{SP}$ |
| The number of perforations to be counted | $R_{CP}$ |
| The number of exposable frames | $R_{EX}$ |
| The number of unexposed frames | $R_{CX}$ |
| The number of exposed frames | $R_{ED}$ |
| Film sensitivity | $R_{ISO}$ |
| The number of times of reference signal reading | $R_{SD}$ |

Figure 32:
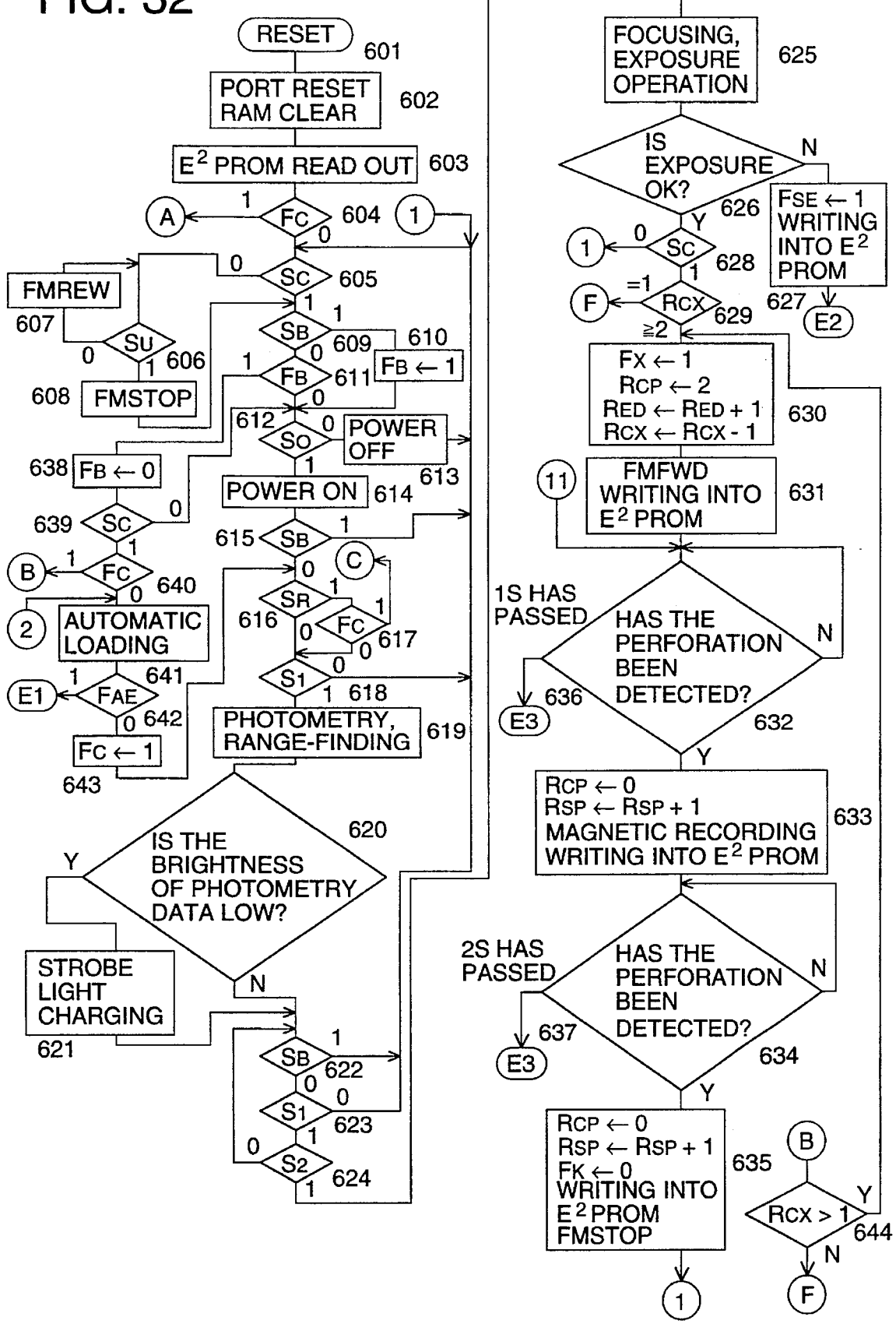
FIG. 32 is a main flow chart in the second embodiment of the present invention.

First, the main flow chart will be explained below according to FIG. 32.

In step 601, the program is reset when a battery 510 is loaded into the camera, and program starts. In step 602, ports such as a switch input and the like, are reset and the content of flags and RAMs are cleared.

Then, in step 603, the original condition which has been stored in the E$^2$PROM before flags and RAMs were reset, is read from the E$^2$PROM. In step 604, it is discriminated by a flag $F_C$ whether the cartridge C has been loaded or not before flags and RAMs are reset. In step 605, a cartridge loading switch $S_C$ is checked. When the cartridge C has not been loaded into the camera, it is checked in steps 606 through 608 whether the spool shaft 433 is located at the initial position. When the spool shaft 433 is not located at the initial position, the spool shaft 433 is set to the initial position by rotation of the film feeding motor. In step 609, a cartridge cover switch $S_B$ is checked. When it is detected that the cartridge cover is open, a flag $F_B$ is set in step 610. When it is detected that the cartridge cover is closed in step 609, $F_B$ is checked in step 611. This process is used for auto-loading. In step 612, the main switch $S_0$ is checked. When $S_0$ is 0, power OFF is set in step 613. When $S_0$ is 1, power ON is set in step 614.

The status of the cartridge cover switch $S_B$ is checked in step 615. When the cartridge cover is open, no operation is carried out hereinafter.

Re-winding switch $S_R$ is checked in step 616. When the switch is pressed, re-winding is forcibly carried out only when it is judged in step 617 that the cartridge C is loaded into the camera. When the cartridge C is not loaded into the camera, no re-winding is carried out. It is checked in step 618 whether the release switch $S_1$ is pressed. When the release switch $S_1$ is pressed, photometry and range-finding operations are carried out in step 619. It is checked in step 620 whether the result of this photometry is low brightness. When the result is low brightness, the strobe unit is charged in step 621.

The open or closed condition of the cartridge cover 430 is checked in step 622. When the cartridge cover 430 is open, the sequence is returned to the initial step.

Conditions of release switches $S_1$ and $S_2$ are respectively checked in steps 623 and 624. When $S_2$ is pressed, the focal point is adjusted in step 625. After that, the shutter is driven and a frame of the film is exposed. Concurrently, optical information $F_g$ is optically recorded on the film F by the LED 493 according to the mode selected by $S_A$. It is judged in step 626 whether the exposure operation is correctly carried out. When the exposure operation is not correctly carried out, a flag $F_{SE}$ is set in step 627, and the sequence goes to the error routine E2 after the flag $F_{SE}$ has been stored in E$^2$PROM. When the exposure operation is correctly carried out, it is checked in step 628 whether the cartridge C is loaded in the camera. When a cartridge C is not loaded into the camera, the sequence returns to the initial position. When a cartridge C is loaded in the camera, the film is wound after step 629. Operations carried out after the step 629 will be described in detail later.

Figure 33A:
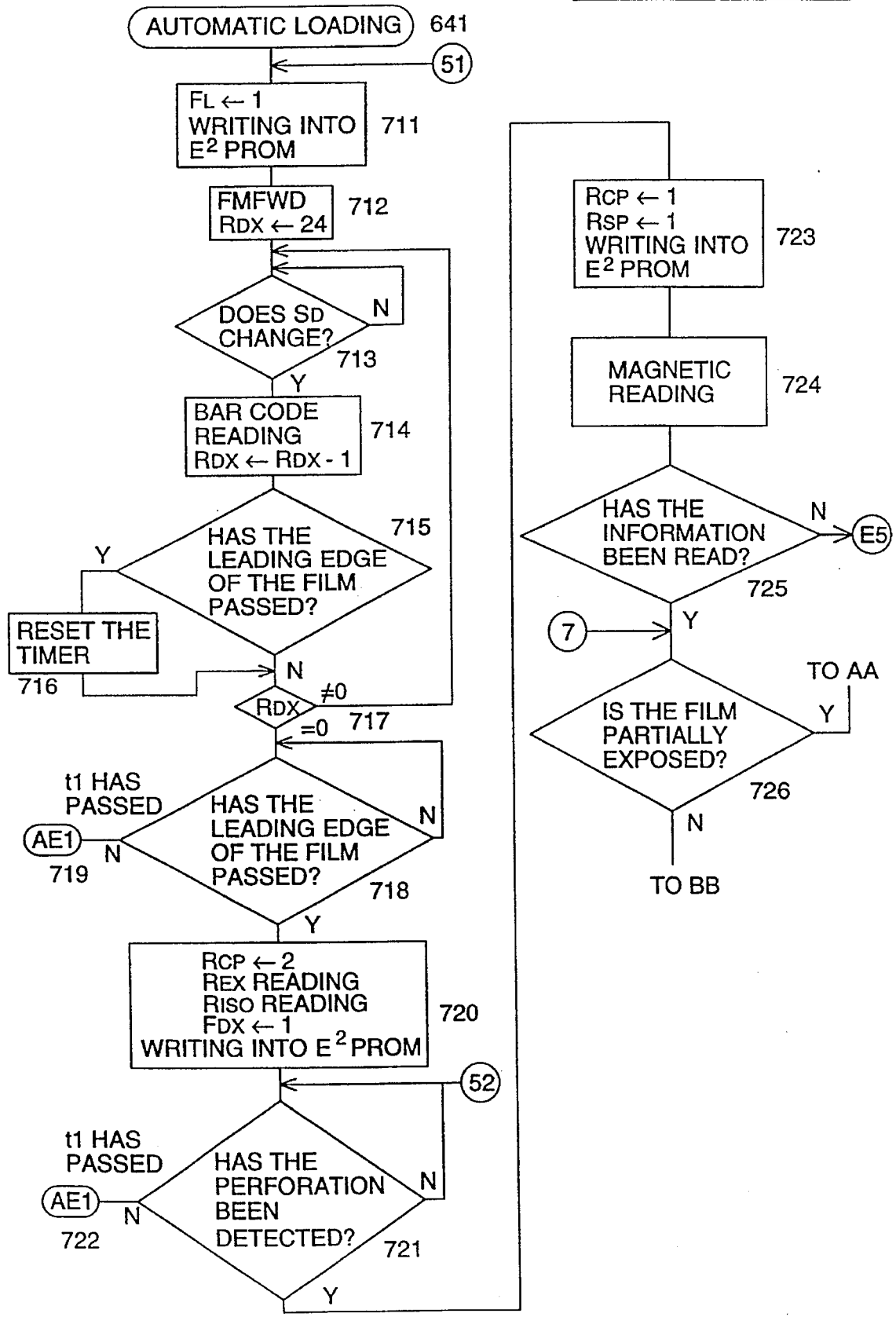
FIGS. 33A and 33B are a flow chart of the auto-loading routine in the second embodiment of the present invention.
Figure 33B:
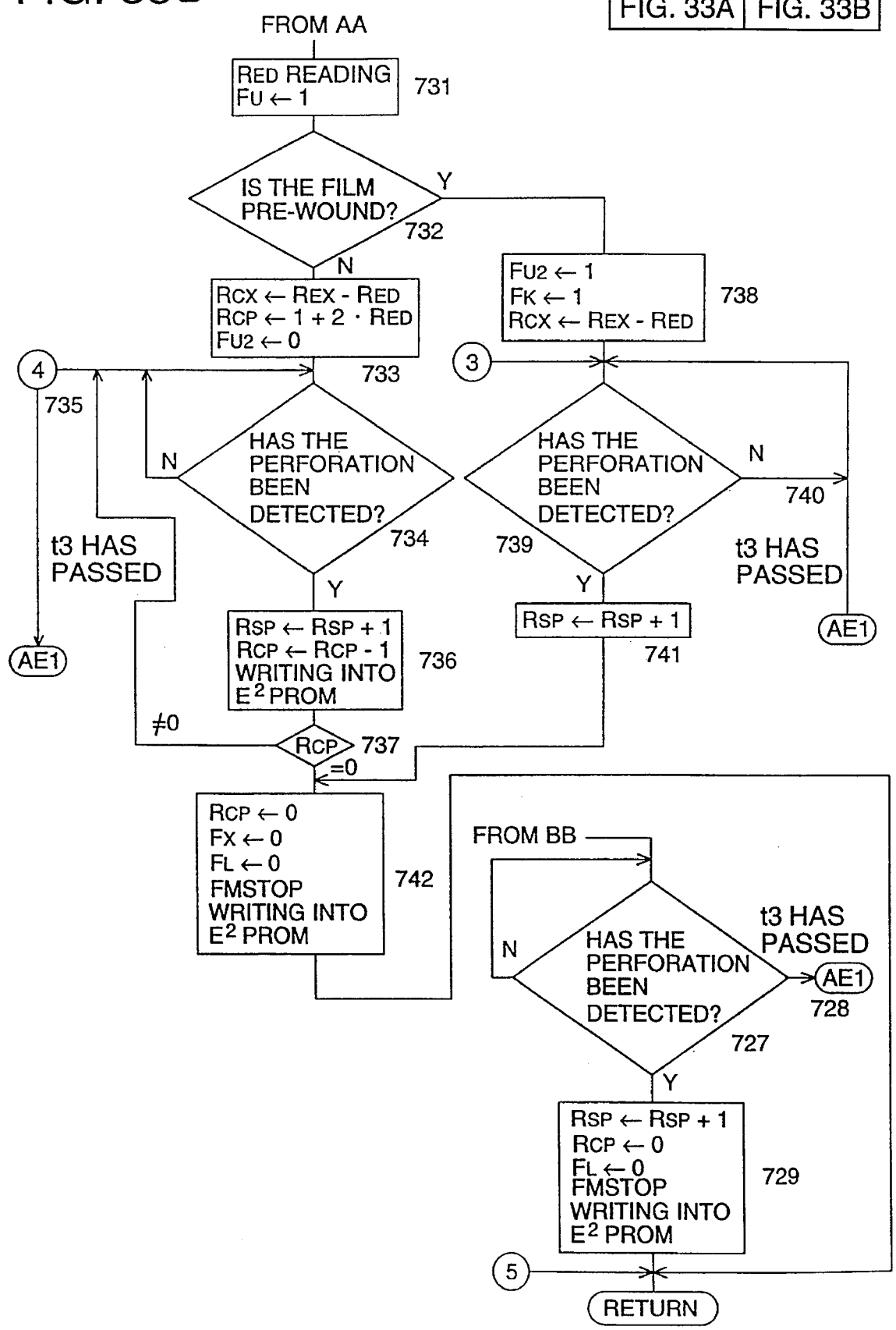
Figure 34:
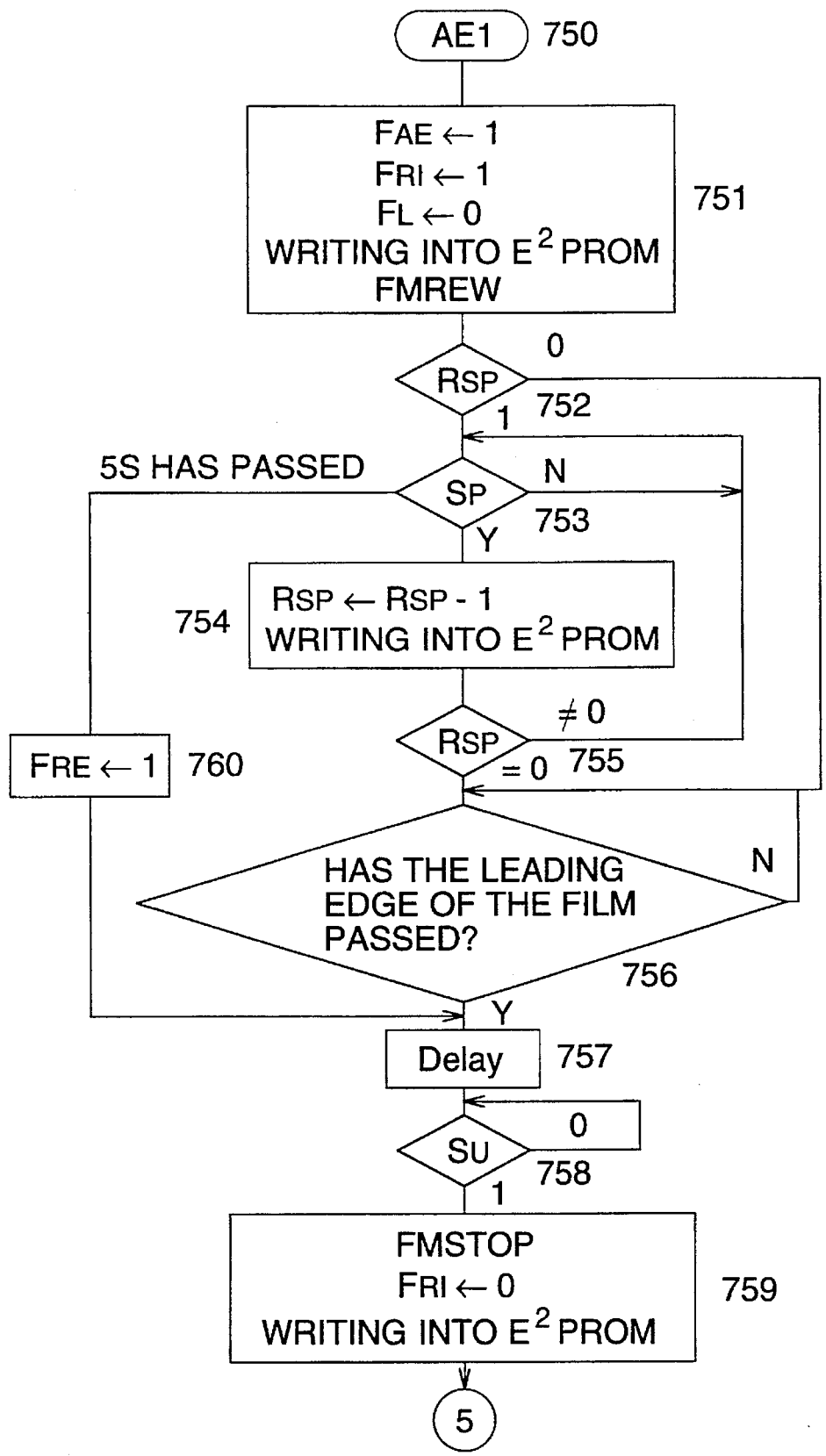
FIG. 34 is a flow chart of the auto-loading error routine in the second embodiment of the present invention

Next, according to the flow chart shown in FIGS. 33A and 33B, an auto-load routine will be described below. When a closed status of the cartridge cover 430 is detected in step 609 in the main routine, and further, it is judged in step 611 that the cover has been opened just before the check in this step, then, the flag $F_B$ is reset in step 638, and after that, it is checked in step 639 whether the cartridge C is actually loaded. When a cartridge C is loaded in the camera, it is checked in step 640 whether the cartridge C has been loaded into the camera before the cartridge cover is opened. This is in accordance with the case where the cover is opened during photographing operation under the condition that the cartridge C has been loaded into the camera. Here, when it is judged that a new cartridge C is loaded into the camera, the sequence goes to the auto-load routine in step 641. It is judged by the flag $F_c$ in step 642 whether auto-loading is correctly carried out. When there is an error in this auto-loading operation, the sequence goes to an error processing routine. When there is no error, the flag $F_C$ is set and the sequence returns to the main routine.

When the conditions of the camera are detected before the cartridge cover is opened, a non-volatile memory is used in which information concerning the conditions of the camera is stored at a predetermined period, and this information is held until the following information is stored. An example in the case where feeding conditions of the film are discriminated just before the cartridge cover is opened, will be described below.

Any of the following feeding conditions of the film is discriminated by the camera: just before the start of auto-loading, or on the auto-loading; during winding of the film after photographing, or on stopping the film feeding; or during re-winding. In order to discriminate the film feeding conditions, information of the counter showing information of the number of exposable frames (information of the number of frames of, at least, 0 or more than 0 is available), and re-winding information showing "in the middle of film re-winding", are used. In order to store and hold these two types of information, either an electrical or mechanical structure from which these types of information can be obtained, are acceptable. After the rear cover has been closed, re-winding information is checked when any camera operation information of the rear cover open/close SW, a release SW, or a zoom SW is obtained. When the film is not being re-wound, next, information of the counter is checked. When information of the counter is 0, the camera judges that the film is on the condition just before the start of auto-loading or the film is being auto-loaded. Information of the counter is further checked. When information of the counter is not 0, the camera judges that the film is being wound after the film has been exposed, or film feeding is stopped. However, in this case, even when the information is judged that the film is being exposed, it is difficult to judge whether or not the camera shutter has been released, and even when the camera shutter has been released, it is difficult to judge which sequence is carried out now, unless a large number of pieces of information are discriminated. Accordingly, when it is judged that the film is in the precess of winding after the film has been exposed, or film feeding is being stopped, the camera is set after the rear cover has been closed so that normal photography can be carried out.

Further, after the rear cover has been closed, in the case where any of the camera operations information of the rear cover open/close SW, the release SW, or the zoom SW is obtained, re-winding information is judged. When information that the film is being re-wound is obtained, the camera judges that the film is being re-wound, and the re-winding operation continues after the rear cover has been closed. The example of discrimination or judgement is, of course, not limited to the above-described specific example.

In the auto-load routine, a flag $F_L$ expressing that the film is being auto-loaded is set in step 711. After the flag $F_L$ is stored in the E²PROM, film feeding starts in step 712. The number of times of bar code reading is set in an $R_{DX}$, and a timer $t_1$ for detecting an auto-load error is set. Here, the number of times of bar code reading is set to 24 based on the following reasons. One rotation of the reference pulse switch consists of 12 patterns, and when ON-OFF operations of $S_D$ are repeated 24 times, all the bar code blocks can be read by one rotation of the patterns.

A change in the condition of $S_D$ is detected in step 713. "1" is subtracted from the number of times of bar code reading $R_{DX}$ in step 714, and this operation is repeated in step 717 until $R_{DX}$ is 0. Concurrently, it is detected in step 715 whether the leading edge of the film passes the photoreflector 491 or not. When it is detected that the leading edge of the film has passed the photoreflector, the timer $t_1$ is reset in step 716. When bar code reading has been completed, it is detected in step 718 whether the leading edge of the film has passed. When the leading edge can not be detected within the period of time of $t_1$, it is judged that an auto-load error occurred, and the sequence jumps to an error routine.

This system is structured in such a manner that the first frame of the film is opposed to the photographic frame of the camera when film feeding is stopped at the time when two perforations are detected in the case of auto-loading. The number of 2 perforations is set in $R_{CP}$ in step 720. The number of exposable frames of the film and the film sensitivity, which are obtained from bar code information, are set respectively in $R_{EX}$ and $R_{ISO}$. A flag $F_{DX}$ showing that bar code information reading has been completed, is set and stored in E²PROM. The first perforation Fb is detected in step 721. Here, when the first perforation Fb can not be detected in a predetermined period of time $t_2$, it is judged that an auto-load error occurred.

When the first perforation Fb is detected, $R_{CP}$ and $R_{SP}$ are set and stored in the E²PROM. Magnetic information is read out in step 724.

It is judged in step 725 whether magnetic information is correctly read or not. When the magnetic information is not correctly read, the sequence goes to an error routine E5. It is judged in step 726, according to magnetic information, that a cartridge C, loaded in the camera, is unexposed or partially exposed. When the cartridge C is not partially exposed, the sequence advances to step 727. When the second perforation Fc is detected in a predetermined period of time $t_3$, $R_{SP}$, $R_{CP}$ and $F_L$ are set in step 729 and film feeding is stopped. After $R_{SP}$, $R_{CP}$ and $F_L$ have been stored in the E²PROM, the sequence returns to a predetermined step. When the second perforation Fc can not be found during $t_3$, it is judged that an auto-load error occurred.

Here, $t_1$, $t_2$ and $t_3$ will be described in detail. As shown in FIG. 29, when the distance from the center of the cartridge C to the photoreflector 491 is "a"; the distance from the photoreflector 491 to the center of the reel 462 is $P_2a$; the distance from the photoreflector 491 to the center of the drive roller 478 is $P_2a$; the distance from the leading edge of the film to the first perforation Fb is rd; the distance from the first perforation Fb to the second perforation $F_c$ is d; then, $t_1$, $t_2$ and $t_3$ may be set in such a manner that these are proportional to the ratio of the length of a, rd, and d, and are dependent on the film feeding speed. However, in this embodiment, the feeding speed of the cartridge C, the feeding speed of the drive roller 478, and the winding speed of the reel 462 are different from each other, and therefore, it is necessary to consider these speed differences. Here, when the feeding speed of the cartridge C is v, the feeding speed of the drive roller 478 is $q_2v$, and the winding speed of the reel 462 is $q_1v$, then, $t_1$, $t_2$ and $t_3$ are expressed as shown by the following ①, ② and ③, and times may be set respectively according to these values.

Equation I $$t_1 = a/v \qquad ①$$

$$t_2 = P_2a/v + a(P_1-P_2)/q_2v + \{rd - a(P_1+1)\}/q_1v \qquad ②$$

$$t_3 = d/qv \qquad ③$$

However, the film feeding speed is not immediately increased to speed v at the time of the auto-load start. There is a possibility that a rise time of the motor is necessary, or the leading edge of the film is barely thrusted out of the cartridge due to the condition of the film in the cartridge. Accordingly, it is preferable that $t_1$ is set a little greater than the value obtained by the equation ①. The setting value may be adequately determined according to experiments.

Further, in this embodiment, a magnetic head 485 is provided on the film passage. There is a possibility that the film feeding speed is lowered, or the film stops instantaneously when the leading edge of the film arrives at the magnetic head 485 at the time of auto-load. Accordingly, it is further preferable that $t_2$ is set a little longer than the value obtained by the equation ②. The set value may also be adequately determined according to experiments.

When it is judged in step 726 that the cartridge is partially exposed, the number of exposed frames are read into $R_{ED}$ from the magnetic information in step 731. Then, the flag $F_U$, showing that the film is partially exposed, is set.

In step 732, it is judged, according to magnetic information, whether the film has been exposed in the pre-winding operation. When the film has been exposed in the pre-winding operation, the film can be exposed from the first exposable frame to the frame immediately before the exposed frame. Accordingly, the number of exposable frames is "the number of total exposable frames minus the number of exposed frames". The result of this calculation is set to the number of exposable frames in step 738, and the flag is also set. Next, the second perforation $F_C$ is detected in step 739. Here, when the second perforation $F_C$ can not be detected during $t_3$, it is also judged in the same manner as in step 728 that an error occurred.

When the second perforation $F_C$ is correctly detected, the RAM and flag are set respectively in step 741 and step 742, film feeding is stopped, this information is written in E²PROM, and the sequence returns to the predetermined step.

When the pre-winding operation is not carried out, the number of exposable frames is "the number of total exposable frames minus the number of exposed frames". In this case, it is necessary that the film is fed to the first exposable frame. Accordingly, the number of perforations to be counted is found by the following calculation: two times the number of exposed frames+1. The result of this calculation is set in the $R_{CP}$ in step 733.

In steps 734 though 737, $R_{SP}$ and $R_{CP}$ are found every time a perforation is detected, and stored in E²PROM at the time. When $R_{CP}$ is 0, the sequence advances to step 742, the flag is set, film feeding is stopped, these data are stored in E²PROM, and then the sequence returns to the predetermined initial step.

When the leading edge of the film or a perforation is not detected in a predetermined period of time, the sequence goes to the error routine. When an auto-load error is detected, the sequence jumps to the auto-load error routine 750 shown in FIG. 34. In step 751, the flag $F_{AE}$ showing the auto-load error, and the flag $F_{R1}$ showing that the film is being re-wound, are set, $F_L$ is reset, these data are stored in E²PROM, and then re-winding is started.

In step 752, when $R_{SP}$ is not 0, the sequence advances to step 753. The number of perforations are counted in steps 753 through 755 until $R_{SP}$ is 0. When $R_{SP}$ is 0, passage of the leading edge of the film is detected in step 756. The film stops for a predetermined period of time in step 757. After the leading edge of the film has been securely wound into the cartridge, the reference position $S_U$ is detected in step 758 and the spool is returned to the condition before cartridge loading. In step 759, $F_{R1}$ is reset, this data is stored in E²PROM, and re-winding is stopped. When the perforation is not detected in 5 seconds in step 753, it is judged that an error has occurred during film re-winding. In this case, the flag $F_{RE}$ showing the re-winding error is set, and the sequence goes to step 757.

In FIG. 31, a CPU 500 for controlling each circuit has a ROM 501 and a RAM 502. The CPU 500 has a control means for judging the following cases as auto-loading errors. When the reference signal outputted from the reference signal generating means can not be detected in the first predetermined period of time after auto-loading has been started, the control means judges that an error has occurred during film auto-loading. When the leading edge $F_h$ of the film is not detected after the second predetermined period of time has passed even when the reference signal has been detected after auto-loading has been started, it is judged that an error has occurred during film auto-loading. When the first perforation $F_b$ is not detected after the third predetermined period of time has passed even when the reference signal has been detected after the leading edge $F_h$ of the film has been detected, it is also judged that an error has occurred during film auto-loading. When the second perforation $F_c$ is not detected after the fourth predetermined period of time has passed although the reference signal has been detected after the first perforation $F_b$ has been detected, it is judged that an error has occurred during film auto-loading.

As described above, since the reference signal generating means generates the reference signal at a predetermined period when the spool is rotated, the rotation can be correctly detected without depending on the width of the bar code.

The CPU 500 judges the following cases as auto-loading errors. When the reference signal can not be detected in the first predetermined period of time after auto-loading has been started, the CPU judges that an error has occurred during film auto-loading. When the leading edge $F_h$ of the film is not detected after the second predetermined period of time has passed even when the reference signal has been detected after auto-loading has been started, it is judged that an error has occurred during film auto-loading. When the first perforation $F_b$ is not detected after the third predetermined period of time has passed even when the reference signal has been detected after the leading edge $F_h$ of the film has been detected, it is judged that an error has occurred during film auto-loading. When the second perforation $F_c$ is not detected after the fourth predetermined period of time has passed although the reference signal has been detected after the first perforation $F_b$ has been detected, it is judged that an error has occurred during film auto-loading.

In the case of auto-loading, there is a possibility that the film F is loosely wound in the cartridge C even when the spool is rotated, and the leading edge $F_h$ of the film is not fed out. Accordingly, it is necessary to detect whether the leading edge $F_h$ of the film, or perforations $F_b$ and $F_c$ can be detected in a predetermined period of time. When the leading edge $F_h$ of the film, the first perforation $F_b$, and the second perforation $F_c$ are detected at the predetermined time intervals, inaccurate detection of auto-loading errors can be decreased.

Further, even when the leading edge $F_h$ of the film is caught and the rotation of the spool 402 is stopped, rapid countermeasures can be considered when the rotation is detected according to the reference pulse, and the camera and film are not submitted to heavy loads.

Further, the first predetermined period of time, the second predetermined period of time, the third predetermined period of time and the fourth predetermined period of time are different from each other. The film F is thrust out of the cartridge by the rotation of the spool 402 or driven by the drive roller 478 until the film F is wound by the reel 462. Accordingly, the first predetermined period of time for detecting the leading edge Fh of the film and the first perforation Fb is set, for example, a little longer. Further, the interval between the leading edge of the film Fh and the first perforation Fb is different from that between the first perforation Fb and the second perforation Fc. Further, the feeding speed of the film F is changed after the leading edge Fh of the film has been caught by the reel 462. Accordingly, when the second predetermined period of time, the third predetermined period of time, and the fourth predetermined period of time are respectively set to values different from each other, rapid countermeasures can be taken, and the camera and film are not submitted to heavy loads.

When variations of the rotation of the spool 402, detected by the reference signal after the auto-loading has been started, are greater than a predetermined value, the CPU 500 judges it as an auto-load error. In this case, even when film feeding is stopped when the leading edge Fh of the film is caught, it is considered that the rotation of the spool 402 has not stopped. However, when abnormalities occur, the rotation of the spool 402 is changed. Accordingly, rapid countermeasures can be taken for abnormalities in film feeding when variations during rotation are detected.

Further, when it is judged that an auto-load error occurred, the CPU 500 drives the film feeding means and re-winds the film F. Then, the Cpu 500 stops the spool 402 so that the film exposure state display on the display portion B returns to the state before cartridge loading, and further displays an auto-loading error alarm on the LCD 422. Here, the CPU 500 causes the camera to be inoperable so that camera users can securely recognize the auto-loading error, unless the film exposure state display is returned to the state before cartridge loading; the release switch $S_1$ is operated; the power source is activated again; or the cartridge C is taken out of the camera and loaded again into the camera.

As described above, in the case where an auto-loading error has occurred, when auto-loading is carried out again and failed more than predetermined times, there is a possibility that users can not understand what is happening in the camera and are confused if the film F exposure state display is set to "exposed". Accordingly, camera users can securely recognize the auto-loading error, when the alarm is given in which the camera can not be operated unless: the film exposure state display is returned to the state before cartridge loading; the release switch $S_1$ is operated; the power source is activated again; or the cartridge C is taken out of the camera and loaded again into the camera.

Figure 35:
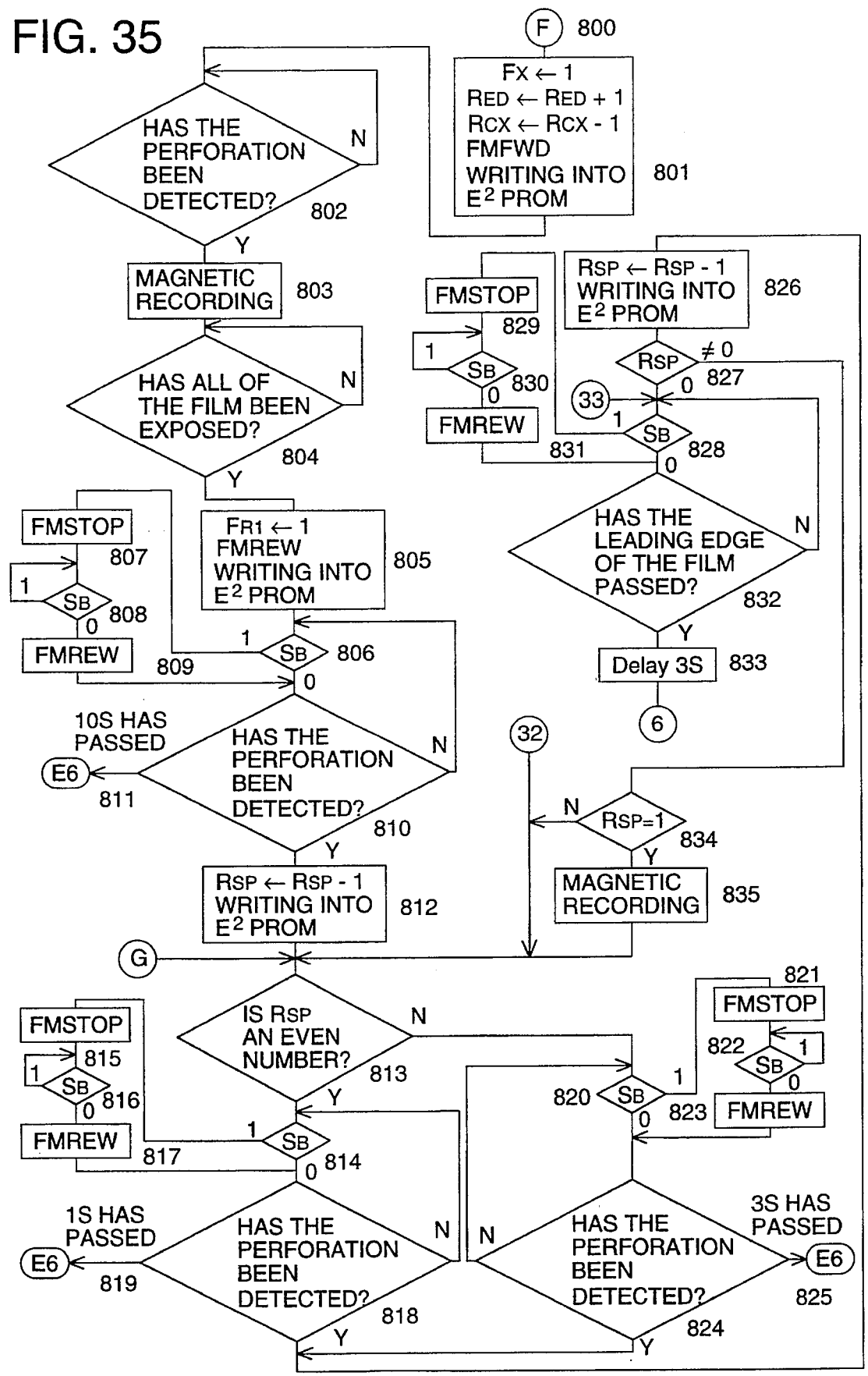
FIG. 35 is a flow chart of a re-winding routine in the second embodiment of the present invention.
Figure 36:
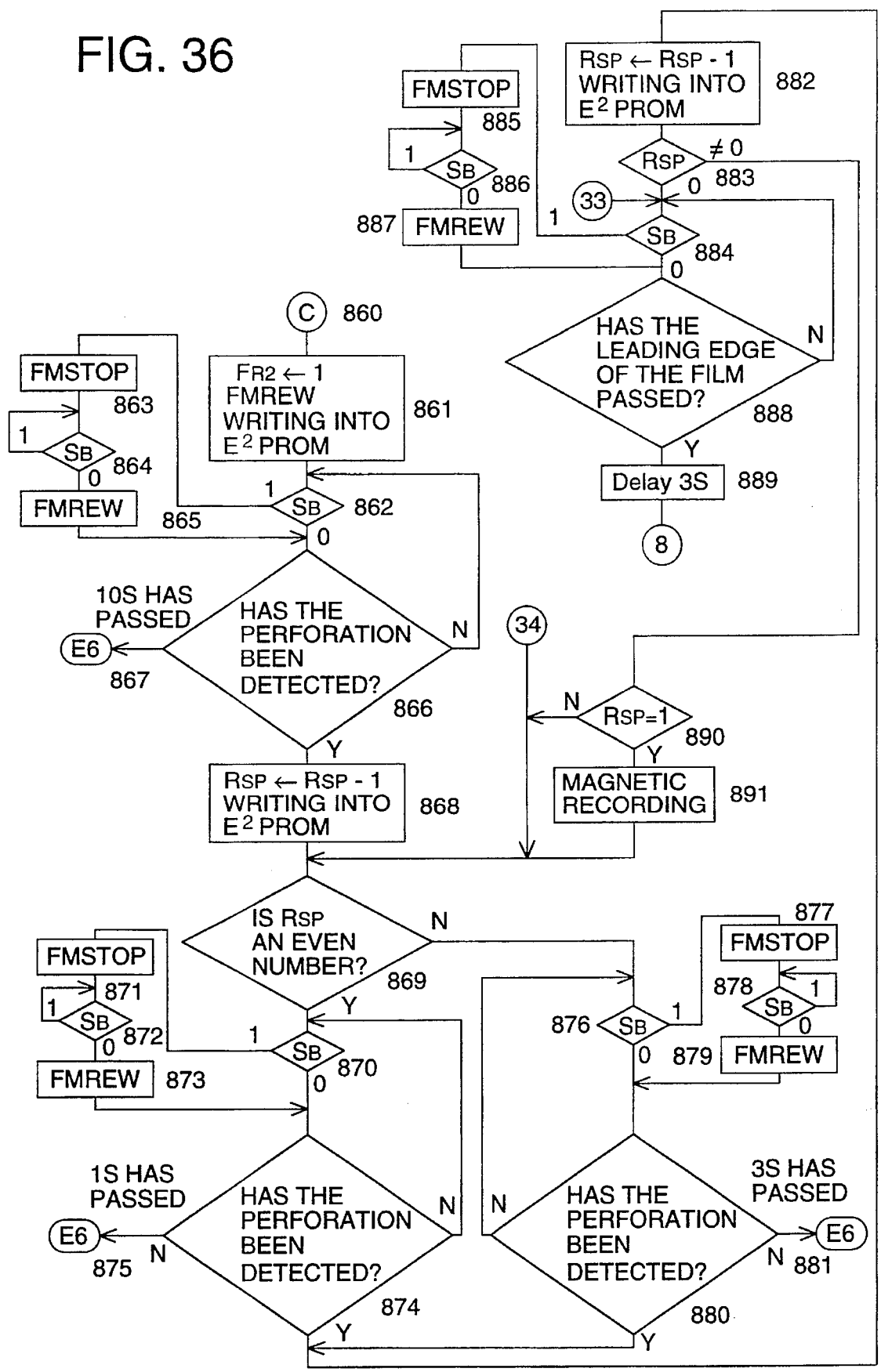
FIG. 36 is a flow chart of the re-winding routine in the second embodiment of the present invention.
Figure 37:
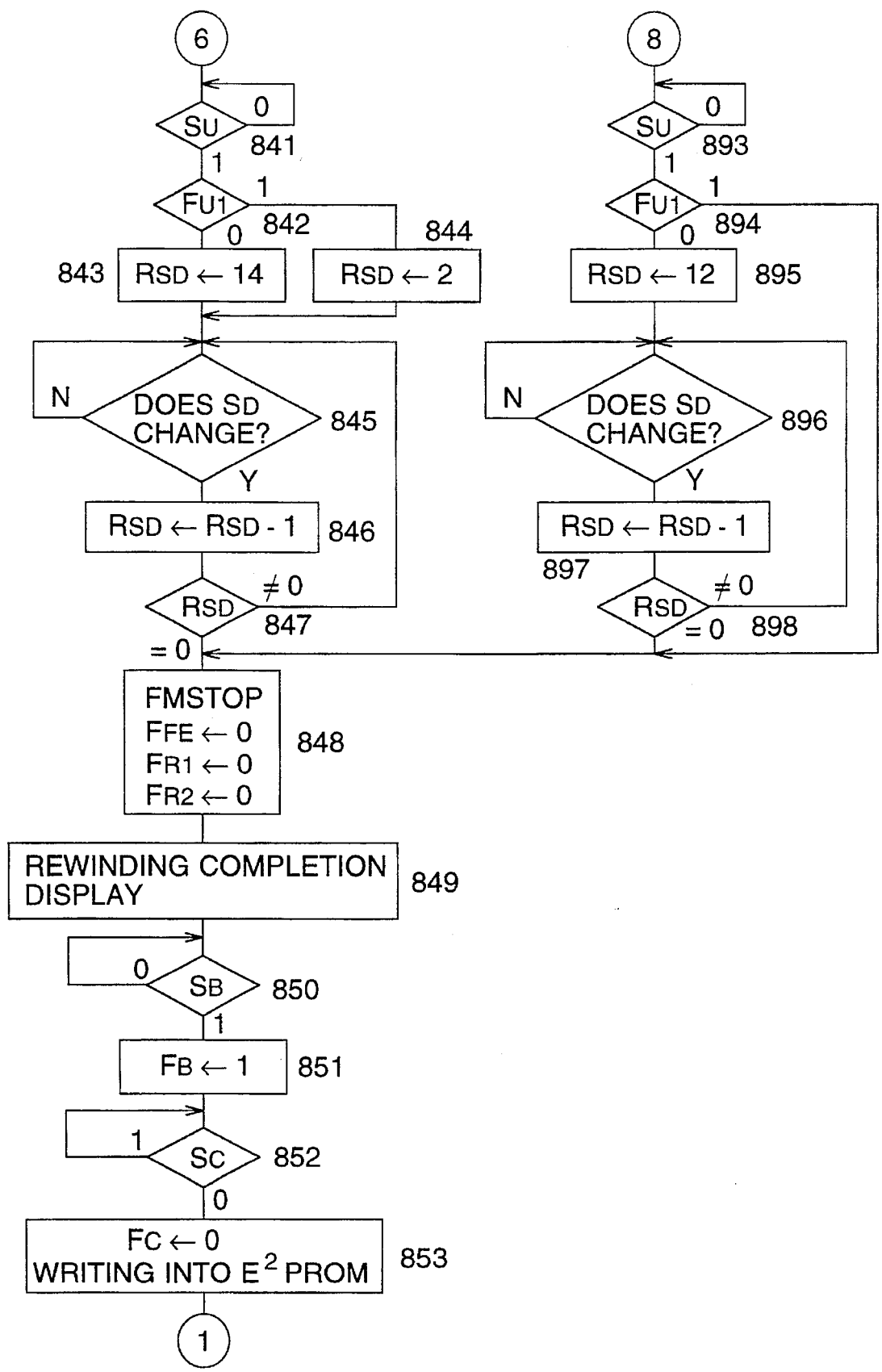
FIG. 37 is a flow chart of the re-winding routine in the second embodiment of the present invention.

Next, referring to FIGS. 35 through 37, a film re-winding routine will be described below. When the remaining exposable frame is 1 in step 629 in the main flow chart, the sequence jumps to the film re-winding routine in step 800.

In step 801, $F_K$ is set, $R_{ED}$ and $R_{CX}$ are respectively calculated, film feeding is serried, and these data are stored in the E²PROM. After the fist perforation has been detected in step 802, magnetic recording is started in step 803. When magnetic recording has been completed in step 804, the second perforation is not provided in the case of the final frame and can not be detected. Accordingly, in step 805, the flag $F_{R1}$ showing that the film is being re-wound is set, stored in the E²PROM, and re-winding is started.

In step 806, it is judged whether the cartridge cover 430 is open or not during re-winding. When the cartridge cover 430 is open, re-winding is stopped in step 807. In step 808, it is judged whether the cartridge cover 430 is closed or not. When the cartridge cover 430 is closed, re-winding is started again in step 809.

In step 810, the first perforation is detected after re-winding has been started. Here, it is taken into account that the perforation can not be detected at once because of the slack of the film, or the like. Accordingly, the error detection time is set a little longer in step 811.

After the first perforation has been detected in step 810, the $R_{SP}$ is set and stored in the E²PROM in step 812. Then, the sequence advances to step 813. In steps 814 through 825, the perforations are detected. In step 813, the number of the perforations is judged to be even or odd. When the number of the perforations is even, a portion in which the interval between perforations is shorter is detected. When the number of perforations is odd, a portion in which the interval between perforations is longer, is detected. Therefore, the error detection time for detecting the perforations in steps 818 and 824 are respectively different from those in steps 819 and 825.

In steps 814 through 817, and steps 820 through 823, it is judged whether the cartridge cover 430 is open or not when the perforation is detected during re-winding. When the cartridge cover 430 is open, re-winding is stopped in steps 815 and 821. It is judged in steps 816 and 822 whether the cartridge cover 430 is closed or not. When the cartridge cover 430 is closed, re-winding is started again in steps 817 and 823.

In step 826, the $R_{SP}$ is calculated, and stored in the E²PROM. In step 827, it is checked whether the number of perforations is 0 or not.

In steps 828 and 829, it is judged whether the cartridge cover 430 is open during detection of the leading edge of the film. When the cartridge cover 430 is open, re-winding is stopped in step 829. In step 830, it is judged whether the cartridge cover 430 is closed. When the cartridge cover 430 is closed, re-winding is started again in step 831.

In step 834, it is judged whether $R_{SP}$ is 1. This judgement is carried out due to the following reason. When the number of the perforations is 1, the magnetic head arrives at the magnetic recording portion on the tongue portion $F_d$ of the film, and magnetic recording is carried out on this portion. In step 835, magnetic recording for designating the completion of photographing is carried out.

In step 832, it is detected whether the leading edge of the film has passed over the detecting element. In step 833, the sequence stops for 3 seconds. After the leading edge of the film has been securely wound into the cartridge C, the spool 2 is stopped at the position at which the film exposure state display designates that the film has been exposed in steps 841 through 847. Initially, the reference position is detected in step 841. The position designating "exposed" is 210 degrees clockwise from the reference position in the case where the film is loaded as unexposed film, and 30 degrees clockwise from the reference position in the case of the partially exposed film. Therefore, in step 842, it is judged whether the film is an "unexposed" or "partially exposed" at the time of loading, and the number of reference signals to be detected for the angle detection is set in step 843 and 844.

In steps 845 through 847, switching of the reference signal is detected. When the reference signal is switched a predetermined number of times, each flag is reset, and re-winding is completed.

In step 849, the completion of re-winding is displayed in the display portion. When re-winding has been completed, the taking-out of the cartridge has been detected in steps 850 through 853 and is stored in E²PROM so that the camera can not be operated until the cartridge cover has been opened and the cartridge has been taken out, and then the sequence is completed.

Next, the case in which the partially exposed film re-winding switch is pressed in step 616, will be described below. When the sequence enters into the partially exposed film re-winding routine in step 860, a flag $F_{R2}$ designating that the partially exposed film is in the middle of re-winding, is set and stored in the E²PROM, and then film re-winding starts.

Operations in step 862 through 889 are the same as those in step 806 through 833 of the partially exposed film re-winding routine. In the magnetic recording operation in step 891, it is recorded on the film tongue portion $F_d$ that the partially exposed film has been re-wound. As recorded data, the following data can be applicable: the partially exposed film has been re-wound; normal winding; and the number of exposed frames.

When the leading edge of the film has been completely wound into the cartridge C in step 889, the reference position for the film exposure state display is detected in step 894. In the case where the film is loaded as the partially exposed film, the reference position is detected in step 893 in order to again display that the film is "partially exposed". At this time, the sequence jumps to step 848, and film re-winding is stopped at that point. When the film is loaded as an unexposed film, it is required that the film cartridge is rotated 180° clockwise from the reference position and stopped in order to display that the film is "partially exposed". Accordingly, the number of switching of the reference pulse to be detected, $R_{SD}$, is set to 12. When the number of switching times is detected 12 times in steps 896 through 898, the sequence jumps to step 848 and film re-winding is stopped.

Figure 40:
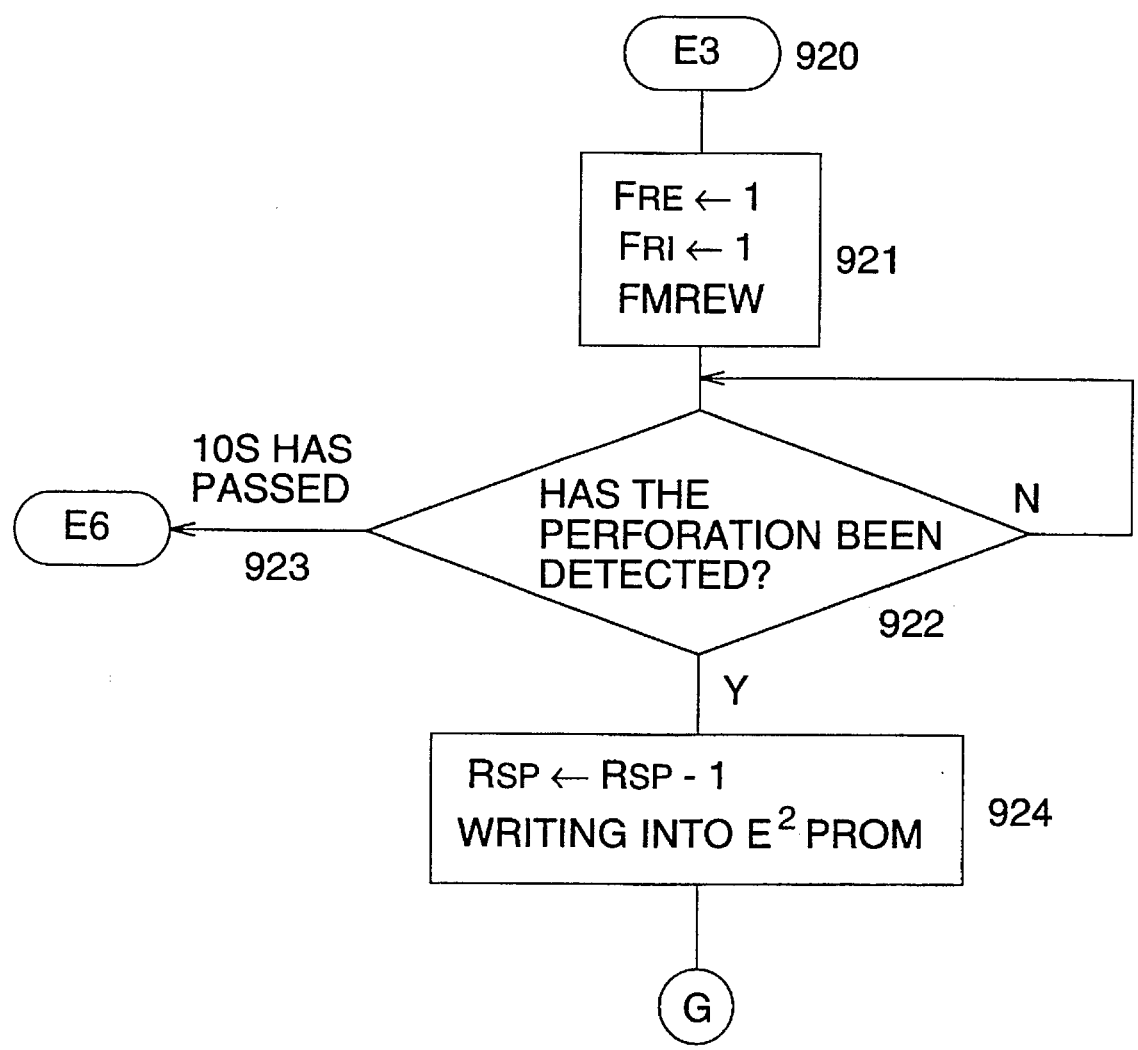
FIG. 40 is a flow chart of a film-binding routine in the second embodiment of the present invention.

Next, according to FIG. 40, each error routine will be described below.

Figure 38:
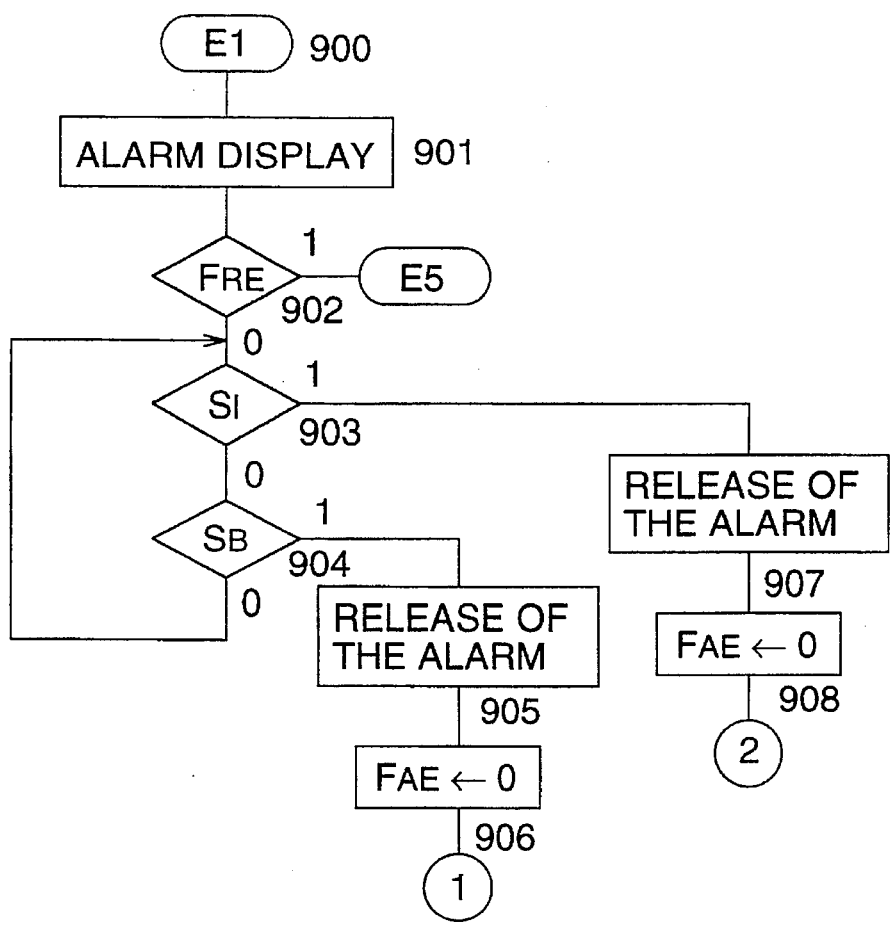
FIG. 38 is a flow chart of the auto-loading error routine in the second embodiment of the present invention.

Initially, the auto-load error will be described according to FIG. 38. When an auto-load error occurs in the auto-load routine in step 641, since a flag $F_{AE}$ designating the auto-load error is set to "1", the sequence jumps to step 900 in step 642. In step 901, an alarm display designating the auto-load error is carried out. In step 902, it is checked whether a re-winding error occurred or not. In steps 903 and 904, the release switch $S_1$ and a cartridge cover switch $S_B$ are checked. When it is detected that the release switch $S_1$ is 1, the alarm display is deactivated, a flag is reset in step 908, and the film is automatically loaded again. When it is detected that the cartridge cover 430 is open, the alarm display is deactivated in step 905, a flag is reset in step 906, and the sequence returns to the initial loop.

Figure 39:
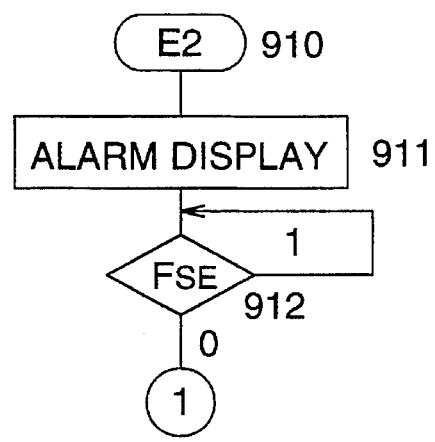
FIG. 39 is a flow chart of the shutter error routine in the second embodiment of the present invention.

Next, the shutter error routine will be described below according to FIG. 39. When it is detected in step 626 that improper exposure conditions exist, a flag $F_{SE}$ designating a shutter error is set in step 627, the sequence jumps to step 910, and a shutter error alarm is displayed in step 911. Since there is a possibility that the shutter does not open or the shutter does not close in shutter errors, the camera is not further operated hereinafter. After the camera becomes operable, the flag $F_{SE}$ is reset, and the sequence returns to the initial state.

Next, the film hang-up routine will be described below according to FIG. 40. When the film is wound, there is a case in which the perforation can not be detected in the predetermined period of time in step 632 or step 634. In this case, the following causes can be considered: a reading-error of the number of exposable frames occurs at the time of reading the bar code information, or magnetic information on the tongue portion of the film; or the a film feeding error occurs due to deformation of the film in the cartridge C. In this case, the sequence enters into the film hang-up routine in step 920, a flag $F_{FE}$ designating abnormal winding and a flag $F_{R1}$ designating re-winding is set and stored in the E²PROM. Then, re-winding is started. In step 922, the first perforation after re-winding has been started is detected. When the first perforation can not be detected in a predetermined period of time, the sequence jumps to the re-winding error routine. When the first perforation can be detected in a predetermined period of time, $R_{SP}$ is subtracted by 1 in step 924 and is stored in the E²PROM. Then, the sequence returns to the normal re-winding routine. In this case, the following is recorded on the film tongue portion: the film is caught during feeding; and the number of exposed frames, etc. The spool 402 is stopped at the position at which "exposed" is displayed on the exposure state display.

As described above, after film feeding was started, before the entire exposable frames of the film, the number of which is obtained from the bar code, have been exposed, when the perforation (for example, which corresponds to the perforation $F_b$ of each frame) can not be detected after the first predetermined period of time has passed, (the first predetermined period of time is set corresponding to the intervals of perforations), the camera program judges that the film is caught in the middle of of feeding, and controls the film feeding mechanism so that the film is re-wound. Further, after the first perforation has been detected, when the next perforation (for example, which corresponds to the perforation $F_c$ of each frame) is not detected after the second predetermined time, which is set corresponding to the interval of the perforations and is different from the first predetermined period of time, has passed, the camera judges that the film is caught during film feeding, and controls the film feeding mechanism so that the film is re-wound.

Figure 41:
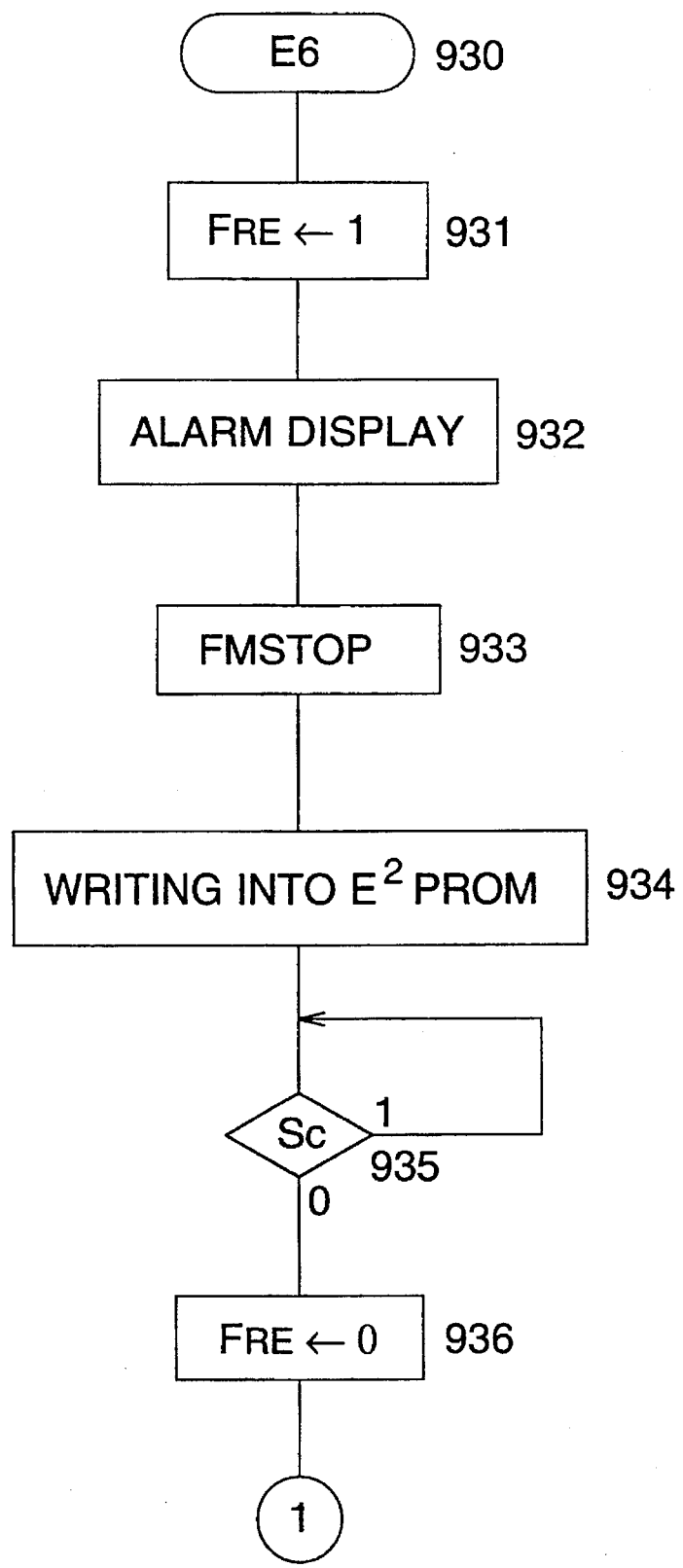
FIG. 41 is a flow chart of the re-winding error routine in the second embodiment of the present invention.

Next, a re-winding error routine will be described according to FIG. 41. In the case where an abnormality occurs during re-winding, and the perforation can not be detected, the sequence enters into the re-winding error routine in step 930.

A flag $F_{RE}$, designating the re-winding error, is set in step 931. In step 932, an alarm indicating the re-winding error is displayed in the display portion. Re-winding stops in step 933, and the data is stored in the E²PROM in step 934. In step 935, it is detected whether the cartridge C was taken out of the camera. The flag $F_{RE}$ is reset in step 936, and the sequence returns to the initial position. Actually, when the sequence stops during re-winding, the film remains out of the cartridge C. Accordingly, the cartridge C can not be taken out of the camera. Therefore, when the re-winding error occurs, the rear cover of the camera is opened, and the film is taken out of the camera.

Figure 42:
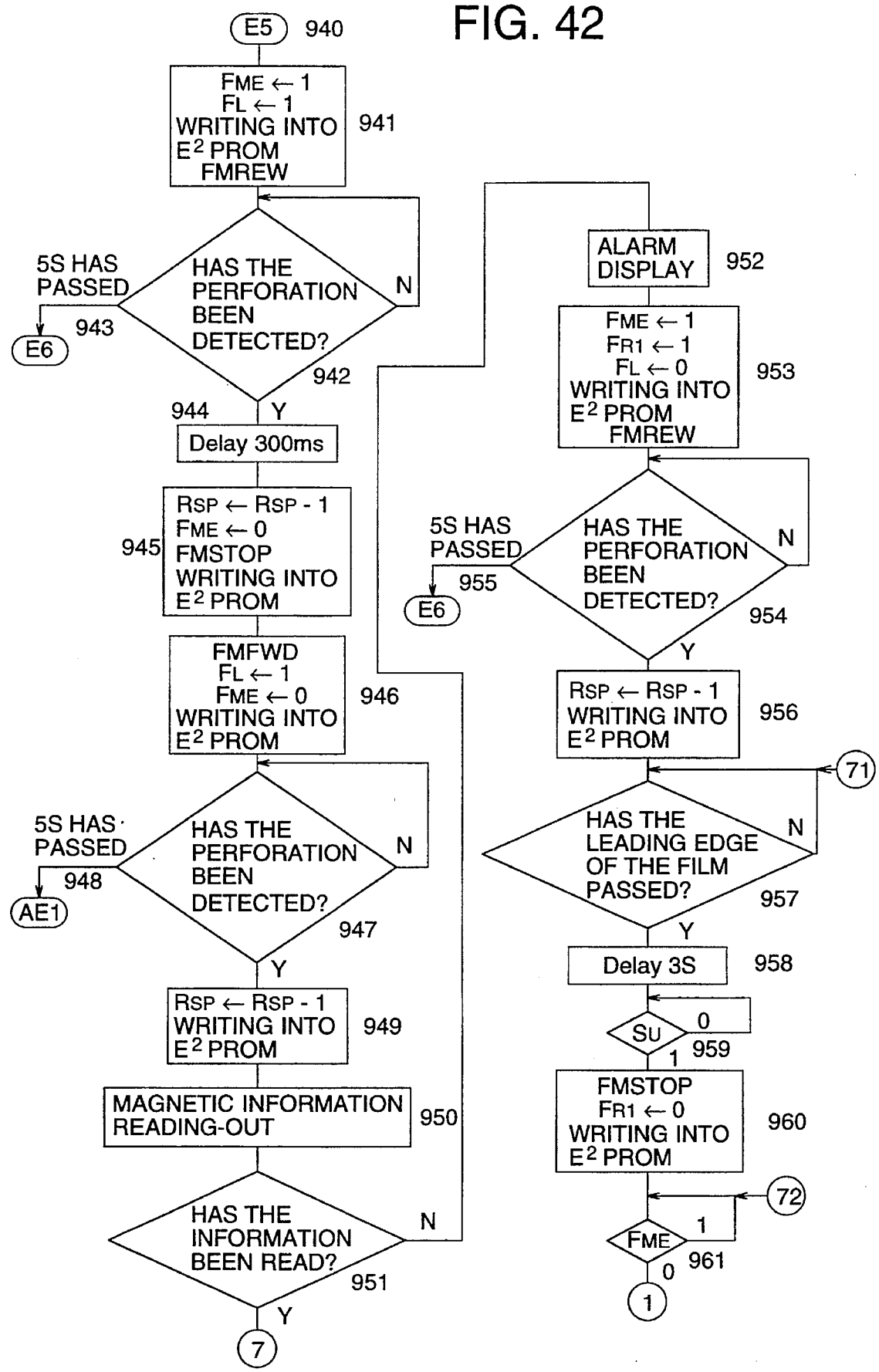
FIG. 42 is a flow chart of the magnetic recording reproduction error routine in the second embodiment of the present invention.

A magnetic recording reproduction error routine will be described according to FIG. 42. Magnetic information on the film tongue portion is read in step 724 at the time of automatic loading. When the information can not be read in step 725, the sequence jumps to the magnetic recording reproduction error routine. The camera can not discriminate whether the loaded cartridge C is already exposed or partially exposed, and a partially exposed cartridge is discriminated when the magnetic information is read. When magnetic information can not be read, the cartridge C is prevented from being loaded in order to protect the partially film from being double-exposed. However, in order to prevent the film from being unexposed by a temporary magnetic reproduction error, a flag $F_{ME}$ designating a magnetic information reading error is set in step 941 and is stored in the E²PROM. After that, the film is re-wound temporarily to the position before the first perforation Fb, and the sequence stops for a predetermined period of time in step 944. The flag $F_{ME}$ is reset and the data is stored in the E²PROM in steps 945 and 946. Then, the film is re-wound again. It is detected whether the perforation passes a predetermined position in step 947. Magnetic information is read again in step 950. Here, when the magnetic information has been correctly read, the sequence returns from step 951 to the initial position. When the magnetic information has not been correctly read, a magnetic information reading failure alarm is displayed in step 952. The flag $F_{ME}$ is set again in step 953, and stored in the E²PROM. Then, the film is re-wound. After the leading edge of the film has been completely wound into the cartridge C in steps 954 through 957, the reference position is detected in order to return the exposure state display to the state before film loading in step 959. Then, film re-winding stops in step 960. A magnetic recording reproduction portion is necessary for the discrimination of partially exposed film. When magnetic information can not be read, there is a possibility that the partially exposed film is double-exposed. Accordingly, the alarm display is continued in step 961, and the camera is not operable hereinafter. In this case, the sequence does not return to the initial routine until the camera is operable again. When the perforation is not detected in a predetermined period of time in steps 943, 948 and 955, the sequence jumps to each error routine.

Figure 43:
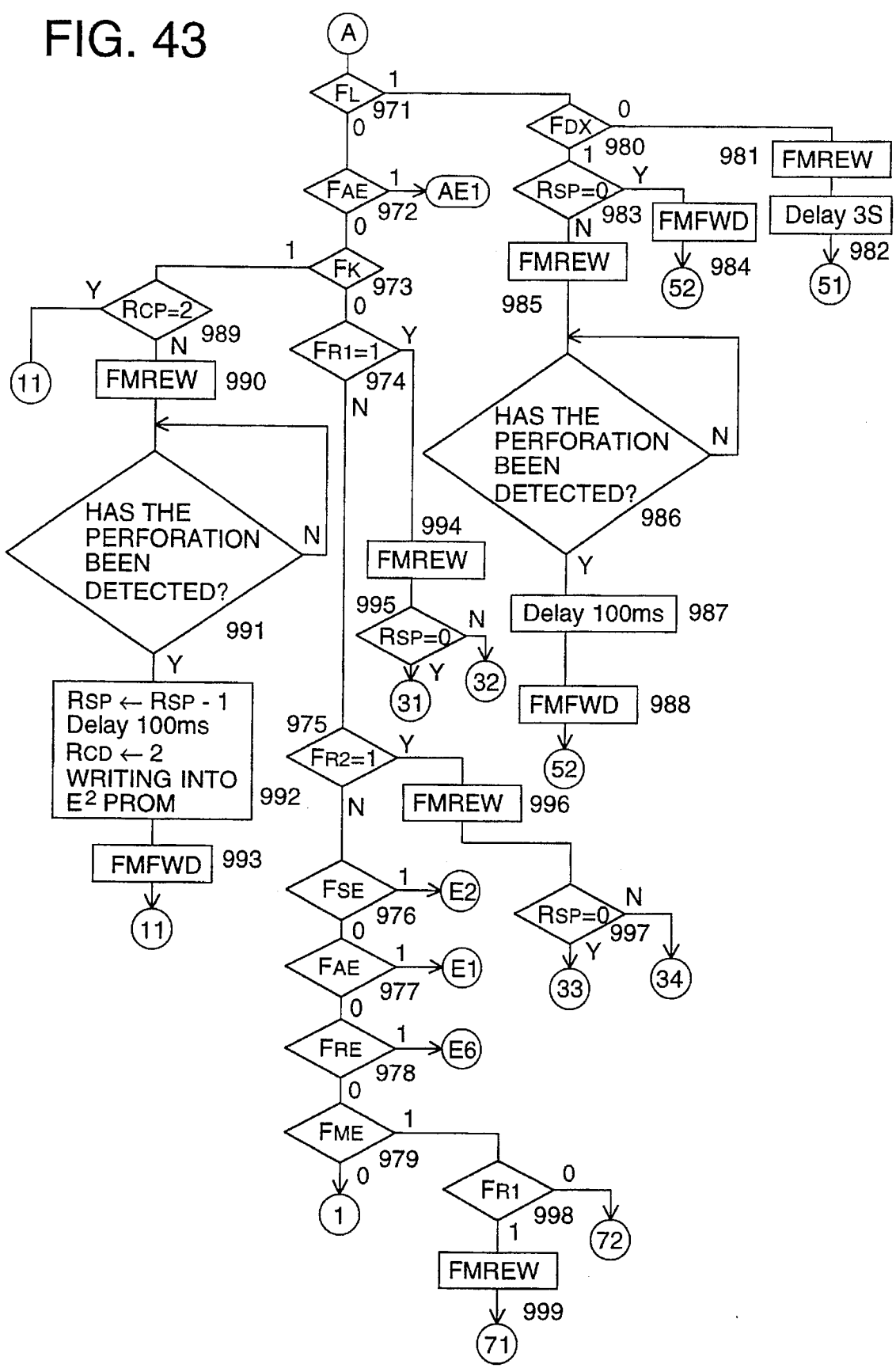
FIG. 43 is a flow chart of the initial stage checking routine in the second embodiment of the present invention.

Finally, an initial judgement routine will be described below according to FIG. 43. When the battery 510 is removed from the camera while the camera is being operated, a microcomputer is reset, and the sequence returns to step 601 in the main flow chart. Contents of flags and RAMs are stored in the $E^2PROM$, and contents of the $E^2PROM$ are read in step 603. When the cartridge C is loaded into the camera before the battery 510 has been removed from the camera, the sequence jumps from step 604 to the initial judgement routine. It is detected by a nonvolatile memory whether the battery has been removed from the camera or not, wherein information concerning the existence of the battery is written into the nonvolatile memory at a predetermined period, and the nonvolatile memory retains the existing information until the information stored in the memory is replaced with the next information Information concerning the existence of the battery is detected by the following methods: for example, a battery cover SW, which is interlocked with the open/close of the battery cover, is provided, and the removal of the battery is detected when the signal of the battery cover is detected; voltage of the power source is periodically checked and removal of the battery is detected when voltage can not be detected.

It is judged by the flag in step 971 whether the film is being auto-loaded or not. When the film is being auto-loaded, the sequence jumps to step 980. It is judged in step 980 whether bar code information is read or not. When the bar code information is not read yet, the film is re-wound temporarily in step 981. The sequence waits for 3 seconds in step 982 so that the film is positively wound into the reel. After that, the sequence returns to the auto-load routine in order to carry out auto-loading again.

The number of times of perforation detection after the start of auto-loading is checked in step 983. This step is carried out due to the reason that the magnetic information on the film is read after one perforation has been detected. When the perforation is not yet detected, the sequence advances to step 984 and starts film feeding, and then, returns to the auto-load routine. When it is judged in step 983 that the perforation is detected, it is assumed that the battery 510 is taken out during magnetic information reading. Accordingly, the film is re-wound temporarily to the position before the perforation in steps 985 through 987. Film feeding is started again in step 988, and the sequence returns to the auto-load routine.

It is checked in step 972 whether an auto-load error has occurred. When an auto-load error has occurred, the sequence jumps the auto-load error routine. It is judged in step 973 whether the film is being fed or not. When the film is being fed, the sequence advances to step 989, and it is judged whether the number of perforations to be detected is 2 or not. When the number of perforations is 2, the first perforation is not detected yet, and accordingly, film feeding is started in step 989. Then the sequence returns to the main flow of the flow chart. When the number of perforations to be detected is not 2, this information means that magnetic information is being recorded onto the film. Accordingly, after the film has been re-wound to the position before the first perforation in steps 990 through 992, the film is fed again in step 993. The sequence returns to the main flow, and information is magnetically recorded again.

In step 974, it is judged whether the film is being re-wound or not. When the film is being re-wound, rewinding is started in step 994. In step 995, the number of perforations are counted from the leading edge of the film. When the number of perforations is 0, only the leading edge of the film is detected hereinafter. When the number of perforations are not 0, it is necessary to detect the remaining perforations. Therefore, the returning position of the sequence to the re-winding routine is different. In step 975, it is judged whether the partially exposed film is being re-wound. In this case, only the returning position of the sequence is different, and other conditions remain the same as those in steps 994 and 995.

In steps 976 through 978, existence of a shutter error, auto-load error, and/or re-winding error are checked. If an error is detected, the sequence advances to the respective error routines. In step 979, the existence of any magnetic information reading error is judged. If an error exists, the sequence advances to step 998. In step 998, when it is judged that the film is being re-wound, the re-winding starts in step 999, and the sequence returns to the error routine. When flags are not detected to step 979, it is judged that the camera is not operable before the battery 510 has been taken out of the camera. Then, the sequence returns to the main routine to stand by for the next operation.

Next, the relationship between the film used in this example and the photographic lens will be described. The film base is made of polyethylene naphthalate. Polyethylene naphthalate has the feature that it responds mainly to ultraviolet rays of 220 through 380 nm, and emits fluorescence. Accordingly, emission of fluorescence from the film base continues from the time when the shutter has been closed to the time when the film is developed, due to the ultraviolet rays received at the time of photography. Therefore, even when a small amount of ultraviolet rays is received and the amount of fluorescence is small, the film is noticeably fogged.

Therefore, a photographic lens having optical parts formed of materials which prevent, at least, the ultraviolet ray from penetrating, may be used. That is, an optical system having, at least, one optical part made of PMMA (poly methyl methacrylate), which is a plastic material, and SF system glass, or LaSF system glass, may be formed. Further, in order to enlarge the degree of freedom for composing such an optical system, and to enhance the efficiency for eliminating the ultraviolet rays, coating for eliminating the ultraviolet rays may be carried out on optical parts made of the above-described material, or optical parts made of other material. Specifically, PMMA can prevent the ultraviolet ray penetration, the wavelength of which is shorter than 380 nm, and also has good molding properties. Accordingly, aspherical lenses can be made of PMMA, and PMMA is the most preferable material for such an optical system.

Figure 44:
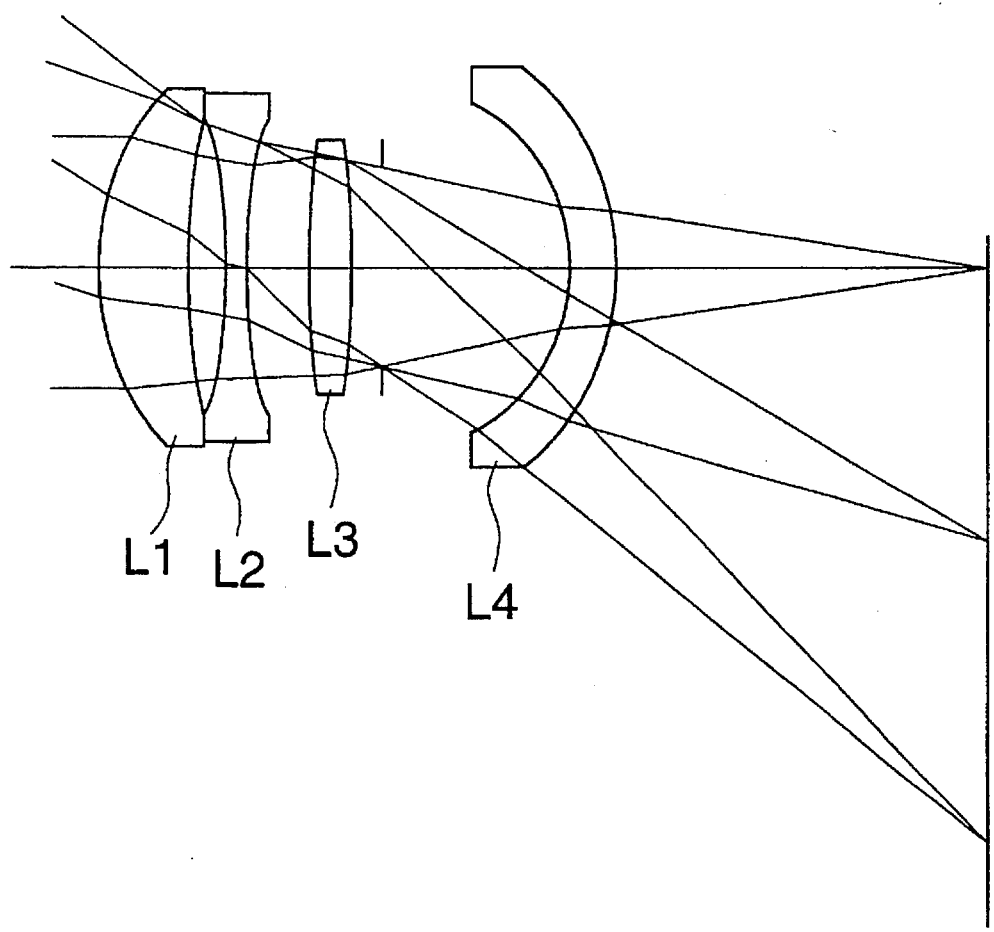
FIG. 44 is a view showing a photographing lens used in the second embodiment of the present invention.

FIG. 44 is a view showing a photographic lens for use in this example. As material for the lens, the following are used: LaF010 for the first lens $L_1$; $SFL_6$ for the second lens $L_2$; LaF05 for the third lens $L_3$; and PMMA for the fourth lens $L_4$. Accordingly, in this photographic lens, the ultraviolet ray penetration is prevented by the second lens $L_2$, and the fourth lens $L_4$.

Next, reading of the bar code disk by a bar code reading element, and reproducing of magnetic information by a magnetic head in the camera in the second embodiment of the present invention will be described below.

Figure 45:
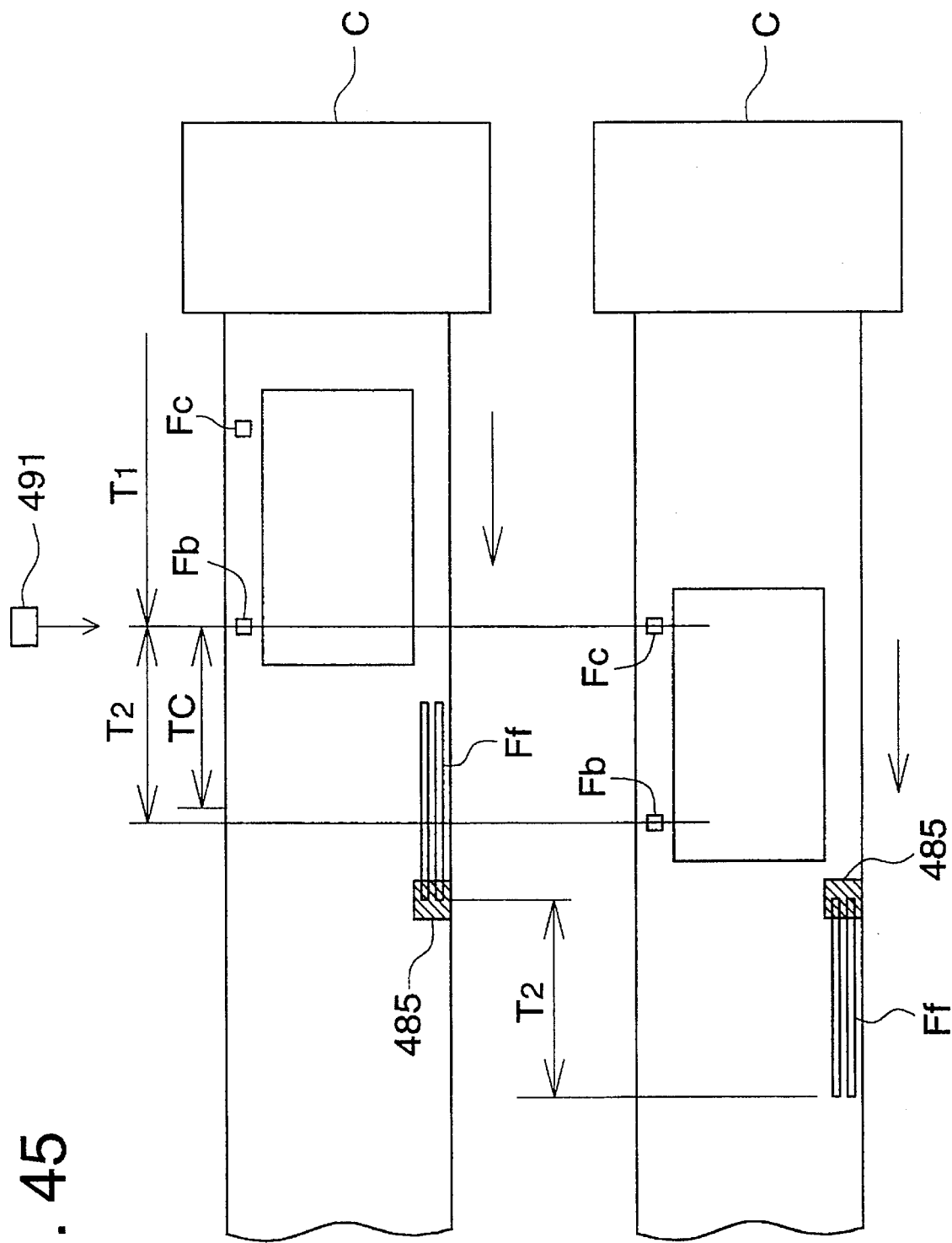
FIG. 45 is a view illustrating bar code read-out and magnetic information reproduction by the camera in the second embodiment of the present invention.

The explanations in FIG. 29 will be added to those in FIG. 45, although FIG. 29 was explained previously.

In FIG. 29, the bar code disk i provided at the upper portion of the cartridge C is rotated when the spool gear 473 is rotated. Bar code information is read by the photoreflector 434 for reading the bar code, wherein the photoreflector is a bar code reading element. Until the photoreflector 491, which is a detecting element for the perforation $F_c$ provided on the cartridge C side, which is a film cartridge, with respect to the photographic image frame, detects the first perforation Fb, bar code information on the bar code disk 401 is read by the photoreflector 434 for reading the bar code, wherein the photoreflector 491 is provided at a position opposed to the perforation $F_c$ on the cartridge C side with respect to the photographic image frame in this embodiment. Bar code information read out by the photoreflector 434 is the film sensitivity, the number of exposable frames, latitude, etc.

The magnetic head 485 located on the film tongue portion side with respect to the photographic image frame, that is, provided near the position opposed to the perforation in this embodiment, reproduces magnetic information, until the photoreflector 491 detects the second perforation Fc after the photoreflector 491 has detected the first perforation Fb, or until a predetermined time passes after the photoreflector 491 has detected the first perforation. In reproduction of magnetic information by the magnetic head 485, the magnetic information recorded on a magnetic track Ff (refer to FIG. 15), located near the film tongue side with respect to the first exposed frame of the film, is reproduced. Magnetic information includes the film sensitivity, the number of exposable frames, latitude, etc.

FIG. 45 is a time chart showing reading of information on the bar code disk 401 by the photoreflector 434, and reproducing of information on the magnetic track Ff by the magnetic head 485.

$T_1$ designates the period of time required when the photoreflector 491 detects the first perforation Fb. As described above, the photoreflector 434 reads the information on the bar code disk 401 during the above-described time $T_1$.

$T_2$ designates the period of time required when the photoreflector 491 detects the second perforation after the first perforation has been detected, or the period of time necessary when a predetermined time $T_c$ passes after the first perforation has been detected. The magnetic head 485 reproduces magnetic information on the magnetic track Ff during this time $T_2$. As can clearly be seen in FIG. 45, $T_1$ continues with $T_2$ or $T_c$ and is not overlapped with $T_2$ or $T_C$. Accordingly, an electric noise of the photoreflector 434 does not affect the magnetic signal reproduction circuit using the magnetic head 485. Bar code reading with the photoreflector 434 is stopped after the first perforation $F_b$ has been detected by the photoreflector 491, and reproduction of magnetic information by the magnetic head 485 is started. The reproduction of magnetic information is completed during $T_2$ or $T_C$. That is, bar code information reading on the bar code disk 401 by the photoreflector 434 is completed during $T_1$ within which the first perforation Fb of the leading edge of the film is detected by the photoreflector 491. The reproduction of magnetic information on the magnetic track Ff on the leading edge of the film by the magnetic head 485 is completed during $T_2$. As a result, reading of information on the bar code disk 401 and the magnetic track Ff is completed during $T_1+T_2$.

As described above, the electric noise caused by the photoreflector 434 has no influence on reading the bar code disk 401. Accordingly, bar code information on the bar code disk 401 and magnetic information on the magnetic track Ff are correctly and rapidly read when the film is loaded, and reading of this information is completed before auto-loading of film has been completed.

According to the second embodiment of the present invention, the electric noise caused by the photoreflector for reading the bar code disk has no effect on the magnetic signal reproduction circuit using the magnetic head. Accordingly, information on the bar code disk and magnetic information on the magnetic track are correctly and quickly read when the film is loaded. Therefore, the camera can be quickly readied for photography.

Figure 46:
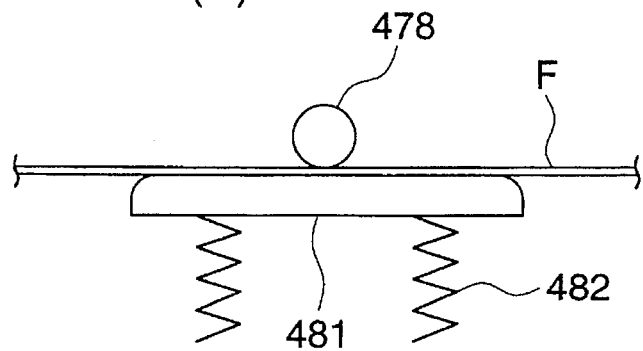
FIGS. 46(A), 46(B) and 46(C) are views showing composition of a film driving roller, a pressure plate, and pressure plate springs in the second embodiment of the present invention.
Figure 46:
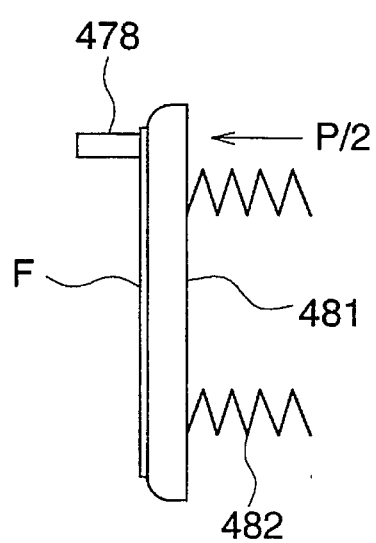
Figure 46:
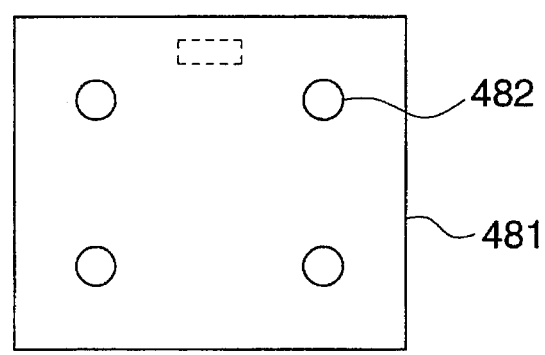

FIG. 46 is a view showing the drive roller 478, pressure plate 481 and pressure plate springs 482 shown in FIG. 28. FIG. 46(A) is a plan view, FIG. 46(B) is a front view, and FIG. 46(C) is a side view. In this drawing, the film F is sandwiched between the drive roller 478 and the pressure plate 481 pressed by the pressure plate springs 482.

When the total pressure applied by the pressure plate 481 is p g, the spring pressure is p/2 g. When the pressure plate 481 is made of polycarbonate (PC-G 20%), the coefficient of friction of the film F with the pressure plate 481 is 0.2 through 0.4. It is necessary that the coefficient of the film F with the drive roller 478 is larger than that of the film F with the pressure plate 481 for feeding the film F. Accordingly, the following equation is obtained.

The coefficient of friction of the film F with the drive roller 478>0.4>the coefficient of friction of the film F with the pressure plate 481

As an example, when the pressure by the pressure plate is 400 g, the coefficient of friction of the film F with the drive roller is $\mu_1=0.6$, and the coefficient of friction of the film F with the pressure plate 481 is $\mu_2=0.2$, then the film feeding force of the drive roller 478 = pressure by the pressure plate/2 × $(\mu_1 - \mu_2)$ =

400/2 × (0.6 − 0.2) = 80 g.

As described above, the film can be fed when the film feeding force is 80 g in the case of normal film. Accordingly, it may be acceptable that the pressure by the pressure plate is more than 400 g, and the difference between the coefficient of friction of the film F with the drive roller 478 and that of the film F with the pressure plate 481 is more than 0.4.

In order to decrease the coefficient of friction of the film F with the pressure plate, the pressure plate may include molybdenum disulfide, fluorine polymer, glass fiber, or carbon fiber. For example, when carbon fiber is included in a pressure plate made of polycarbonate, the coefficient of friction is decreased from about 0.65 to about 0.3, and when a fluorine polymer is included, the coefficient of friction is decreased further to 0.20 through 0.34.

Figure 47:
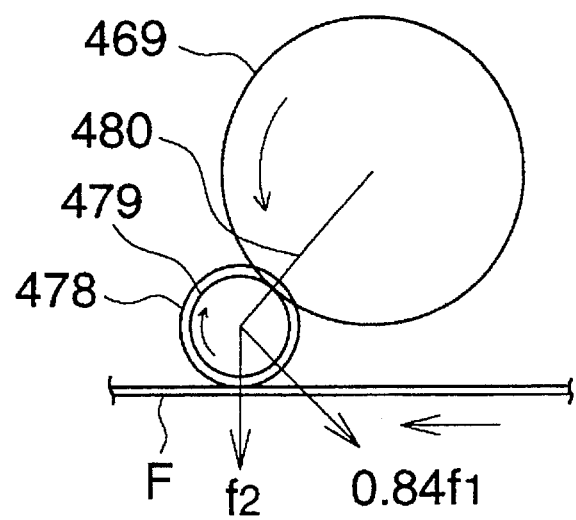
FIGS. 47(A) and 47(B) are views showing the pressure-contact force onto the film given by the film driving roller in the second embodiment of the present invention.
Figure 47:
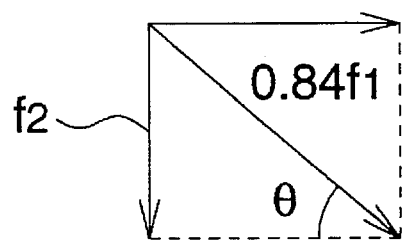

FIG. 47 is a view showing the pressure-contact force of the drive roller 478 with the film F. FIG. 47(A) is a schematic illustration showing the drive of the fourth sun gear 469. FIG. 47(B) is a vector diagram showing the roller pressure applied to the film. When the film is wound, the fourth planetary lever 480 is rotated counterclockwise, and the drive roller 478, which is coaxially provided with the fourth planetary gear 479, comes into contact with the film F. In this case, the counterclockwise rotation of the fourth planetary lever 480 is arrested by a stopper, not shown in the drawing, the pressure-contact force of the drive roller 478 is not applied to the film F, and only the pressure of the pressure plate is transferred to the film F.

When, as an example, the torque of the motor is 16.5 g-cm, the reduction ratio by the six-stage reduction gears is 1/311, the gear efficiency is $0.84^6=0.35$, the radius of the fourth sun gear 69 is 8 mm, then the torque $f_1$ of the sun gear 69 is:

$$f_1 = 16.5 \times 311 \times 0.35/0.8 = 2245 \text{ g}.$$

When the gear efficiency of the fourth sun gear 69 and the fourth planetary gear 79 is 0.84, and the angle θ of a component of the force is 43.5°, then, the pressure-contact force $f_2$ of the drive roller 78 against the film F is $$f_2 = 2245 \text{ g} \times 0.84 \times \sin 43.5° = 1298 \text{ g}.$$

When the pressure-contact force of the drive roller 478 against the film F is greater than the pressure by the pressure plate, the drive roller 478 is not withdrawn by the pressure by the pressure plate, and the film can be securely sandwiched between the drive roller 478 and the pressure plate.

In the example described above, a spring loaded pressure plate has been explained. However, the present invention can also be applied to a camera in which the pressure plate is integrally molded with the rear cover or back cover, and pressure plate springs are omitted.

According to the second embodiment of the present invention, in a camera in which film accommodated in a cartridge is fed to a film winding reel by a spool drive, film auto-loading can be carried out securely, and the overall dimensions of the camera are small even when a drive roller is provided in the camera.

Further, when the film is re-wound, the film is not loaded with the drive roller and can be easily re-wound because the drive roller is withdrawn from the film by the reverse rotation of a planetary gear.

Further, since a rotatable pressure plate roller, which is withdrawn in the pressure plate, is provided in the camera, the drive roller is not subject to wear when film is fed out of the cartridge, or when the camera mechanism is tested without loading of the film.

As described above, according to the second embodiment of the present invention, the following advantages can be obtained. In the case where film is being re-wound, even when the first planetary gear is engaged with a reel gear before the third planetary gear, which is engaged with the spool gear, is disengaged from the spool gear when a motor is rotated in the direction of film winding, the driving force of the motor is not immediately transmitted to the reel. Accordingly, the force by the film is not transmitted to the spool gear, and the third planetary gear can be securely disengaged from the spool gear. Therefore, even when the film is being re-wound, the camera can be easily switched to the film winding mode.

What is claimed is:

1. A camera for use with a photographic film in a cartridge, comprising:

a cartridge chamber for accommodating said cartridge, wherein said cartridge includes a spool rotatable on an axis for holding said photographic film wound thereon;

a bar code disk including a bar code thereon, having unit blocks, and being rotatable on said axis with said spool;

a regulation member for regulating a location of said spool at a predetermined position in said cartridge chamber in relation to a rotational angle on said axis;

a regulation member release for releasing a regulation of said location of said spool by said regulation member;

a driving shaft arranged to be coupled with said spool and for rotating said spool;

a generator for generating reference pulse signals corresponding to a rotation cycle of said spool;

a bar code reader for reading the bar code on said bar code disk so as to obtain film information respectively from each unit block of said bar code; and a controller for controlling said bar code reader in synchronism with said reference pulse signals so as to obtain said film information when said driving shaft is coupled with said spool.

2. The camera of claim 1, wherein said generator generates said reference pulse signals of ON status and OFF status alternatively corresponding to a move from one unit block of said bar code to another in view at a predetermined scanning section of said bar code reader as said bar code disk is rotated by said driving shaft.

3. The camera of claim 2, further comprising:

an urging member for urging said driving shaft toward said spool so that said driving shaft is coupled with said spool, wherein said driving shaft is movable between a coupled position where said driving shaft is coupled with said spool and a released position where said driving shaft is freed from said spool;

wherein said controller controls said bar code reader in synchronism with said reference pulse signals so as to obtain said film information after a predetermined number of status changes between said ON status and OFF status of said reference pulse signals.

4. A camera for use with a photographic film in a cartridge, comprising:

a cartridge chamber for accommodating said cartridge, said cartridge including a spool rotatable on an axis, for holding said photographic film wound thereon;

a bar code disk including a bar code thereon, having unit blocks, and being rotatable on said axis with said spool;

a regulation member for regulating a location of said spool at a predetermined position in said cartridge chamber in relation to a rotational angle on said axis;

a regulation member release for releasing a regulation of said location of said spool by said regulation member;

a driving shaft arranged to be coupled with said spool and for rotating said spool;

an urging member for urging said driving shaft toward said spool so that said driving shaft is coupled with said spool, wherein said driving shaft is movable between a coupled position in which said driving shaft is coupled with said spool and a released position in which said driving shaft is freed from said spool;

a bar code reader for reading the bar code on said bar code disk in rotation so as to obtain film information from each unit block of said bar code, respectively;

a generator for generating reference pulse signals of ON status and OFF status alternatively corresponding to a move from one unit block of said bar code to another in view at a predetermined scanning section of said bar code reader as said bar code disk is rotated with said spool by said driving shaft; and a controller for acknowledging a coupling of said driving shaft with said spool when said generator generates a predetermined number of status changes between said ON status and OFF status of said reference pulse signals.

5. A camera for use with a photographic film in a cartridge, comprising:

a cartridge chamber for accommodating said cartridge;

a spool, rotatable on an axis, for holding said photographic film wherein a longitudinal end of said photographic film is fixed to said spool;

a reel for winding said photographic film thereon;

a reel gear for driving said reel;

a spool gear for driving said spool;

a driving motor for driving said reel gear to wind said photographic film on said reel when said driving motor rotates in a predetermined direction, and for driving said spool gear to rewind said photographic film on said spool when said driving motor rotates in a direction opposite to said predetermined direction;

a first planetary gear arranged to be coupled with said reel gear so as to rotate said reel when said reel winds said photographic film, and released from said reel gear when said spool rewinds said photographic film;

a second planetary gear arranged to be coupled with said spool gear so as to rotate said spool when said spool rewinds said photographic film, and released from said spool gear when said reel winds said photographic film;

a third planetary gear arranged to be coupled with said spool gear so as to rotate said spool when said reel winds said photographic film, and released from said spool gear when said spool rewinds said photographic film;

a gear train for differentiating a rotation speed of said spool from a rotation speed of said reel so that said rotation speed of said spool is slower than said rotation speed of said reel; and a delay member preventing said first planetary gear from transmitting driving force of said driving motor to said reel gear before said third planetary gear is released from said spool gear upon switching rotational direction of said diving motor from said direction opposite to said predetermined direction, to said predetermined direction.

6. The camera of claim 5, wherein said delay member includes:

a idle gear, coaxially disposed with said first planetary gear, for delaying a driving force of said first planetary gear onto said reel gear;

wherein one of said first planetary gear and said idle gear has a protruded portion and other one of said first planetary gear and said idle gear has a slot portion to which said protruded portion is inserted so that said idle gear is prevented from transferring said driving force of said first planetary gear onto said reel gear when said protruded portion is in play of said slot portion.

7. A camera for use with a photographic film in a cartridge, comprising:

a cartridge chamber for accommodating said cartridge, wherein said cartridge includes a spool rotatable on an axis for holding said photographic film wound thereon;

a bar code disk, having a bar code with unit blocks thereon, and rotatable on said axis with said spool;

a regulation member for regulating a location of said spool at a predetermined position in said cartridge chamber in relation to a rotational angle on said axis;

a regulation member release for releasing a regulation of said location of said spool by said regulation member;

a driving shaft arranged to be coupled with said spool and for rotating said spool;

a generator for generating reference pulse signals corresponding to a rotation cycle of said spool;

a bar code reader for reading the bar code on said bar code disk so as to obtain film information respectively from each unit block of said bar code;

a controller for controlling said bar code reader in synchronism with said reference pulse signals so as to obtain said film information when said driving shaft is coupled with said spool;

an urging member for urging said driving shaft toward said spool so that said driving shaft is coupled with said spool, wherein said driving shaft is movable between a coupled position in which said driving shaft is coupled with said spool and a released position in which said driving shaft is freed from said spool; and a detector for detecting said coupled position of said driving shaft, and for generating a detection signal;

wherein said controller controls said regulation member release so as to release said regulation of said location of said spool according to said detection signal.

8. A camera for use with a photographic film in a cartridge, comprising:

a cartridge chamber for accommodating said cartridge including a spool rotatable on an axis for holding said photographic film wound thereon;

a bar code disk, having a bar code with unit blocks thereon, and rotatable on said axis with said spool;

a regulation member for regulating location of said spool at a predetermined position in said cartridge chamber in relation to a rotational angle on said axis;

a regulation member release for releasing a regulation of said location of said spool by said regulation member;

a driving shaft arranged to be coupled with said spool and for rotating said spool;

a generator for generating reference pulse signals corresponding to a rotation cycle of said spool;

a bar code reader for reading the bar code on said bar code disk so as to obtain film information respectively from each unit block of said bar code;

a controller for controlling said bar code reader in synchronism with said reference pulse signals so as to obtain said film information when said driving shaft is coupled with said spool;

an urging member for urging said driving shaft toward said spool so that said driving shaft is coupled with said spool, said driving shaft being movable between a coupled position in which said driving shaft is coupled with said spool and a released position in which said driving shaft is freed from said spool;

wherein said generator generates said reference pulse signals of ON status and OFF status alternatively corresponding to a move from one unit block of said bar code to another in view at a predetermined scanning section of said bar code reader as said bar code disk is rotated by said driving shaft, and wherein said controller controls said regulation member release so as to release said regulation of said location of said spool when status of said reference pulse signals is held the same for a predetermined time period.

9. A camera for use with a photographic film in a cartridge, comprising:

a cartridge chamber for accommodating said cartridge, wherein said cartridge includes a spool rotatable on an axis, for holding said photographic film wound thereon;

a bar code disk, having a bar code with unit blocks thereon, and rotatable on said axis with said spool;

a regulation member for regulating a location of said spool at a predetermined position in said cartridge chamber in relation to a rotational angle on said axis;

a regulation member release for releasing a regulation of said location of said spool by said regulation member;

a driving shaft for being coupled with said spool and for rotating said spool;

a generator for generating reference pulse signals which correspond to a rotation cycle of said spool;

a bar code reader for reading the bar code on said bar code disk so as to obtain film information respectively from each unit block of said bar code;

a controller for controlling said bar code reader in synchronism with said reference pulse signals so as to obtain said film information when said driving shaft is coupled with said spool; and an urging member for urging said driving shaft toward said spool so that said driving shaft is coupled with said spool, said driving shaft being movable between a coupled position in which said driving shaft is coupled with said spool and a released position in which said driving shaft is freed from said spool;

wherein said generator generates said reference pulse signals of ON status and OFF status alternatively corresponding to a move from one unit block of said bar code to another in view at a predetermined scanning section of said bar code reader as said bar code disk is rotated by said driving shaft, and wherein said driving shaft is kept rotating as said driving shaft is approaching said coupled position from said released position when said cartridge is being accommodated in said chamber; and said driving shaft is coupled with said spool when accommodation of said cartridge in said chamber is completed.

* * * * *